US011987288B2

(12) United States Patent
Thomas et al.

(10) Patent No.: US 11,987,288 B2
(45) Date of Patent: May 21, 2024

(54) UTILITY VEHICLE

(71) Applicant: Polaris Industries Inc., Medina, MN (US)

(72) Inventors: Michael A. Thomas, Salol, MN (US); Jeremy M. Markstrom, Roseau, MN (US); Johannah E. Rutkowski, Roseau, MN (US); Chirag Kathiriya, Roseau, MN (US); Jeremy R. Eichenberger, Warroad, MN (US); Bradley A. Bracht, Salol, MN (US); Eric J. Borud, Roseau, MN (US); Forrest W. Johnson, Stacy, MN (US)

(73) Assignee: Polaris Industries Inc., Medina, MN (US)

(*) Notice: Subject to any disclaimer, the term of this patent is extended or adjusted under 35 U.S.C. 154(b) by 503 days.

(21) Appl. No.: 17/214,241

(22) Filed: Mar. 26, 2021

(65) Prior Publication Data
US 2021/0300472 A1 Sep. 30, 2021

Related U.S. Application Data

(60) Provisional application No. 63/000,889, filed on Mar. 27, 2020.

(51) Int. Cl.
*B62D 21/09* (2006.01)
*B60G 17/04* (2006.01)
(Continued)

(52) U.S. Cl.
CPC .......... *B62D 21/11* (2013.01); *B60G 17/0408* (2013.01); *B62D 21/09* (2013.01); *B62D 25/2018* (2013.01); *B62D 25/2027* (2013.01)

(58) Field of Classification Search
CPC .... B62D 21/11; B62D 21/09; B62D 25/2018; B62D 25/2027; B62D 33/02; B60G 17/0408
See application file for complete search history.

(56) References Cited

U.S. PATENT DOCUMENTS

| 5,700,055 A | 12/1997 | Davidson |
| 8,998,253 B2 | 4/2015 | Novotny |

(Continued)

FOREIGN PATENT DOCUMENTS

| JP | 2015-066992 | 4/2015 |
| WO | 2014/115175 | 7/2014 |
| WO | 2015/071905 | 5/2015 |

OTHER PUBLICATIONS

International Search Report and Written Opinion issued by the International Searching Authority, dated Nov. 6, 2021, for International Patent Application No. PCT/US2021/024411; 10 pages.

*Primary Examiner* — John D Walters
(74) *Attorney, Agent, or Firm* — Faegre Drinker Biddle & Reath LLP

(57) ABSTRACT

A utility vehicle is configured for off-road terrain and may include a plurality of mounting members configured to support a load and/or support the vehicle during transport. The utility vehicle also includes an upper frame assembly which is movable between a first position and second position. The upper frame assembly may be moved to the second position during transportation of the utility vehicle. Further, the utility vehicle includes a plurality of configurations for a rear cargo area, thereby allowing for passengers or cargo to be supported.

23 Claims, 79 Drawing Sheets

(51) Int. Cl.
    *B62D 21/11*    (2006.01)
    *B62D 25/20*    (2006.01)

(56)         References Cited

U.S. PATENT DOCUMENTS

| | | |
|---|---|---|
| 9,056,576 B2 * | 6/2015 | Yamamoto .............. B60P 3/423 |
| 9,150,182 B1 | 10/2015 | Schlangen |
| 9,440,671 B2 | 9/2016 | Schlangen |
| 9,776,481 B2 | 10/2017 | Deckard |
| 9,902,292 B2 * | 2/2018 | Wakabayashi ............ B60N 2/68 |
| 10,081,290 B2 * | 9/2018 | Fohrenkamm ......... A01B 51/02 |
| 10,118,477 B2 | 11/2018 | Borud |
| 2011/0156439 A1 | 6/2011 | Sakata |
| 2015/0084321 A1 | 3/2015 | Hirooka |
| 2019/0329713 A1 * | 10/2019 | Sharma ................ B62D 33/023 |
| 2020/0361273 A1 | 11/2020 | Borud |
| 2021/0347243 A1 | 11/2021 | Kohler |

* cited by examiner

UTILITY VEHICLE

CROSS-REFERENCE TO RELATED APPLICATION

The present application claims priority to U.S. Provisional Patent Application Ser. No. 63/000,889, filed Mar. 27, 2020, and entitled "UTILITY VEHICLE", the complete disclosure of which is expressly incorporated by reference herein.

FIELD OF THE DISCLOSURE

The present application relates to a utility vehicle and, more particularly, to a utility vehicle having various configurations for supporting accessories and other components.

BACKGROUND OF THE DISCLOSURE

Vehicles configured for off-road travel, such as utility vehicles and all-terrain vehicles, may require various configurations to be able to support accessories or other components of the vehicle. Depending on the application of the vehicle, it may be required that the vehicle is configured with various mounts for towing large/heavy loads, supporting cargo or other accessories, airlift travel, and cargo transport. As such, there is a need for a vehicle configured for off-road terrain and which can support large/heavy loads at various mounting points.

SUMMARY OF THE DISCLOSURE

In one embodiment of the present disclosure, a utility vehicle comprises a plurality of ground-engaging members; a frame assembly having a front frame portion and a rear frame portion; and an operator area supported by the frame assembly. The operator area includes at least one seat configured to be removably coupled to the frame assembly. Additionally, the utility vehicle comprises a seat harness configured for a shoulder belt of the at least one seat and a cargo platform supported by the frame assembly. The cargo platform has a first position in which a forward extent of the cargo platform is positioned rearward of the operator area and a second position in which the forward extent of the cargo platform is positioned within the operator area. When in the second position, the cargo platform extends over the seat harness.

In another embodiment of the present disclosure, a utility vehicle comprises a plurality of ground-engaging members; a frame assembly having a front frame portion and a rear frame portion; and an operator area supported by the frame assembly. The operator area includes at least one seat configured to be removably coupled to the frame assembly and a seat harness configured for a shoulder belt of the at least one seat. The seat harness is movable between a first position and a second position. A portion of the seat harness is fixed during movement between the first and second positions.

In a further embodiment of the present disclosure, a frame component for a utility vehicle comprises a first mounting location configured to support a suspension assembly of the utility vehicle; a second mounting location configured to support a differential of the utility vehicle; a third mounting location configured to support a steering mechanism of the utility vehicle; and a fourth mounting location configured to support a tie-down member configured to receive a load and/or support the utility vehicle during transport.

Additionally, in another embodiment of the present disclosure, a utility vehicle comprises a plurality of ground-engaging members; a frame assembly supported by the plurality of ground-engaging members; a powertrain assembly supported by the frame assembly and comprising at least a prime mover and a transmission operably coupled to the prime mover. The vehicle further comprises a mounting assembly configured to support the powertrain assembly on the frame assembly and comprising a lower mounting member configured to couple with the frame assembly and an upper mounting member coupled to the lower mounting member and configured to contact an upper portion of the powertrain assembly.

In a further embodiment of the present disclosure, a utility vehicle comprises a plurality of ground-engaging members; a frame assembly supported by the plurality of ground-engaging members; a powertrain assembly supported by the frame assembly and comprising at least a prime mover and a transmission operably coupled to the prime mover; a suspension assembly operably coupled to the frame assembly; and a hydraulic assembly operably coupled to the powertrain assembly and the suspension assembly. The hydraulic assembly is configured to selectively adjust a height of the suspension assembly relative to a ground surface. The hydraulic assembly includes a pump driven by the prime mover and operably coupled to the suspension assembly.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, where.

Figure 1:
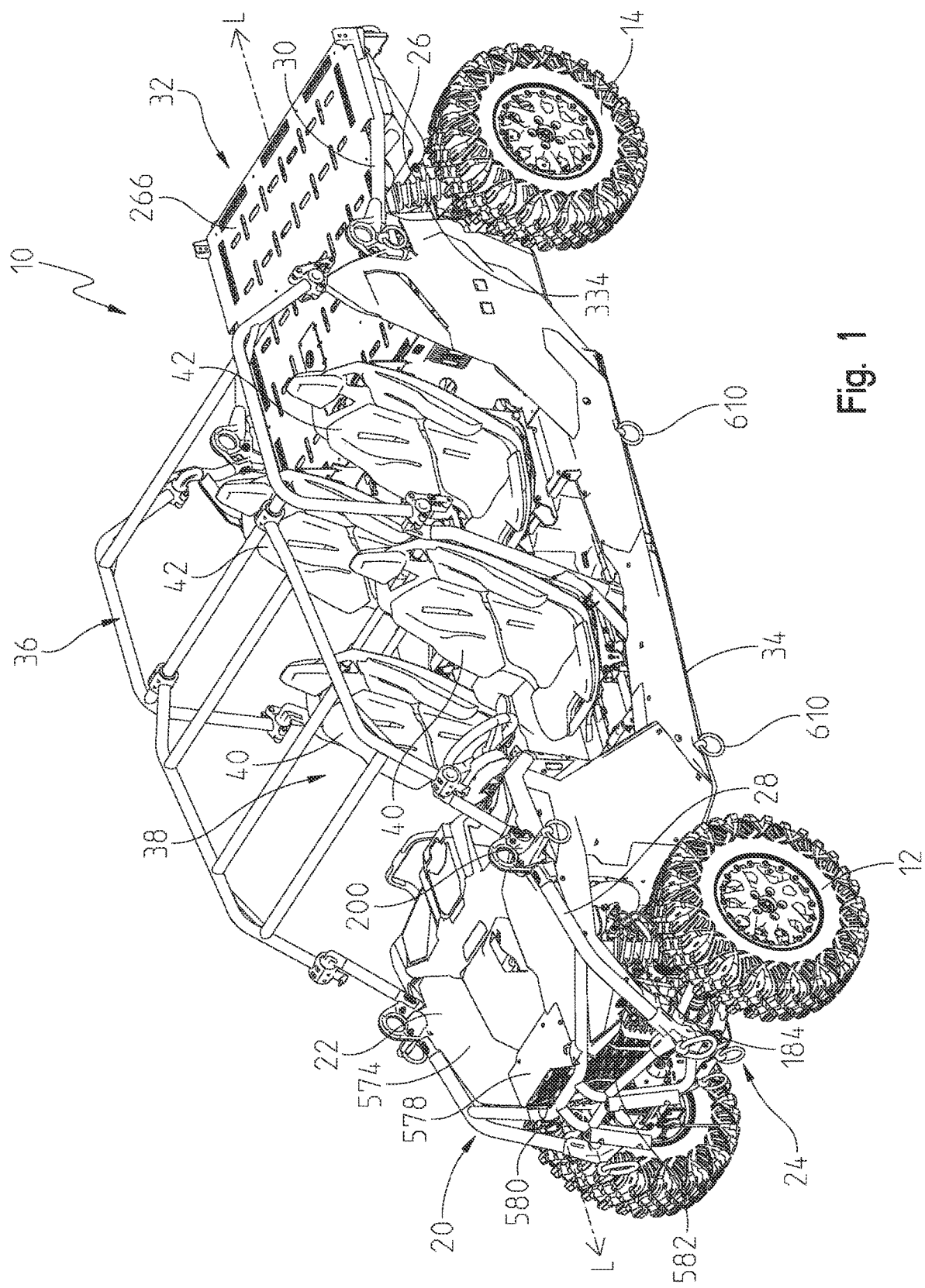
FIG. 1 is a front left perspective view of a utility vehicle of the present disclosure.
Figure 2:
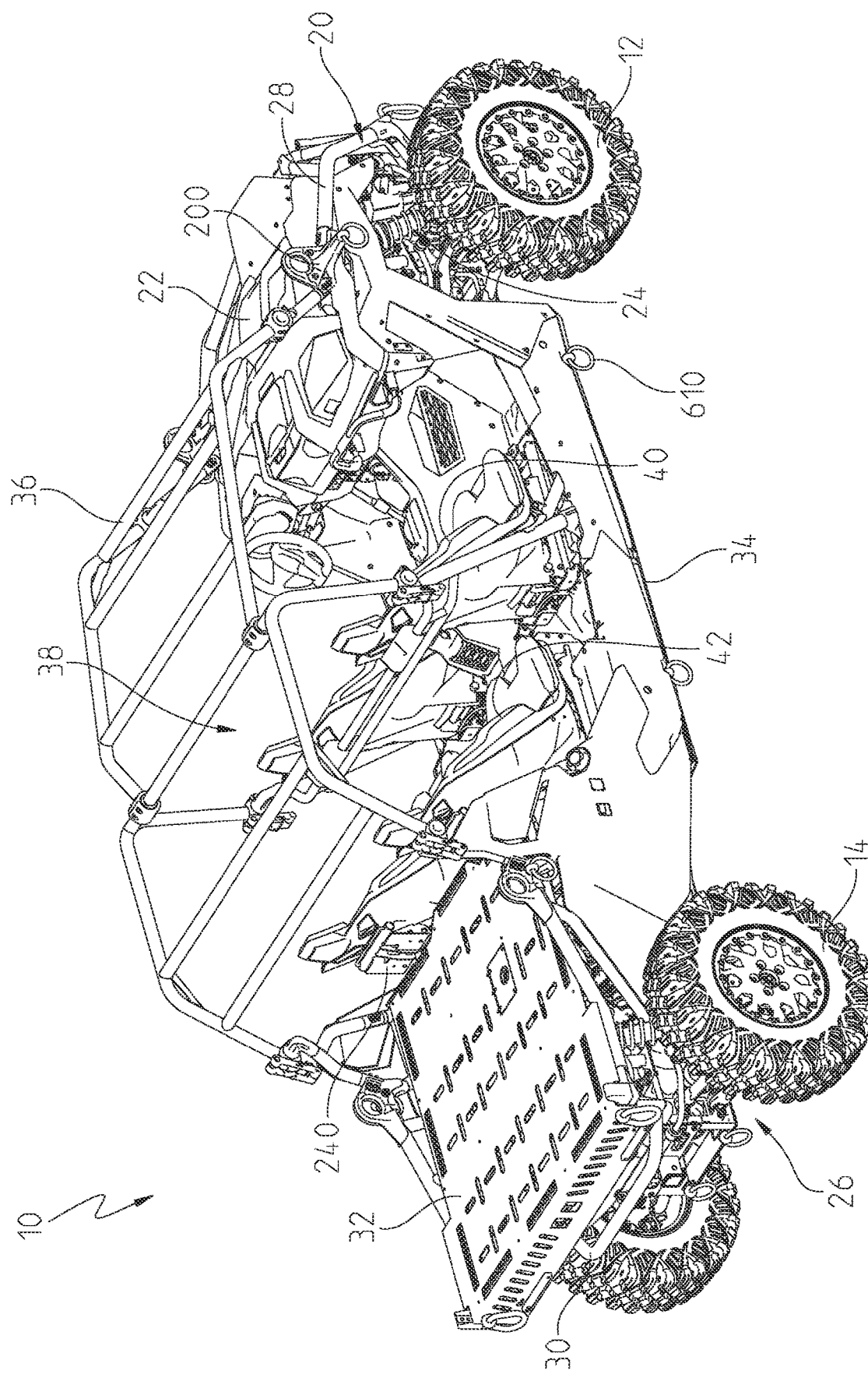
FIG. 2 is a rear right perspective view of the vehicle of FIG. 1.

Corresponding reference characters indicate corresponding parts throughout the several views. Although the drawings represent embodiments of the present invention, the drawings are not necessarily to scale and certain features may be exaggerated in order to better illustrate and explain the present invention.

DETAILED DESCRIPTION OF THE DRAWINGS

The embodiments disclosed below are not intended to be exhaustive or to limit the invention to the precise forms disclosed in the following detailed description. Rather, the embodiments are chosen and described so that others skilled in the art may utilize their teachings. While the present disclosure is primarily directed to a utility vehicle, it should be understood that the features disclosed herein may have application to other types of vehicles such as other all-terrain vehicles, motorcycles, snowmobiles, and golf carts.

Referring to FIG. 1, an illustrative embodiment of a utility vehicle 10 is shown which is configured to traverse a variety of off-road terrains, including mud, rocks, dirt, sand, and other trail or off-road conditions. Vehicle 10 may be referred to as a utility vehicle ("UTV"), an all-terrain vehicle ("ATV"), or a side-by-side vehicle ("SxS") and is configured for travel over various terrains or surfaces. Vehicle 10 may be configured for military, industrial, agricultural, or recreational applications.

Vehicle 10 includes a plurality of ground-engaging members, including front ground-engaging members 12 and rear-ground engaging members 14, a powertrain assembly 15 (FIG. 42), a driveline assembly 16 (FIG. 42), a frame assembly 20, a plurality of body panels 22 coupled to frame assembly 20, a front suspension assembly 24 supported by a front frame portion 28 of frame assembly 20, a rear suspension assembly 26 supported by a rear frame portion 30 of frame assembly 20, and a rear cargo area 32 supported by rear frame portion 30 of frame assembly 20. As shown in FIG. 1, vehicle 10 extends between front and rear ground-engaging members 12, 14 in a longitudinal direction along a longitudinal centerline L. More particularly, and as shown best in FIG. 3, frame assembly 20 is supported by front and rear ground-engaging members 12, 14 on a ground surface G and frame assembly 20 extends longitudinally between front and rear frame portions 28, 30 along longitudinal centerline L.

Frame assembly 20 includes a lower frame assembly 34 and an upper frame assembly 36. Upper frame assembly 36 extends above lower frame assembly 34 and defines an upper boundary of an operator area 38 configured to support an operator and at least one passenger. Operator area 38 includes at least one seat 40, 42, which may be a bench seat configured to support the operator and the passenger on the same seating surface, or may be bucket seats configured to individually support the operator and passenger. In the embodiments of the present disclosure, seats 40 define front seats for the operator and a front passenger and seats 42 define rear seats configured for at least two passengers. In other embodiments, vehicle 10 may include only seats 40, thereby defining a two-seater embodiment of vehicle 10. Operator area 38 also may include various operator inputs, such as a steering wheel, a gauge and/or display, a gear shifter, an accelerator pedal, a brake pedal, etc., as disclosed further herein.

Figure 10:
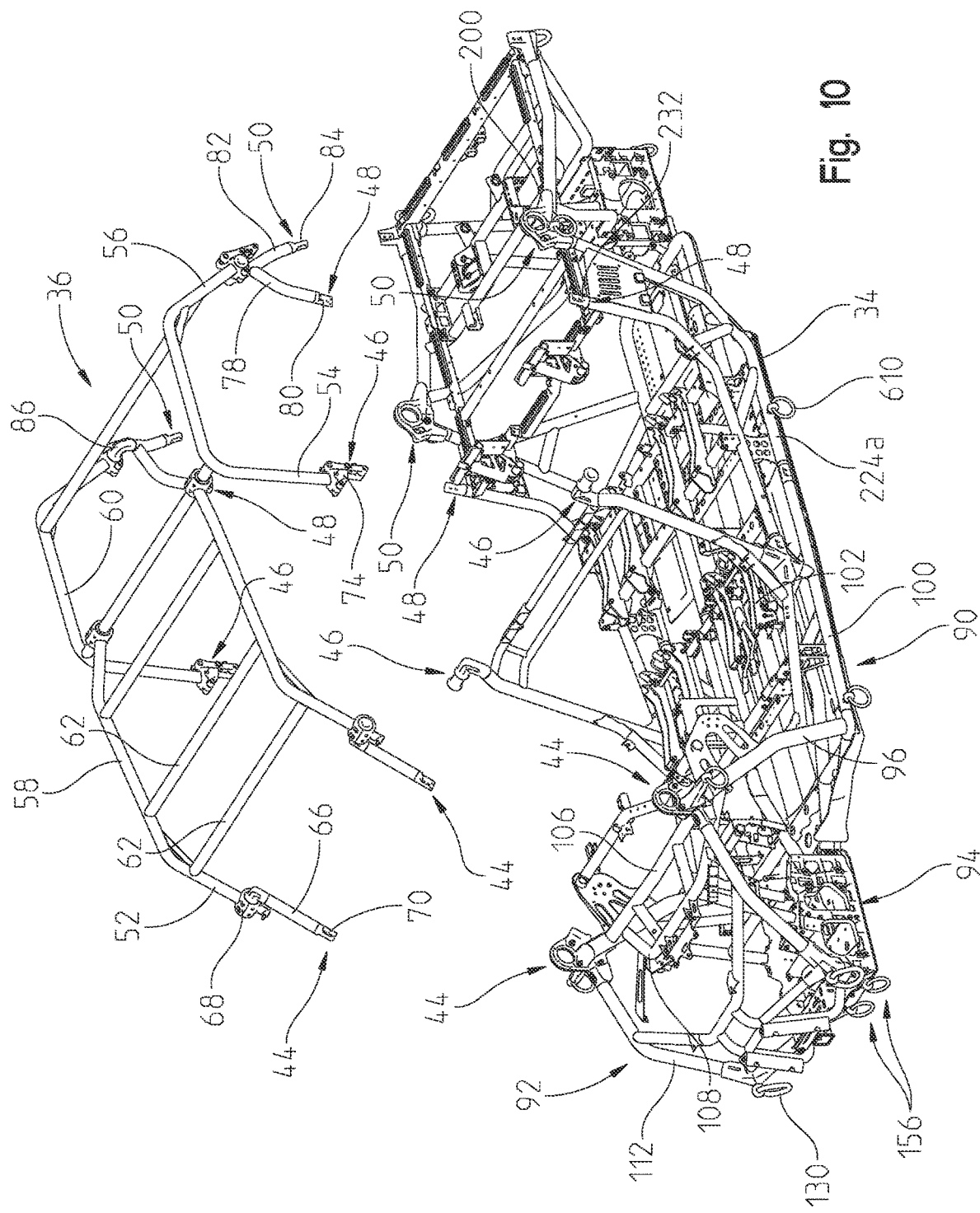
FIG. 10 is an exploded view of the frame assembly of FIG. 8.

With respect to FIGS. 8-31, frame assembly 20 is disclosed in further detail. Frame assembly 20 includes lower frame assembly 34 and upper frame assembly 36 removably coupled to each other with removable fasteners, such as bolts, screws, or other similar couplers. More particularly, and as shown best in FIG. 10, lower and upper frame assemblies 34, 36 are coupled to each other at four longitudinal mounting locations 44, 46, 48, 50. Longitudinal mounting location 44 is positioned forward of operator area 38, longitudinal mounting location 46 is positioned adjacent seats 40, longitudinal mounting location 48 is positioned adjacent seats 42, and longitudinal mounting location 50 is positioned rearward of operator area 38.

As shown best in FIGS. 8-12, upper frame assembly 36 includes forward upstanding members 52, intermediate upstanding members 54, and rearward upstanding members 56. Forward upstanding members 52 couple or are integrally formed with first longitudinally-extending members 58. At least one (illustratively, a plurality of) front cross-member 62 extends between first longitudinally-extending members 58 and/or forward upstanding members 52. Additionally, intermediate and rearward upstanding members 54, 56 couple or are integrally formed with second longitudinally-extending members 60. At least one (illustratively, a plurality of) rear cross-member 64 extends between second longitudinally-extending members 60.

Referring still to FIGS. 8-12, forward upstanding members 52 are coupled to extension members 66 through forward pivot joints 68. Extension members 66 are generally upstanding members extending between forward pivot joints 68 and a forward coupler 70. Forward coupler 70 defines longitudinal mounting location 44 for coupling upper frame assembly 36 to lower frame assembly 34. First longitudinally-extending members 58 are coupled to rear cross-member 64 through second pivot joints 72.

As shown in FIGS. 8-12, intermediate upstanding members 54 intersect with second longitudinally-extending members 60 at a location generally laterally adjacent second pivot joints 72. Intermediate upstanding members 54 terminate at clamps 74. Clamps 74 are configured to extend around a frame member of lower frame assembly 34 and define longitudinal mounting location 46.

Rearward upstanding members 56 terminate at second clamps 76 which also are configured to extend around a frame member of lower frame assembly 34. Second clamps 76 couple with extension members 78 and 82. More particularly, and as shown best in FIG. 11, second clamps 76 each include an elbow or curved coupler 86 which is coupled with extension members 82. Extension members 82 terminate with couplers 84 which define longitudinal mounting location 50. Extension members 78 extend from a portion of extension members 82 and extend forwardly of extension members 82. Extension members 78 terminate with couplers 80 which define longitudinal mounting locations 48.

Figure 11:
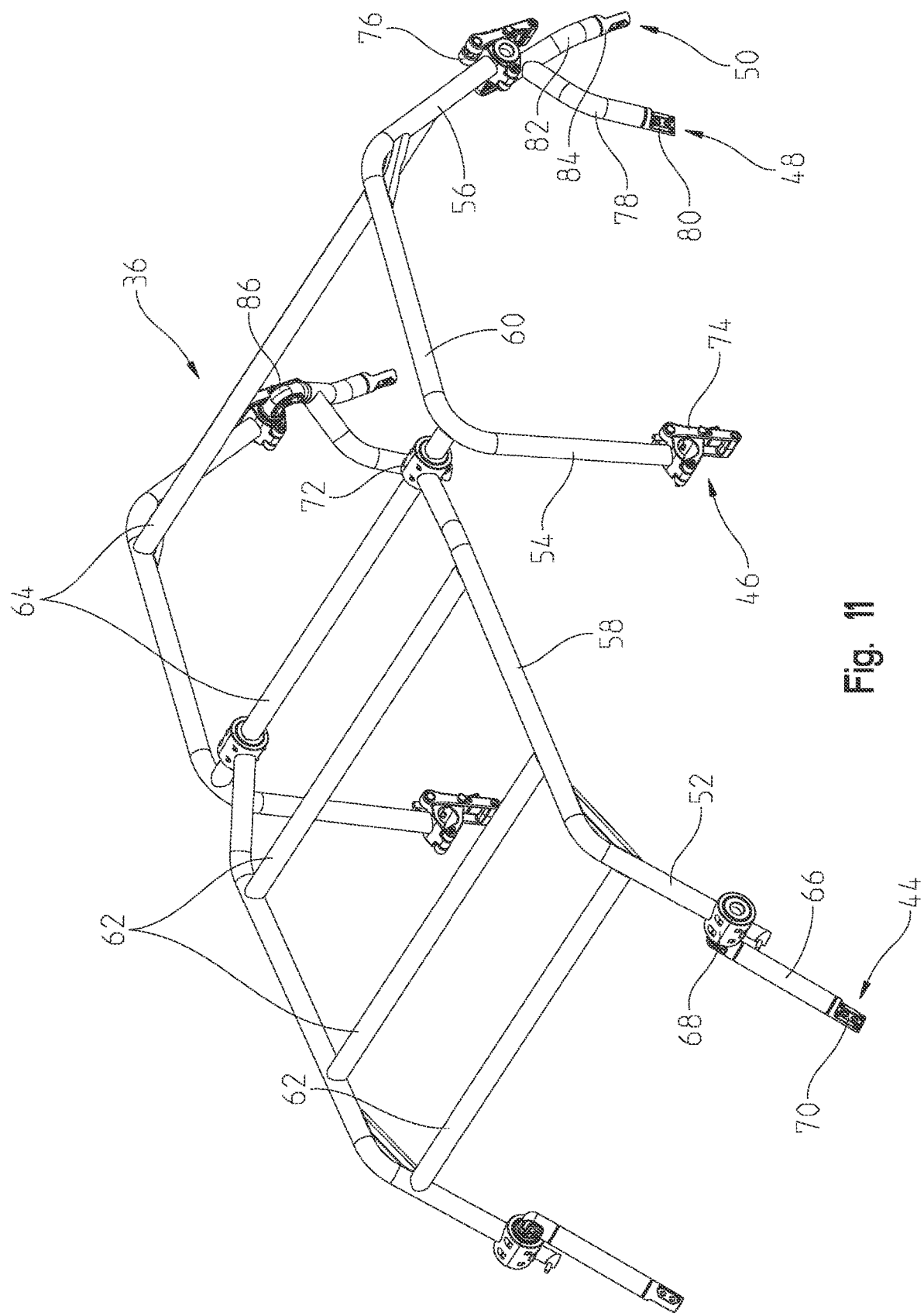
FIG. 11 is a front left perspective view of the upper frame assembly of the frame assembly of FIG. 10.
Figure 12:
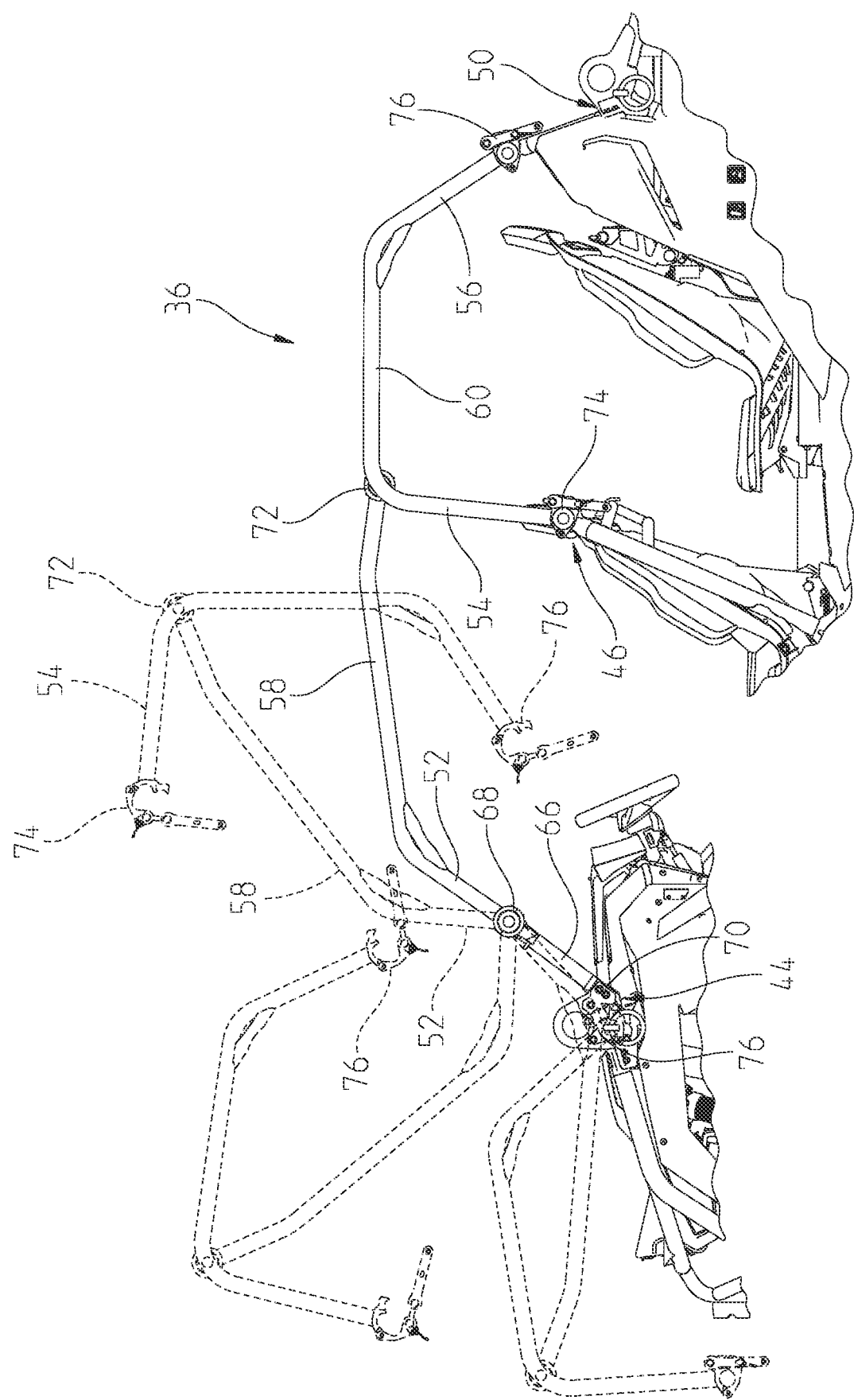
FIG. 12 is a left side view of the upper frame assembly of FIG. 11 during movement between an upright position and a collapsed.

In operation, and referring to FIG. 12, there may be circumstances where it is desirable to fold upper frame assembly 36 such that it does not extend over operator area 38 and seats 40, 42. For example, during transport of vehicle 10, it may be desirable to fold down or collapse upper frame assembly 36. As such, upper frame assembly 36 is configured to move between an upright position, as shown in solid lines in FIG. 12 (see also FIGS. 1-11), and a collapsed position, as shown in dashed lines in FIG. 12. To move upper frame assembly 36 to the collapsed position, second clamps 76 are released or opened and removed from lower frame assembly 34. Second clamps 76 are then moved forwardly and towards intermediate upstanding members 54. First clamps 74 also are released or opened and removed from lower frame assembly 34. With clamps 74 opened, intermediate upstanding members 54, rearward upstanding members 56, second longitudinally-extending members 60, and rear cross-members 64 collectively pivot forwardly about pivot joint 72 towards forward upstanding members 52 such that second longitudinally-extending members 60 are positioned below first longitudinally-extending members 58. Finally, upper frame assembly 36 rotates forward about pivot joints 68 and rests on a hood 574 of vehicle 10. When upper frame assembly 36 is in the collapsed position, clamp 76 may be coupled around a portion of lower frame assembly 34, as disclosed further herein, thereby positively securing upper frame assembly 36 in the collapsed position without the need for additional ropes, cables, or other devices to maintain upper frame assembly 36 in the collapsed position. In this collapsed position, operator area 38, including seats 40 and 42, remains clear and can be used to support people or cargo when upper frame assembly 36 is in the collapsed position. Additionally, in the collapsed position, the height of vehicle 10 relative to ground surface G (FIG. 3) may be less than 60 inches.

Additional details of upper frame assembly 36 and other aspects of vehicle 10 are disclosed in U.S. Pat. No. 8,998,253, issued on Apr. 7, 2015, and entitled "FOLDING CAB FRAME," the complete disclosure of which is expressly incorporated by reference herein.

Figure 13:
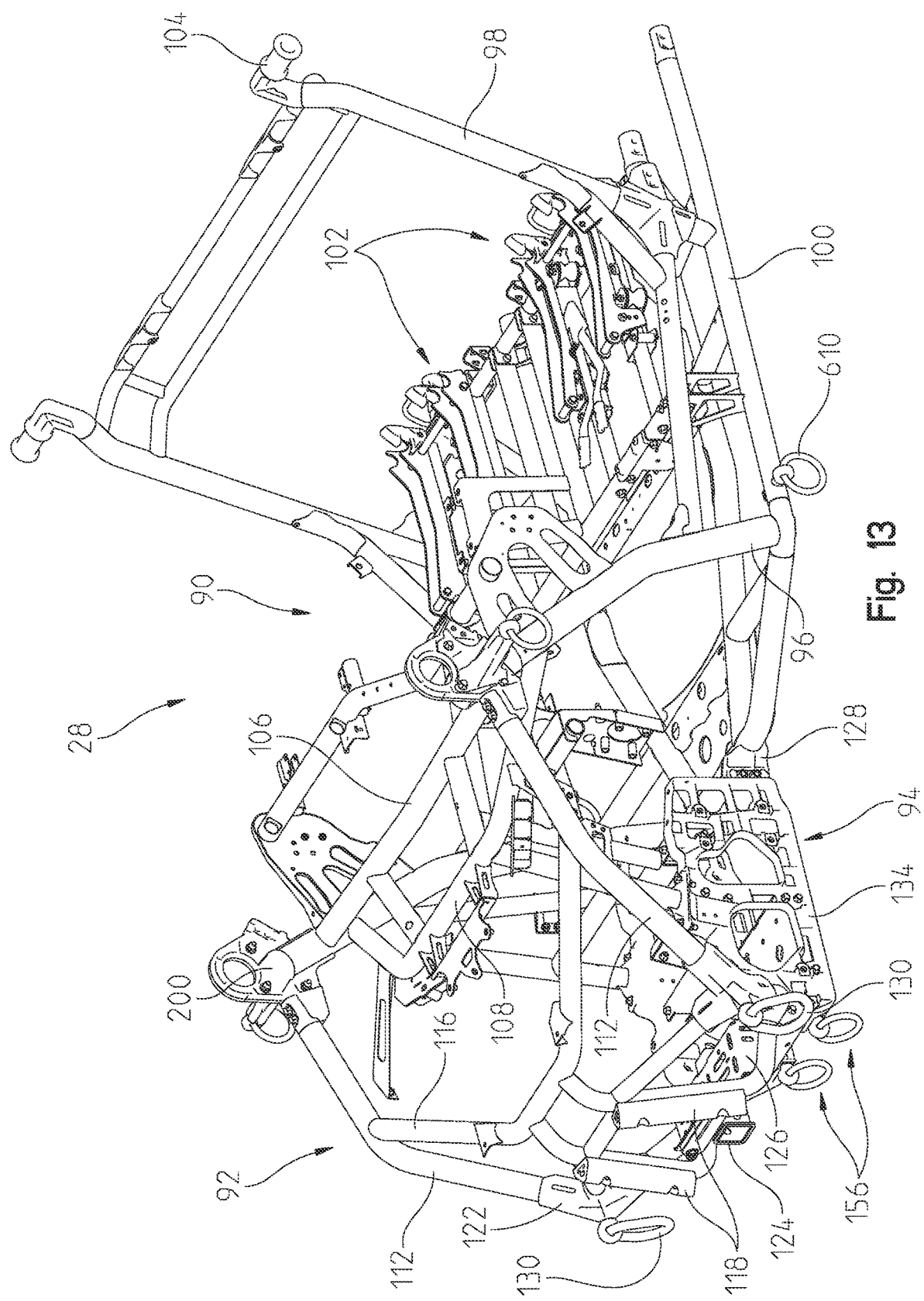
FIG. 13 is a front left perspective view of a front frame portion of the lower frame assembly of the frame assembly of FIG. 8.
Figure 14:
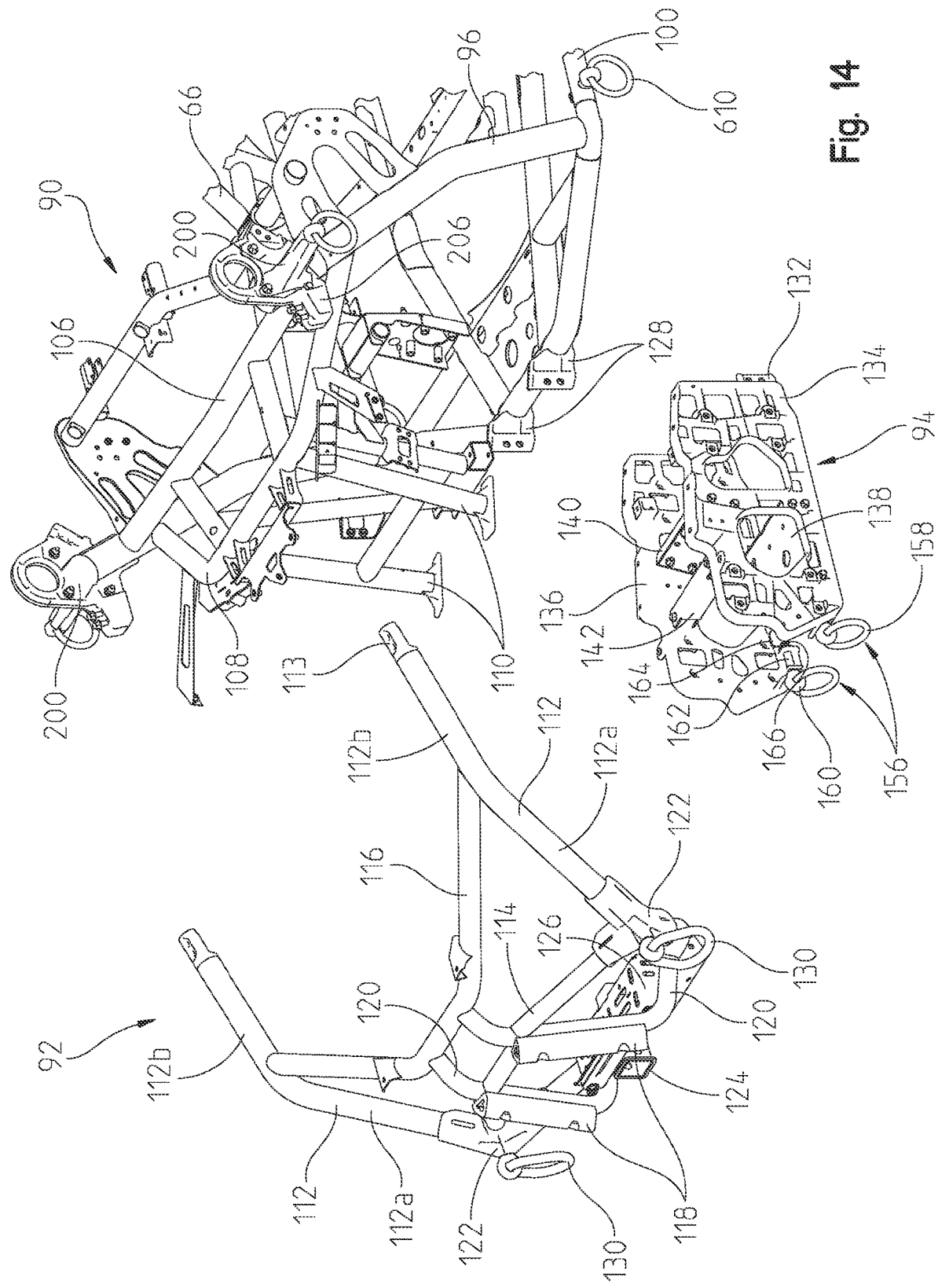
FIG. 14 is an exploded view of the front frame portion of FIG. 13.

Referring to FIGS. 13 and 14, front frame portion 28 of lower frame assembly 34 is disclosed. Front frame portion 28 includes a main frame portion 90, a removable sub-frame assembly 92, and a front clip assembly 94. Main frame portion 90 includes first upstanding members 96 and second upstanding members 98 coupled together through longitudinally-extending members 100. Main frame portion 90 supports seats 40 (FIG. 1) through seat support assemblies 102. Additionally, second upstanding members 98 may support a portion of seats 40, such as a seat back thereof. Further, second upstanding members 98 include extension 2 104 for coupling with clamps 74 of intermediate upstanding members 54 of upper frame assembly 36 (FIG. 11). In one embodiment, extensions 104 extend laterally outward from second upstanding members 98.

Referring still to FIGS. 13 and 14, first upstanding members 96 are coupled together through a first cross member 106 and a second cross member 108. A plurality of upstanding members 110 also may be coupled to at least second cross member 108. Cross members 108, 110 and/or upstanding members 110 may be configured to support components of vehicle 10, such as components of a cooling system, a steering system, etc.

As shown in FIGS. 13 and 14, sub-frame assembly 92 is removably coupled to main frame portion 90 and may be configured as an exoskeleton and/or bumper assembly positioned outward of body panels 22 and/or hood 574. More particularly, sub-frame assembly 92 includes front frame members 112 which are comprised of upstanding portion 112a and longitudinally-extending portion 112b. Illustratively, upstanding portion 112a may be angled rearwardly and laterally and longitudinally-extending portion 112b extends rearwardly from upstanding portion 112a. Longitudinally-extending portion 112b is configured to couple with main frame portion 90.

Sub-frame assembly 92 also includes a plurality of cross members, illustratively cross members 114 and 116, which are coupled to front frame members 112. Sub-frame assembly 92 also includes bumpers 118 coupled to frame members 120. Frame members 120 extend between cross member 116 and braces 122. Braces 122 receive a lower end of front frame members 112 and also receive an outer end of cross members 114. As is also shown in FIGS. 13 and 14, sub-frame assembly 92 also may include a hitch receiver or connection 124 configured for towing applications.

Braces 122 are configured to support mounting members 130, illustratively tie-down mounts and/or tow mounts. Mounting members 130 are positioned at the forward-most extent of frame assembly 20. Additionally, mounting members 130 are positioned vertically intermediate an upper extent and a lower extent of frame assembly 20 and, more particularly, are vertically intermediate an upper extent and a lower extent of front frame portion 28 of lower frame assembly 34. In this way, mounting members 130 are configured for various transportation options, such as tying down vehicle 10 for aircraft travel.

It may be appreciated that mounting members 130 are integrated into frame assembly 20 for increased support of the load at mounting members 130 and a possible distribution of the load throughout lower frame assembly 34. More particularly, frame assembly 20 extends to the location of mounting members 130 such that frame assembly 20 itself supports the load at mounting members 130, rather than supporting the load at mounting members 130 with a non-structural portion of vehicle 10. Illustratively, because sub-frame assembly 92 is directly coupled to main frame portion 90, any load at mounting members 130 may be supported by various components of lower frame assembly 34.

Referring still to FIGS. 13 and 14, front clip assembly 94 is coupled to both main frame portion 90 and sub-frame assembly 92. More particularly, front clip assembly 94 couples with a bracket 126 of sub-frame assembly 92 and flanges 128 of main frame portion 90. Illustratively, front clip assembly 94 includes flanges 132 which are configured to couple with flanges 128. Front clip assembly 94 may be comprised of a plurality of cast metallic components coupled together or may be formed as a single cast component.

Figure 15:
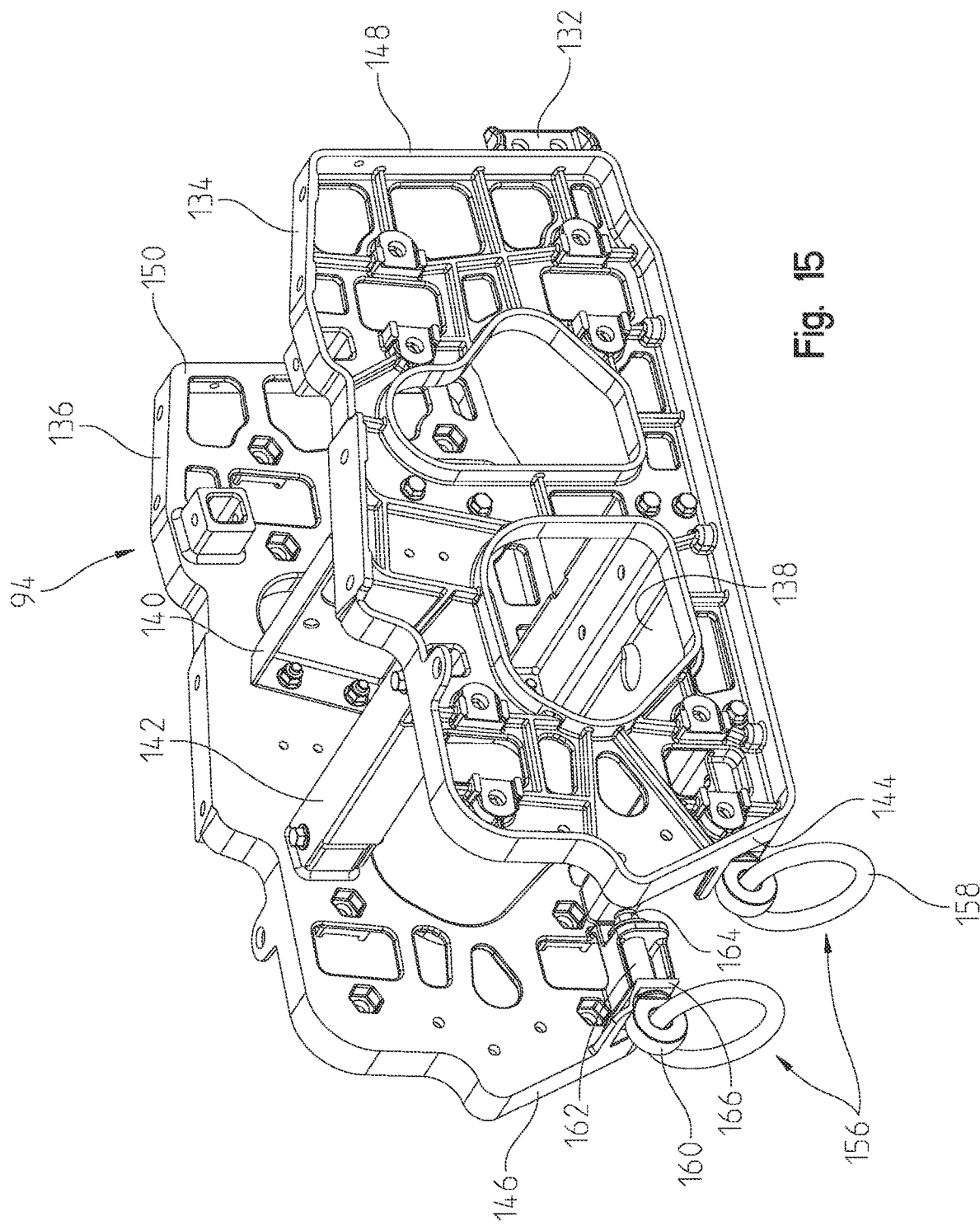
FIG. 15 is a front left perspective view of a front drive mount of the front frame portion of FIG. 13.
Figure 16:
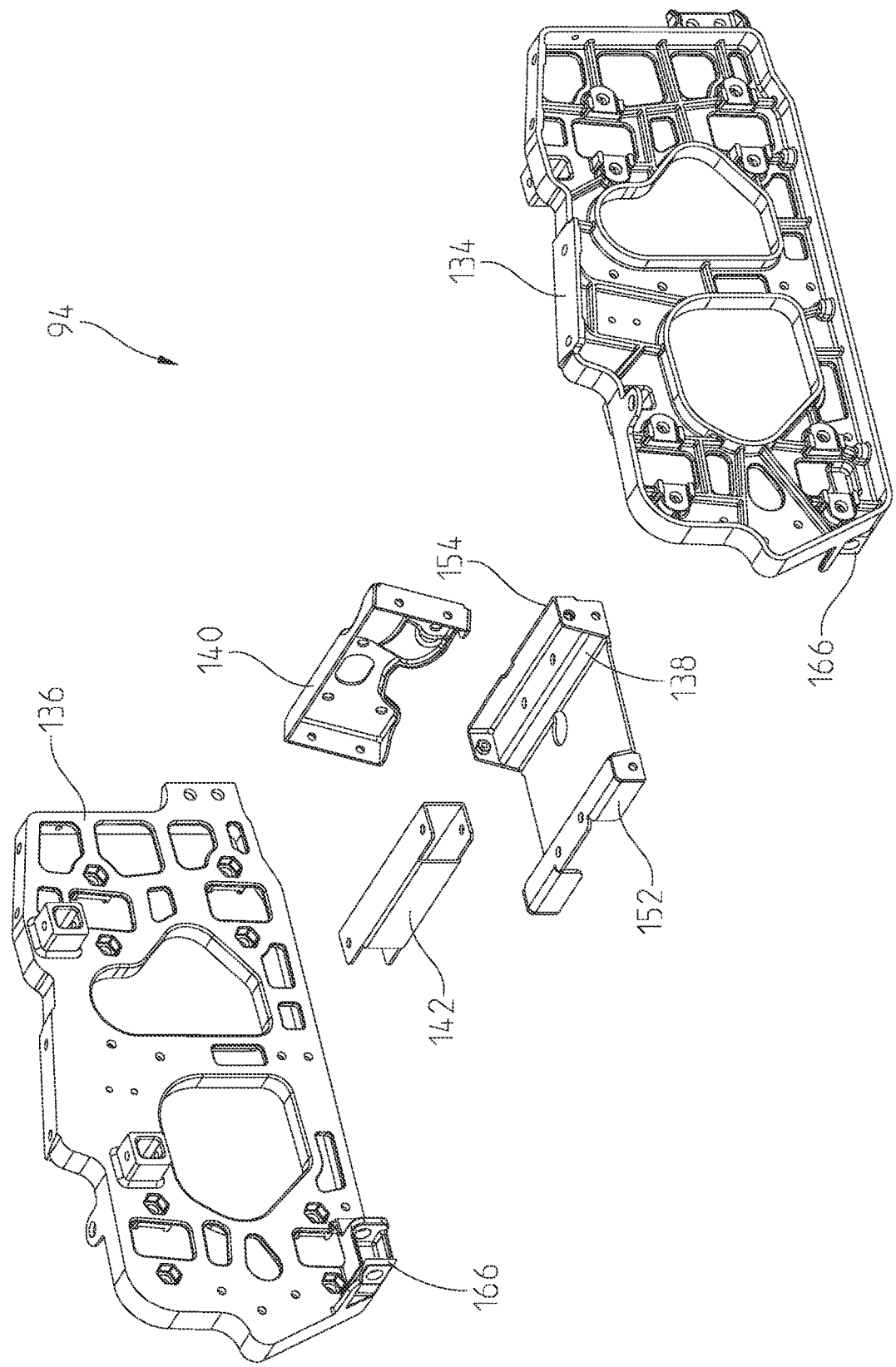
FIG. 16 is an exploded view of the front drive mount of FIG. 15.

As shown best in FIGS. 15 and 16, front clip assembly 94 is comprised of a first member 134, a second member 136, a support plate 138, a rear bracket 140, and a front bracket 142. First and second members 134, 136 extend generally longitudinally between respective forward ends 144, 146 and respective rearward ends 148, 150. First and second members 134, 136 are generally parallel to each other and each of support plate 138, rear bracket 140, and front bracket 142 extends laterally between first and second members 134, 136 and is removably coupled thereto.

More particularly, support plate 138, rear bracket 140, and front bracket 142 are coupled to at least the inner surfaces of first and second members 134, 136. Front bracket 142 is positioned above a front portion 152 of support plate 138 and rear bracket 140 is positioned above a rear portion 154 of support plate 138. As such, front and rear brackets 142, 140 are laterally aligned with portions of first and second members 134, 136 and are vertically aligned with portions of support plate 138. Support plate 138 also is laterally aligned with portions of first and second members 134, 136. Support plate 138 and brackets 140, 142 may be configured to support or otherwise couple with additional components of vehicle 10, such as portions of powertrain assembly 15, driveline assembly 16, front suspension assembly 24, and/or the steering system.

Referring still to FIGS. 15 and 16, front clip assembly 94 includes mounting members 156 coupled to forward ends 144, 146 of respective first and second members 134, 136. Illustratively, mounting members 156 may be configured as mounting rings or other tie-down structures (e.g., pins, brackets, etc.) 158 coupled to a support member 160 having a sleeve 162 configured to receive a removable fastener 164 (e.g., bolt or screw). Support member 160 is received within a bracket 166 of first and second members 134, 136 of front clip assembly 94. Mounting members 156 are configured to support large loads and may be configured to support vehicle during transport (e.g., may be configured as tie-down members to secure vehicle 10 in an aircraft or other transportation). Like mounting members 130 (FIG. 14), mounting members 156 are integrated into a portion of frame assembly 20 and, as such, loads at mounting members 156 may be distributed through lower frame assembly 34. Additionally, mounting members 156 are positioned at the lowest extent of frame assembly 20 and, therefore, are easily accessible for applications requiring low mounting locations on vehicle 10.

Figure 17:
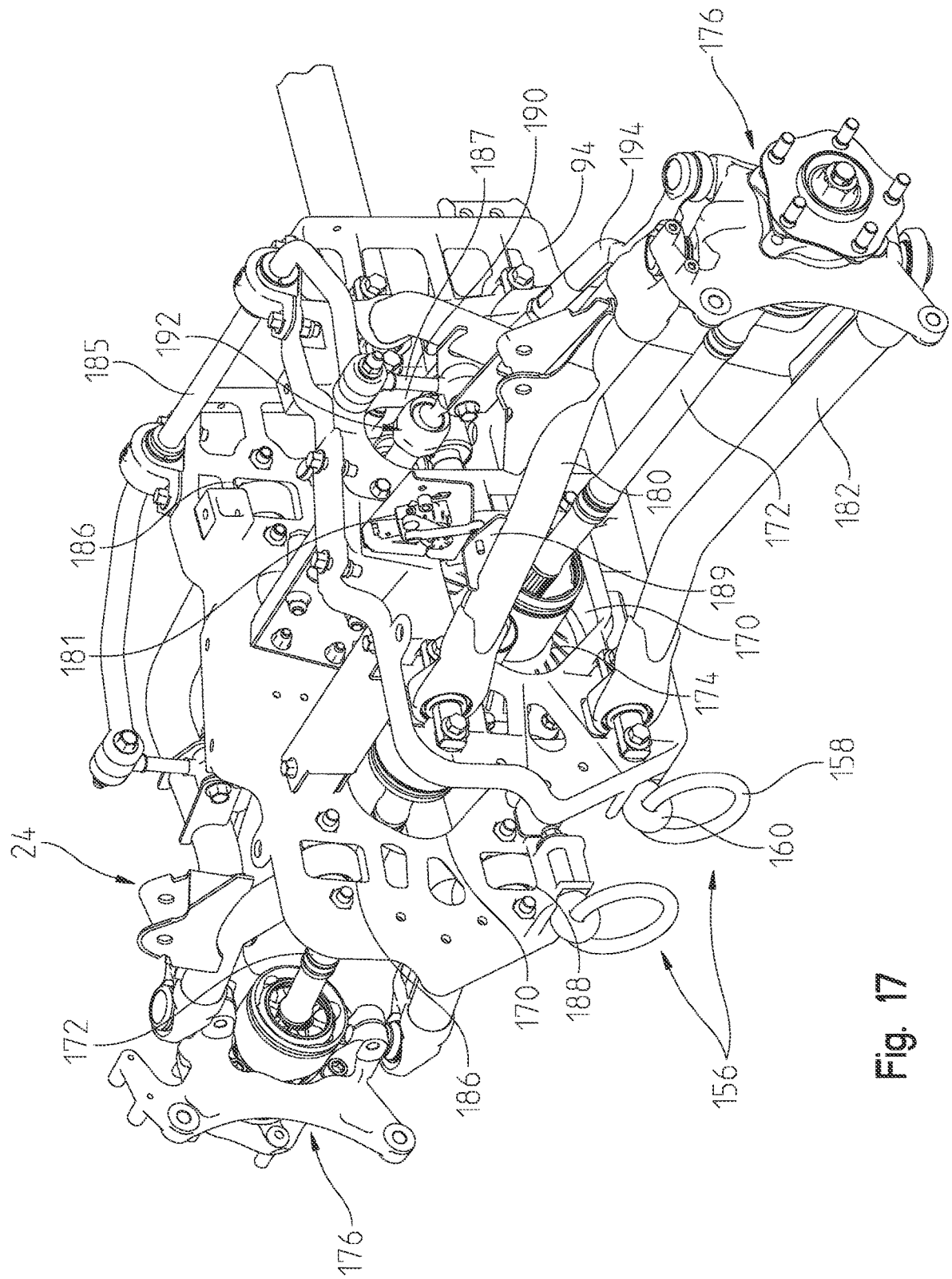
FIG. 17 is a front left perspective view of the front drive mount and a front suspension assembly of the vehicle of FIG. 1.
Figure 18:
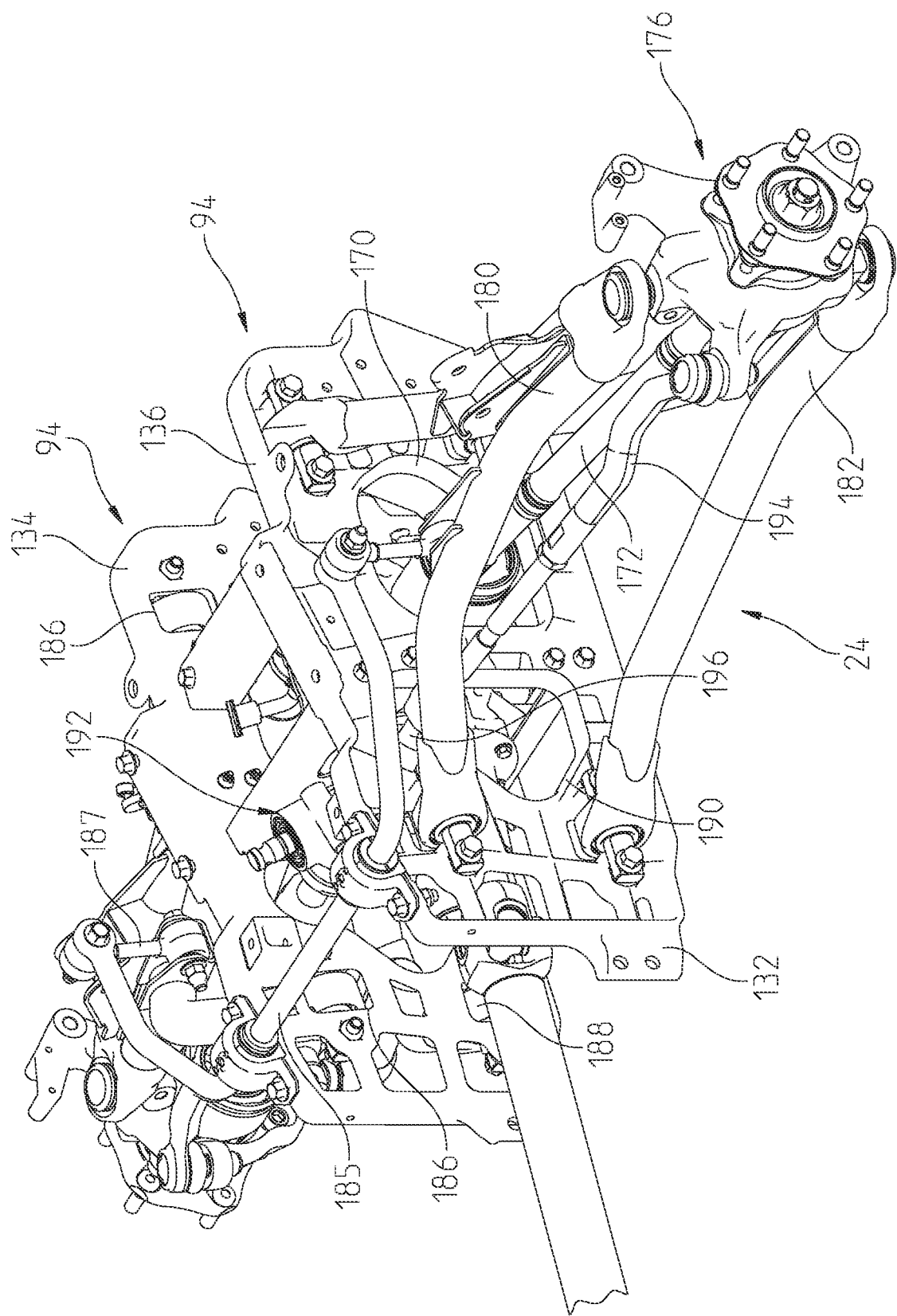
FIG. 18 is a rear right perspective view of the front drive mount and the front suspension assembly of FIG. 17.
Figure 19:
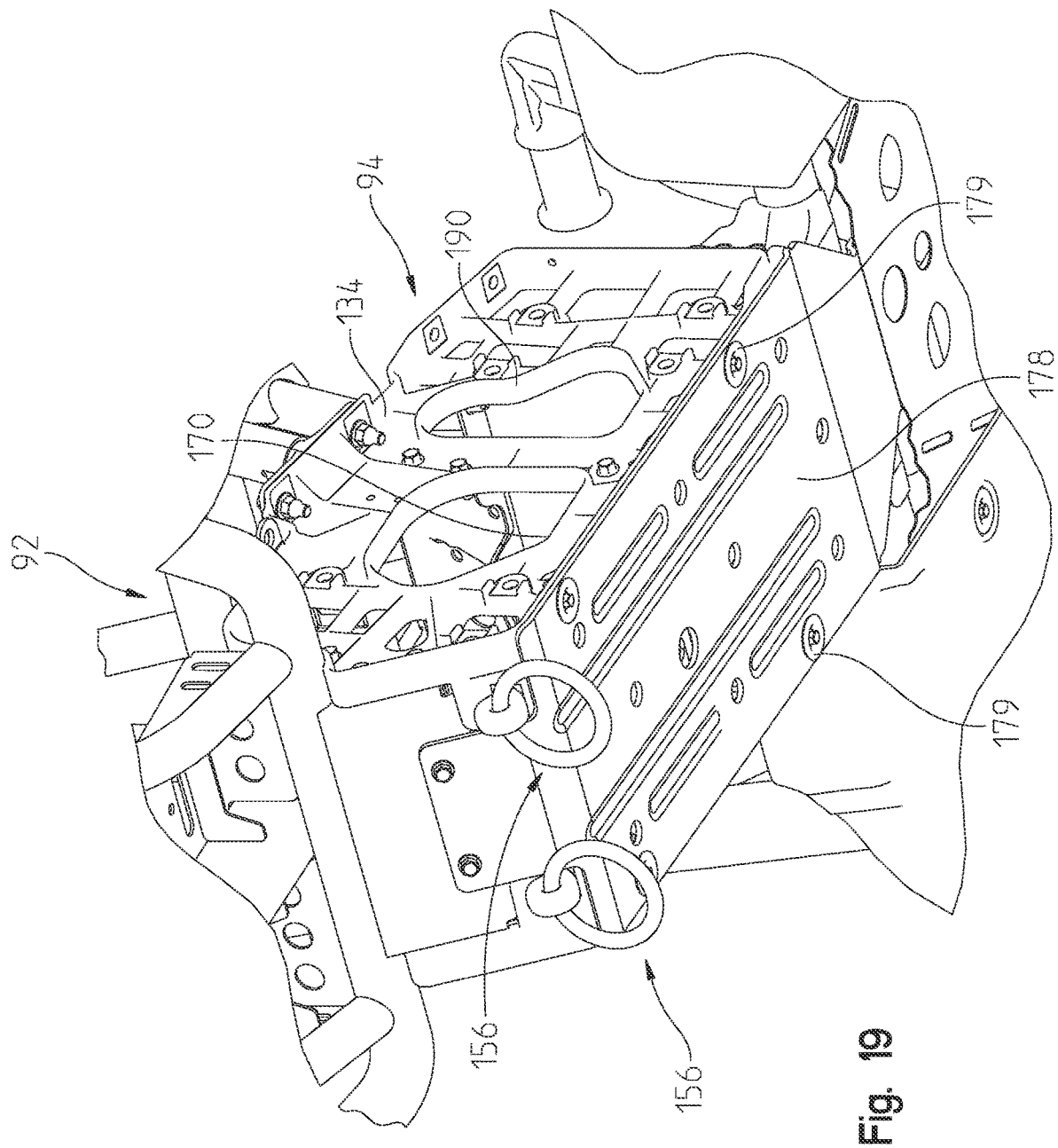
FIG. 19 is a front left perspective view of an underside of the front drive mount of FIG. 17.

Referring now to FIGS. 17-19, front clip assembly 94 includes a plurality of apertures or openings. As disclosed herein, a plurality of such openings is configured to receive or act as a pass-through for additional components or systems of vehicle 10; however, other openings are present in front clip assembly 94 to decrease the weight thereof. More particularly, each of first and second members 134, 136 includes an opening 170 which is configured to allow half shaft or drive axles 172 to extend through. A front differential or drive gear 174 of driveline assembly 16 of vehicle 10 is supported on at least support plate 138 of front clip assembly 94 and half shafts 172 extend from front differential 174 to front ground-engaging members 12. Illustratively, half shafts 172 are operably coupled to a knuckle 176 of front ground-engaging members 12.

As shown best in FIG. 19, a front plate 178 may be coupled to front clip assembly 94 at a position directly below support plate 138 to further support at least front differential 174. Front plate 178 may be removably coupled to front clip assembly 94 and/or other components of front frame portion 28 with removable fasteners 179 such that front plate 178 may be easily removed for access to front differential 174. As such, front plate 178 protects and supports front differential 174 but also provides quick access thereto for servicing or replacing front differential 174. In one embodiment, fasteners 179 extend into a lower surface of first and second members 134, 136 for coupling front plate 178 to front clip assembly 94. In alternative embodiments, an isolation mount may be used to support front differential 174.

Front clip assembly 94 is further configured to support at least a portion of front suspension assembly 24. Front suspension assembly 24 is comprised of upper control arms 180, a sensor 181 operably coupled to each upper control arm 180, lower control arms 182, shock absorbers 184 (FIG. 1), and a torsion bar 185 operably coupled to upper control arms 180 through link arms 187. As shown in FIGS. 17 and 18, each sensor 181 is coupled to a bracket 189 of upper control arm 180 and is configured to sense the movement of upper control arm 180. Sensor 181 is positioned on both sides of front suspension assembly 24 and, more particularly, each upper control arm 180 includes an individual sensor 181 to determine movement of each upper control arm 180. As disclosed further herein, sensors 181 allow for independent measurement of the movement of both of upper control arms 180 and may cooperate with a suspension adjustment system. Front suspension assembly 24 may include additional sensors positioned anywhere within front suspension assembly 24.

Torsion bar 185 also may be coupled to an upper surface of first and second members 134, 136. Outer ends of upper and lower control arms 180, 182 are coupled to knuckle 176 and inner ends of upper and lower control arms 180, 182 are coupled to first and second members 134, 136 of front clip assembly 94. Illustratively, each of first and second members 134, 136 includes an opening 186 configured to at least partially receive the inner ends of upper control arms 180. Similarly, each of first and second members 134, 136 includes an opening 188 configured to at least partially receive the inner ends of lower control arms 182.

Referring still to FIGS. 17-19, first and second members 134, 136 of front clip assembly 94 also include an opening 190 configured to allow steering arms 194 of a steering system 192 to pass through. More particularly, inner ends of steering arms 194 are operably coupled to a steering member 196 (e.g., a rack and pinion) and outer ends of steering arms 194 are operably coupled to knuckle 176. Steering member 196 is supported within front clip assembly 94 and, illustratively, is supported between the inner surfaces of first and second members 134, 136. Therefore, to allow steering arms 194 to extend between steering member 196 and knuckle 176, first and second members 134, 136 include openings 190.

Based on at least FIGS. 17-19, it may be appreciated that front clip assembly 94 of frame assembly 20 is configured to support multiple components and systems of vehicle 10. For example, front clip assembly 94 is configured to support mounting members 156, support front differential 174, support components of front suspension assembly 24, and support components of steering system 192. To ensure that all above-mentioned components and systems are supported on front clip assembly 94 and do not interfere with each other, various components are offset from each other. For example, steering arms 194 are positioned generally longitudinally rearward of control arms 180, 182 and half shafts 172. Half shafts 172 are positioned vertically intermediate upper and lower control arms 180, 182. Additionally, torsion bar 185 extends rearwardly from upper control arm 180 and is positioned above steering arms 194, half shafts 172, and upper and lower control arms 180, 182.

Front clip assembly 94 further defines a "break" point of lower frame assembly 34 such that if front frame portion 28 hits an obstacle or is otherwise damaged, front clip assembly 94 be damaged but damage to main frame portion 90 and/or other components of lower frame assembly 34 is prevented.

Figure 20:
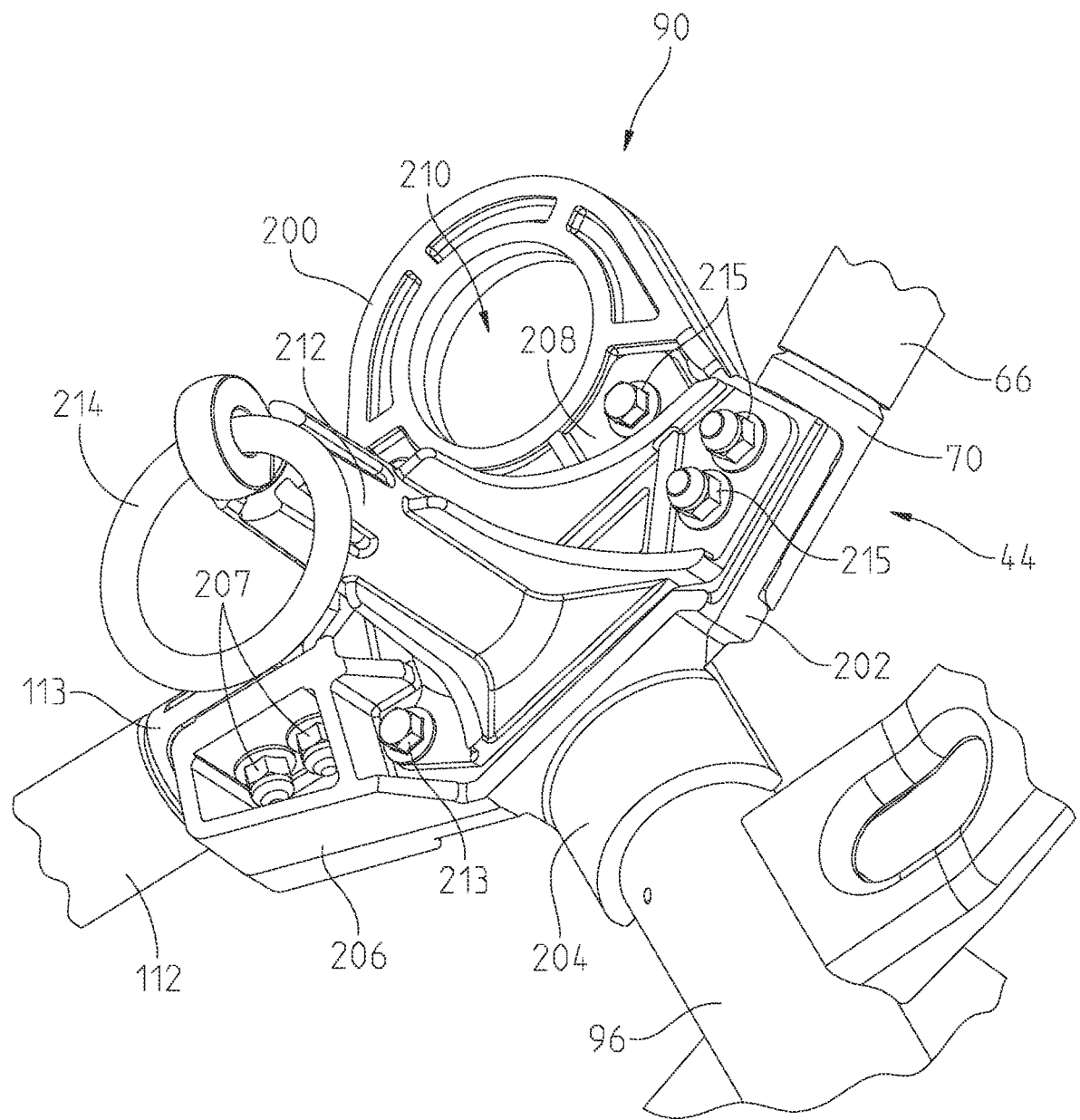
FIG. 20 is a rear left perspective view of a tie-down member of the front frame portion of lower frame assembly of FIG. 8.
Figure 21:
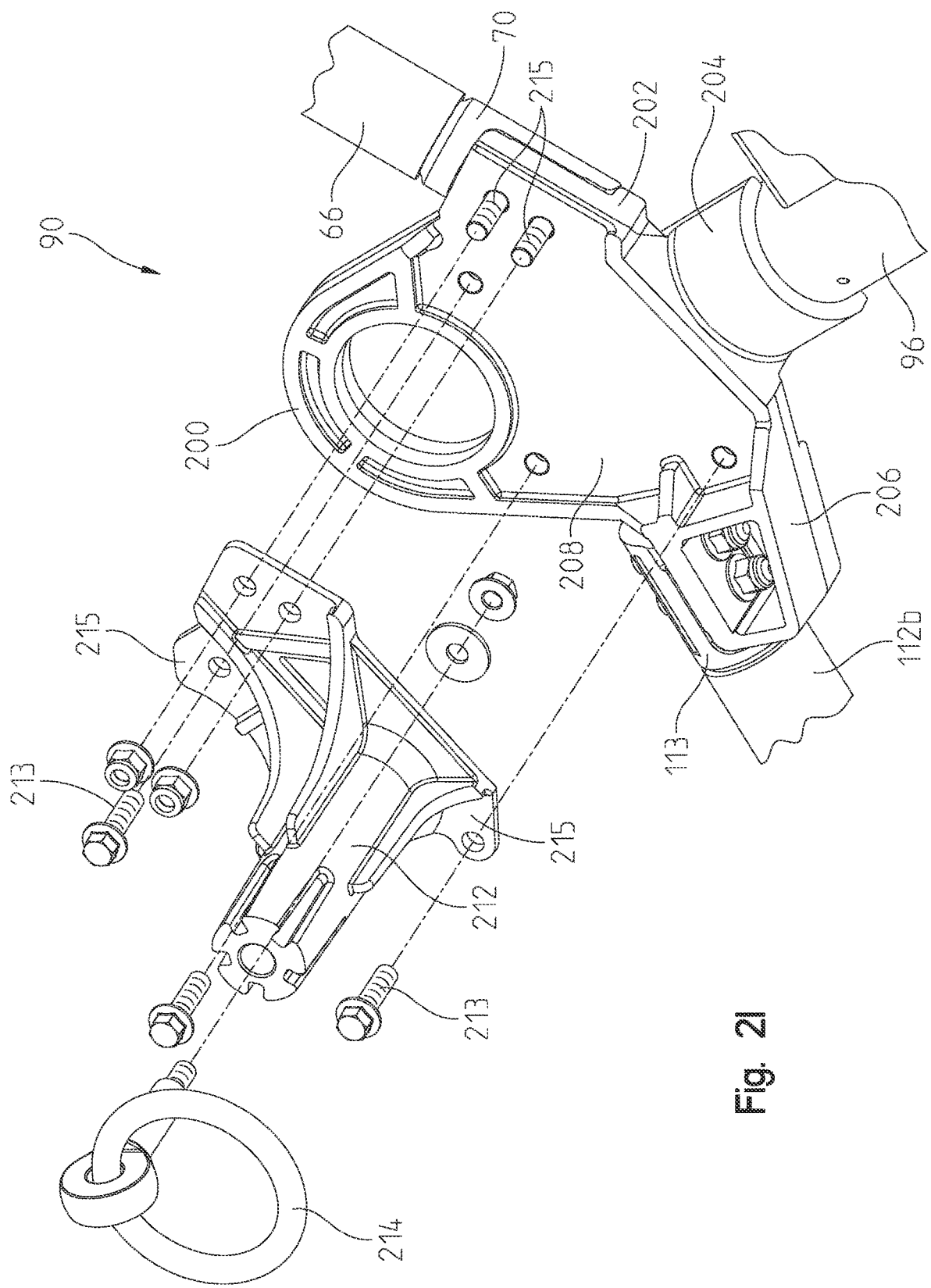
FIG. 21 is an exploded view of the tie-down member of FIG. 20.

Referring to FIGS. 20 and 21, front frame portion 28 further includes mounting members which, as with mounting members 130 and 156, are configured to support a load and are configured as tie-downs for transporting vehicle 10. Illustratively, a mounting assembly 200 is coupled to front frame members 112, specifically longitudinally-extending portions 112b, first upstanding members 96, and extension members 66 of upper frame assembly 36. More particularly, mounting assembly 200 includes a coupler 202 having a shape complementary to that of forward coupler 70 of extension members 66. Coupler 202 is configured to be removably coupled to forward coupler 70 with removable fasteners.

Mounting assembly 200 also includes a receiver 204 configured to couple with first upstanding member 96 and, more particularly, may be configured to receive a portion of first upstanding member 96. First upstanding member 96 may be fixedly coupled to receiver 204 through welds, adhesives, rivets, or any other permanent coupling mechanism.

Mounting assembly 200 further includes a coupler 206 configured to be removably coupled with longitudinally-extending portions 112b using removable fasteners 207, such as bolts or screws. Coupler 206 is positioned forward of receiver 204 and coupler 202 and extends generally horizontally.

Referring still to FIGS. 20 and 21, mounting assembly 200 also includes a body portion 208 extending upwardly from couplers 202, 206 and receiver 204. In one embodiment, body portion 208, couplers 202, 206, and receiver 204 are integrally formed together. Body portion 208 includes an aperture 210 which is configured as a tie-down member and may be used to support loads on frame assembly 20 and/or secure vehicle 10 during transport.

Mounting assembly 200 includes a protrusion 212 which extends laterally outward from body portion 208. Protrusion 212 may be integrally formed with body portion 208 or may be removably coupled to body portion 208. Illustratively, protrusion 212 is removably coupled to body portion 208 with fasteners 213 received through openings on flanges 215 of protrusion 212. It is possible that some of fasteners 213 are configured to also couple body portion 208 with various frame members of lower frame assembly 34. For example, as shown best in FIG. 21, fasteners 213 are configured to extend through coupler 70, body portion 208, and flange 215 of protrusion 212 in order to couple all three components together using the same fasteners.

Protrusion 212 is configured with a tie-down member 214, which is illustratively shown as a tie-down ring but may be provided in another configuration. Tie-down member 214 is configured to support a load and/or may be used for securing vehicle 10 during transport. It may be appreciated that mounting assembly 200 is part of lower frame assembly 34 and is directly coupled to several different frame members. As such, any load at mounting assembly 200 may be supported by or distributed through lower frame assembly 34. In this way, it is not necessary for any other structure to be included on vehicle 10 to couple mounting assembly 200 with frame assembly 20.

Protrusion 212 also is configured to receive clamp 76 of upper frame assembly 36 when upper frame assembly 36 is in the collapsed position, shown in FIG. 12. More particularly, clamp 76 is secured about protrusion 212 when upper frame assembly 36 is in the collapsed position, thereby positively securing or locking upper frame assembly 36 in the collapsed position without the need for additional cables or ropes to maintain this position.

Figure 22:
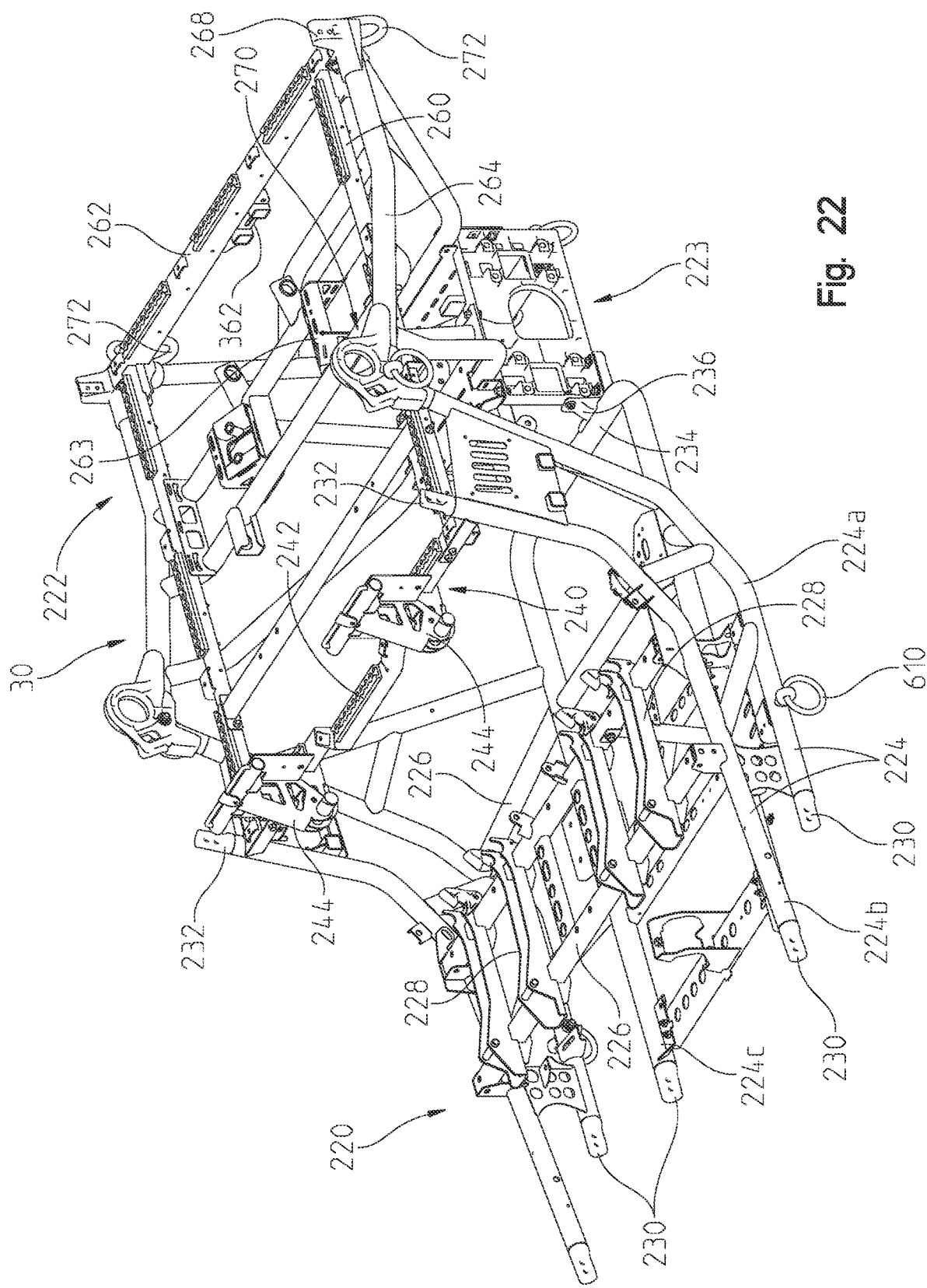
FIG. 22 is a front left perspective view of a rear frame portion of the lower frame assembly of FIG. 8.
Figure 23:
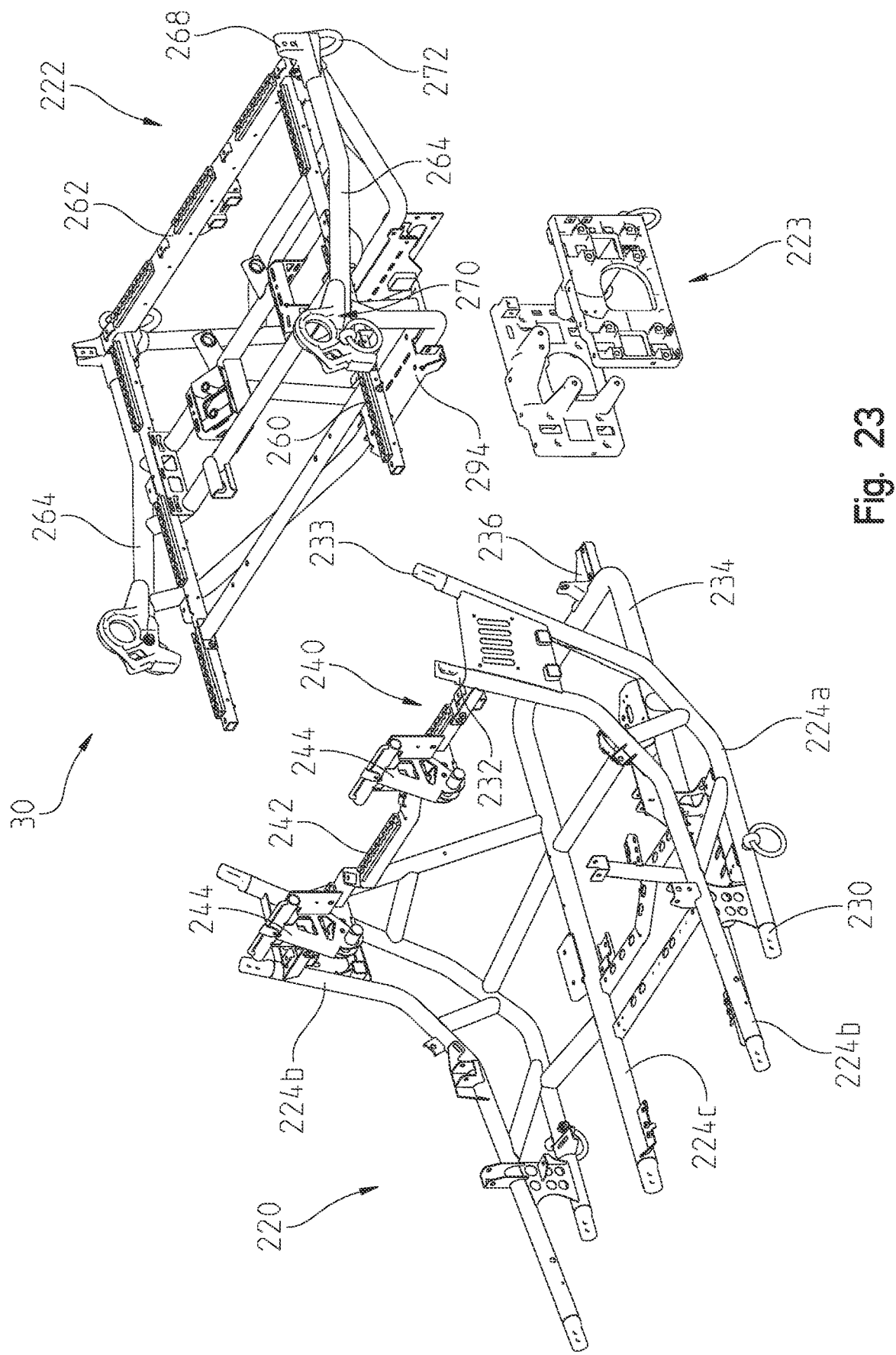
FIG. 23 is an exploded view of the rear frame portion of FIG. 22.

Referring now to FIGS. 22 and 23, rear frame portion 30 is disclosed. Rear frame portion 30 includes a main frame portion 220, a cargo frame assembly 222, and a rear clip assembly 223. Main frame portion 220 includes a plurality of longitudinally-extending members 224, a plurality of cross-members 226, and seat supports 228 configured to support rear seats 42 (FIG. 1). More particularly, cross-members 226 extend laterally between longitudinally-extending members 224 and are generally parallel with each other.

Figure 8:
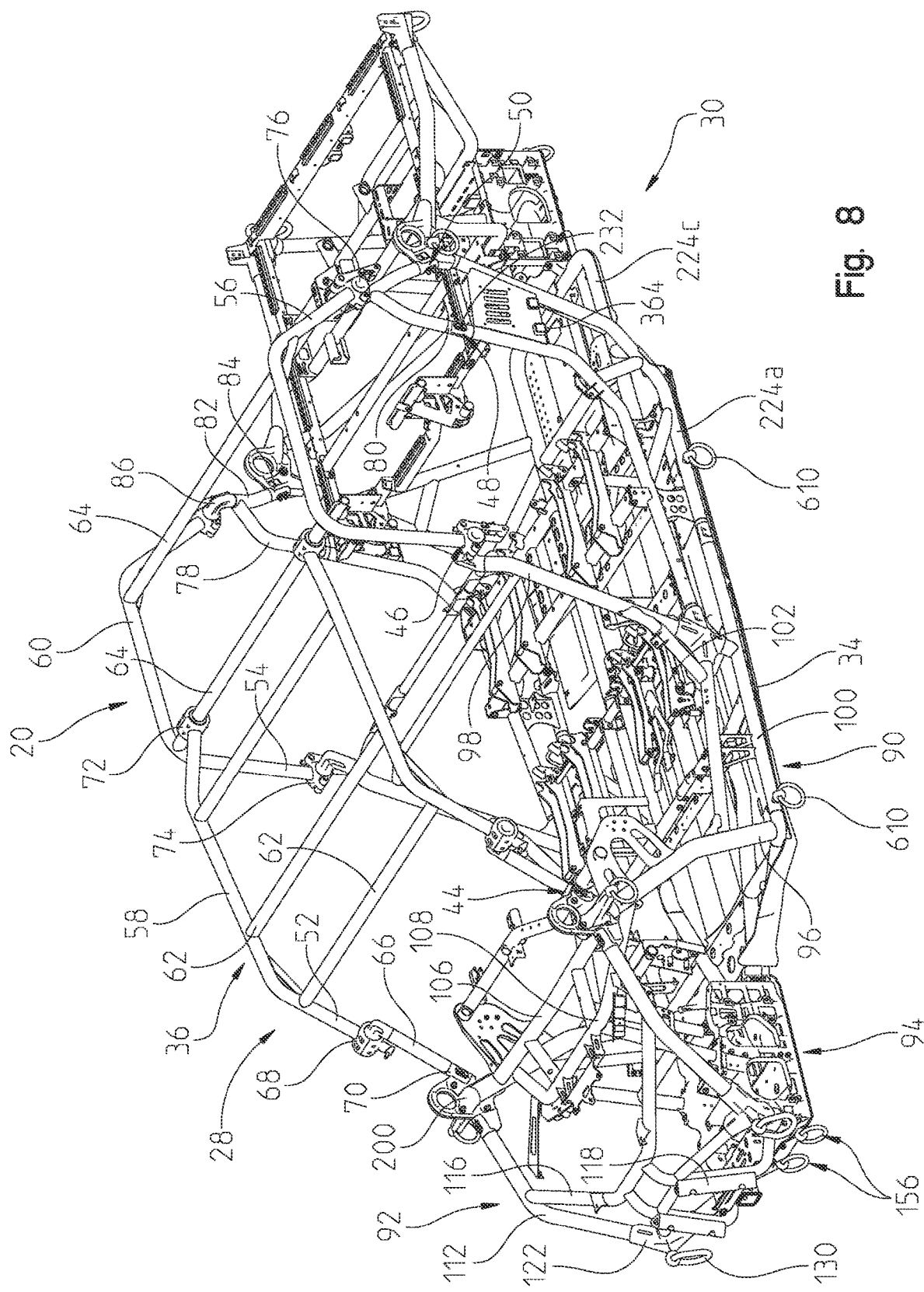
FIG. 8 is a front left perspective view of a frame assembly, including an upper frame assembly and a lower frame assembly, of the vehicle of FIG. 1.
Figure 9:
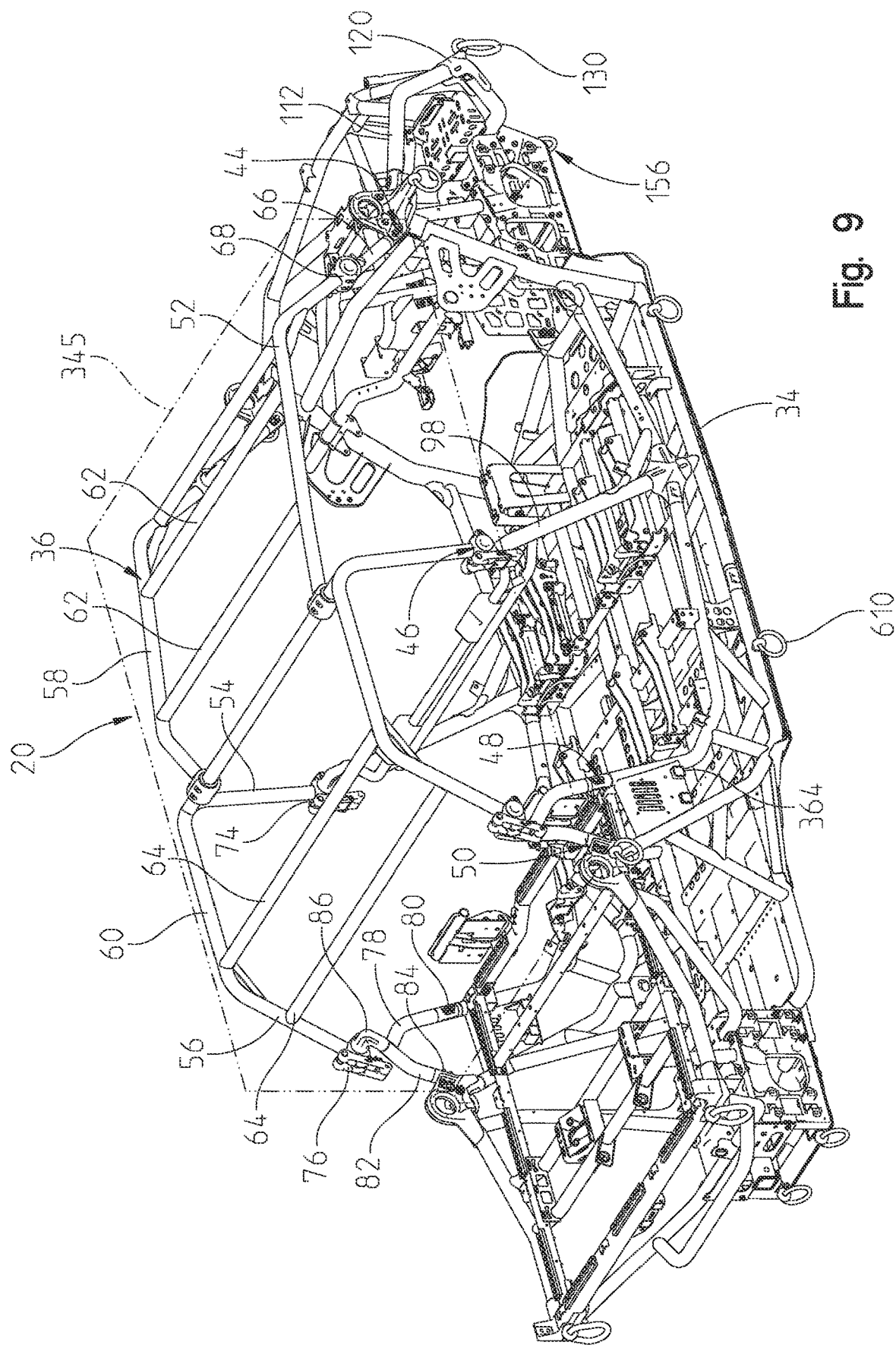
FIG. 9 is a rear right perspective view of the frame assembly of FIG. 8.

Longitudinally-extending members 224 include at least first longitudinally-extending members 224a, second longitudinally-extending members 224b, and third longitudinally-extending members 224c. In one embodiment, second longitudinally-extending members 224b are positioned at a vertical height relative to ground surface G (FIG. 3) relative to first and third longitudinally-extending members 224a, 224c. Each of longitudinally-extending members 224 includes a coupler 230 configured to couple with complementary couplers of main frame portion 90 of front frame portion 28. First longitudinally-extending members 224a are coupled with a mounting assembly, as disclosed further herein. Additionally, second longitudinally-extending members 224b includes a coupler 232 which extends upwardly and is configured to couple with coupler 80 of upper frame assembly 36 such that couplers 80, 232 define mounting location 48 (FIG. 8).

Third longitudinally-extending members 224c extend to a position rearward of at least second longitudinally-extending members 224b and may be joined together at a cross-member 234. In one embodiment, second longitudinally-extending members 224b and cross-member 226 may be integrally formed together; however, in other embodiments, second longitudinally-extending members 224b may be removably coupled from cross-member 234. Cross-member 234 includes a coupling bracket 236 configured to couple with rear clip assembly 223.

As shown in FIGS. 22-25, main frame portion 220 further includes a seat harness assembly 240 for supporting a shoulder belt for seats 40, 42. While seat harness assembly 240 is shown adjacent rear seats 42, in various embodiments, front seats 40 also include seat harness assembly 240 and, therefore, the invention disclosed herein is not to be limited to only rear seats 42. In one embodiment, seat harness assembly 240 is positioned rearward of seats 40, 42 and below an upper portion of seats 40, 42 and a height compliant with various recommendations for operation of the shoulder belt.

Figure 24:
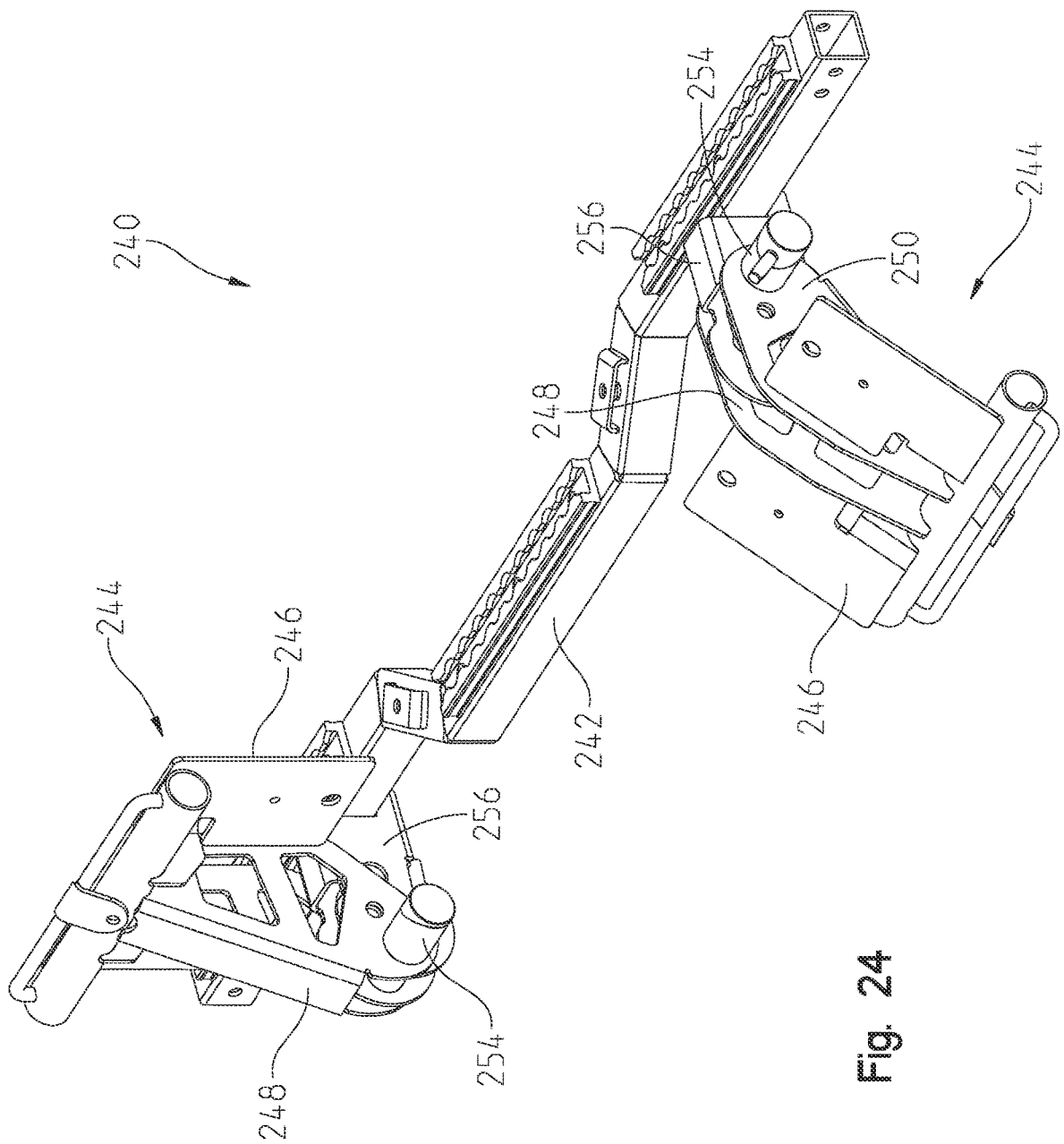
FIG. 24 is a rear right perspective view of seat harness mounts of the rear frame portion of FIG. 22 and showing a first seat harness mount in an upright position and a second seat harness mount in a folded position.

Seat harness assembly 240 includes a cross-member 242 coupled to second longitudinally-extending members 224b. Cross-member 242 may be comprised of a plurality of tube or frame members or may be formed as a single component. Cross-member 242 supports a plurality of harness mounts 244 which are configured to receive a shoulder belt or harness for seats 40, 42. Illustrative harness mounts 244 are pivotably coupled to cross-member 242 such that harness mounts 244 may be in an upright position (as shown in FIGS. 22-23 and the right-side harness mount 244 in FIG. 24) or may be pivoted to a folded or collapsed position (as shown in FIG. 24 with the left-side harness mount 244). More particularly, and as shown best in FIG. 25, each of harness mounts 244 includes a harness body 246 for the shoulder belt/harness (not shown) and an arm 248 coupled to harness body 246 which includes a flange 250. Flange 250 includes at least one aperture 252 configured to receive a pin 254 which may be a spring-loaded pin. Flange 250 and pin 254 are configured to mate with a bracket 256 on cross-member 242. Bracket 256 includes apertures 259 which align with apertures 252 to also receive pin 254. Pin 254 and apertures 252, 259 collectively define a detent system for maintaining the position of harness body 246. Aperture 258 is configured to align with axis of rotation R such that harness body 246 pivots about axis of rotation R and aperture 258.

Figure 25:
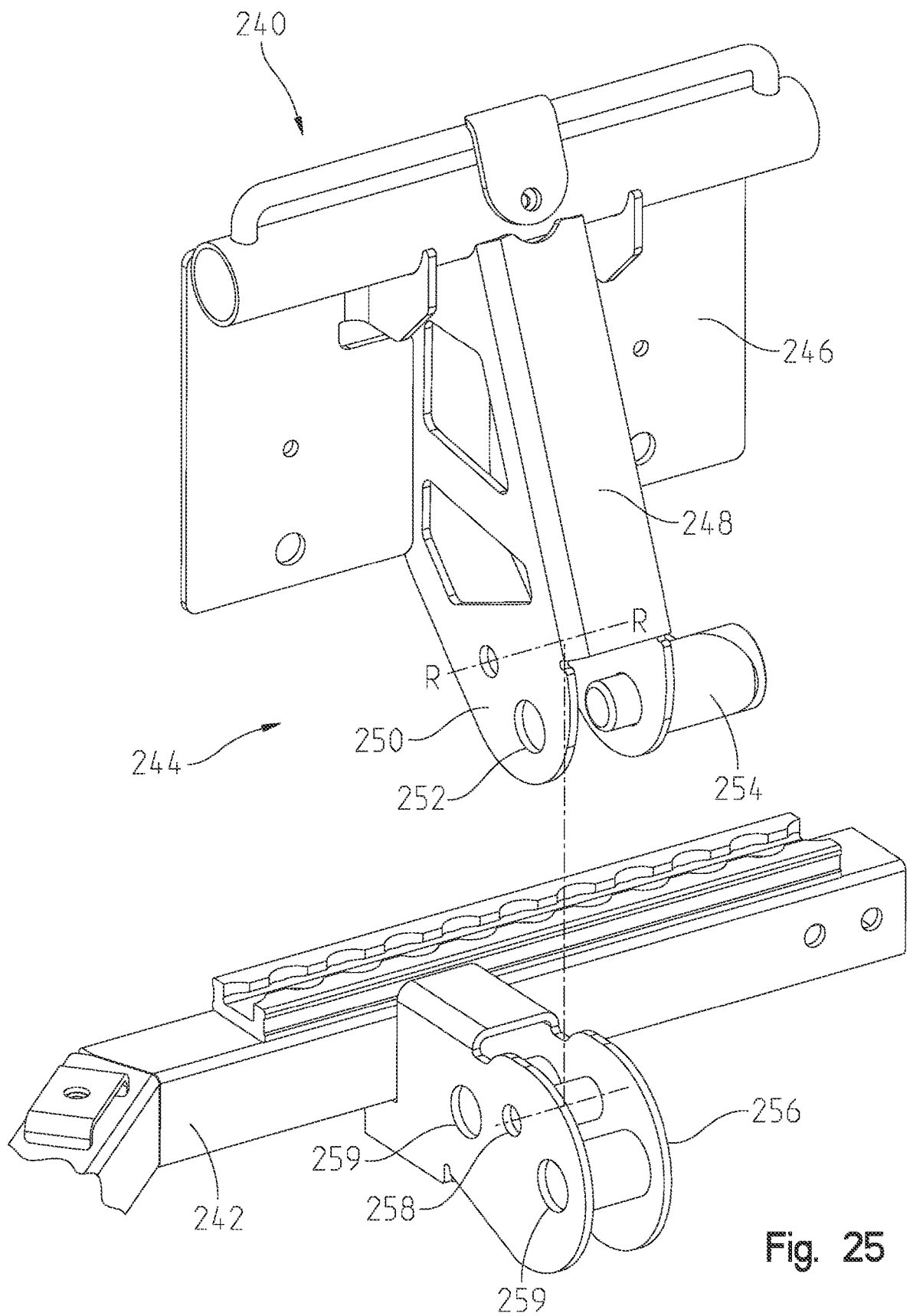
FIG. 25 is an exploded view of one of the seat harness mounts of FIG. 24.

As such, harness body 246 is configured to pivot or rotate relative to bracket 256 in order to move between the upright position and the folded position. When pin 254 is rotated or pulled out of its seated/locked position, harness body 246 may rotate to the folded position. Once harness body 246 is in the desired position, pin 254 is rotated to the locked position to maintain the position of harness body 246. It may be appreciated that, as shown in FIG. 25, pin 254, extending through aperture 258, is offset from axis of rotation R of harness body 246 to provide the ability to lock harness body 246 in various desired positions. The ability to pivot harness mount 244 allows for a flat surface to extend from rear cargo area 32 into operator area 38 when any of seats 40, 42, and illustratively when rear seats 42, are removed in situations requiring extended cargo capacity for vehicle 10. It may be appreciated that the shoulder harness rotates with harness body 246. For example, if vehicle 10 includes both front seats 40 and rear seats 42, rear cargo area 32 may be extended into operator area 38 by removing rear seats 42 from vehicle 10 and moving harness bodies 246 corresponding to rear seats 42 into the folded position in order extend a cargo platform 266 to a position immediately adjacent front seats 40. However, if vehicle 10 includes only front seats 40, rear cargo area 32 may be extended into operator area 38 by removing the passenger seat 40 along the right side of vehicle 10 and moving the corresponding harness body 246 for the passenger seat into the folded position. In this way, a smaller cargo platform similar may extend laterally along the operator seat 40 to increase the size of cargo area 32 when the passenger seat is removed.

Referring to FIGS. 22 and 23, cargo frame assembly 222 is configured to couple with main frame portion 220 at a position rearward of seat harness assembly 240. Cargo frame assembly 222 includes longitudinally-extending members 260 and a plurality of cross-members, including a rear cross-member 262. Longitudinally-extending members 260 and rear cross-member 262 are configured to support a cargo bed, platform, or surface 266 (FIGS. 1 and 32) for carrying cargo and/or passengers on vehicle 10.

Cargo frame assembly 222 further includes outer frame members 264 positioned laterally outward of longitudinally-extending members 260, engine mounts 263, and rear cross-member 262. Outer frame members 264 extend generally longitudinally between a rear bracket 268 and a mounting assembly 270. Rear bracket 268 includes a tie-down member 272, illustratively a tie-down ring, configured to support a load and/or secure vehicle 10 during transport. Because rear bracket 268 defines a portion of outer frame members 264, any load applied to tie-down member 272 of rear bracket 268 is supported by lower frame assembly 34.

A forward end of outer frame members 264 includes mounting assembly 270. Mounting assembly 270 is coupled to first longitudinally-extending members 224a, outer frame members 264, and extension members 82 of upper frame assembly 36. More particularly, and as shown best in FIGS. 26 and 27, mounting assembly 270 includes a coupler 274 having a shape complementary to that of coupler 84 of extension members 82. Coupler 274 is configured to be removably coupled to coupler 84 with removable fasteners 276.

Mounting assembly 270 also includes a receiver 278 configured to couple with outer frame member 264 and, more particularly, may be configured to receive a portion of outer frame member 264. Outer frame member 264 may be fixedly coupled to receiver 278 through welds, adhesives, rivets, or any other permanent coupling mechanisms.

Mounting assembly 270 further includes a coupler 280 configured to be removably coupled with a coupler 232 of first longitudinally-extending member 224a. Couplers 233, 280 may be joined together with removable fasteners, such as bolts or screws.

Figure 26:
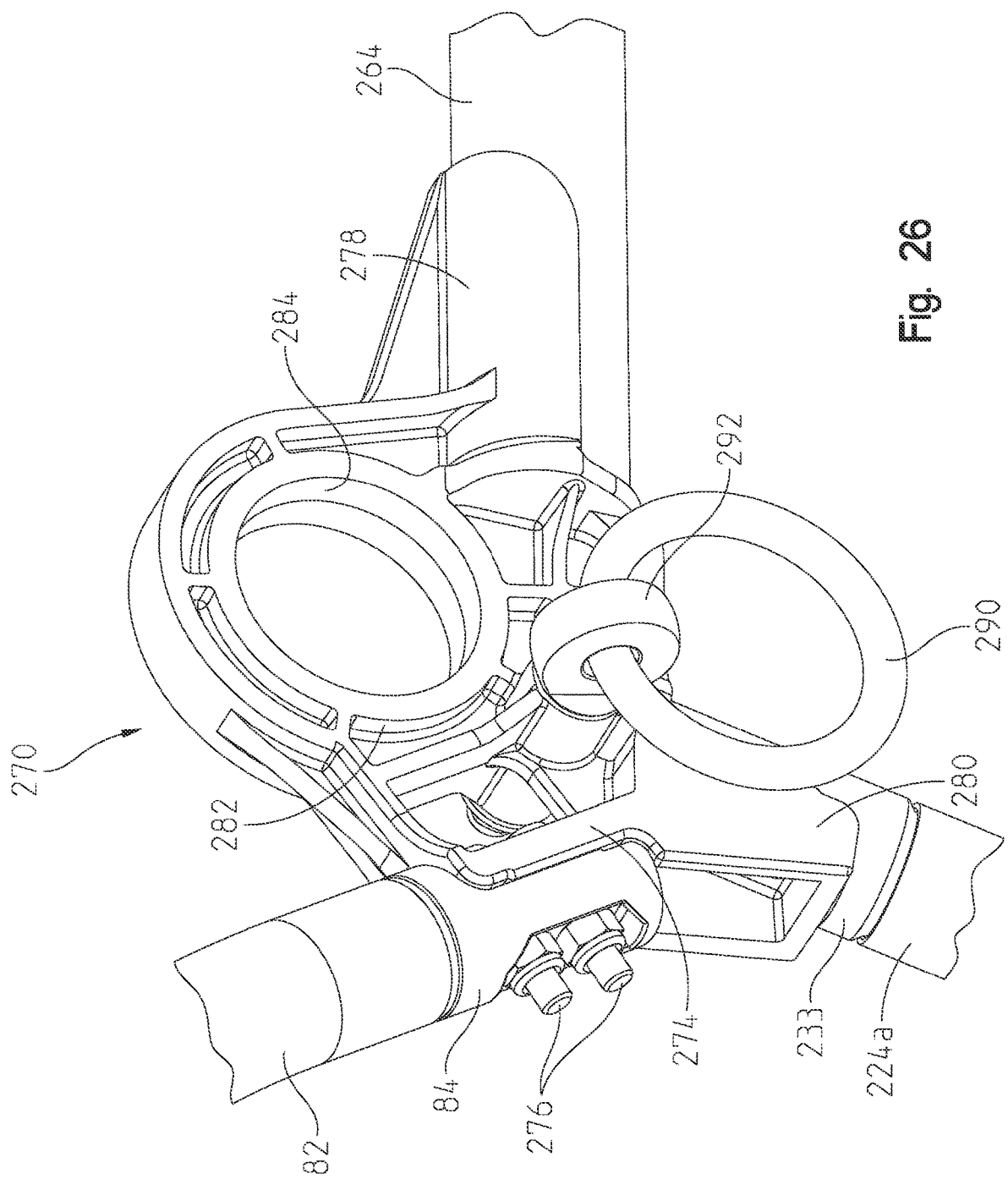
FIG. 26 is a front left perspective view of a tie-down member of the rear frame portion of the lower frame assembly of FIG. 22.
Figure 27:
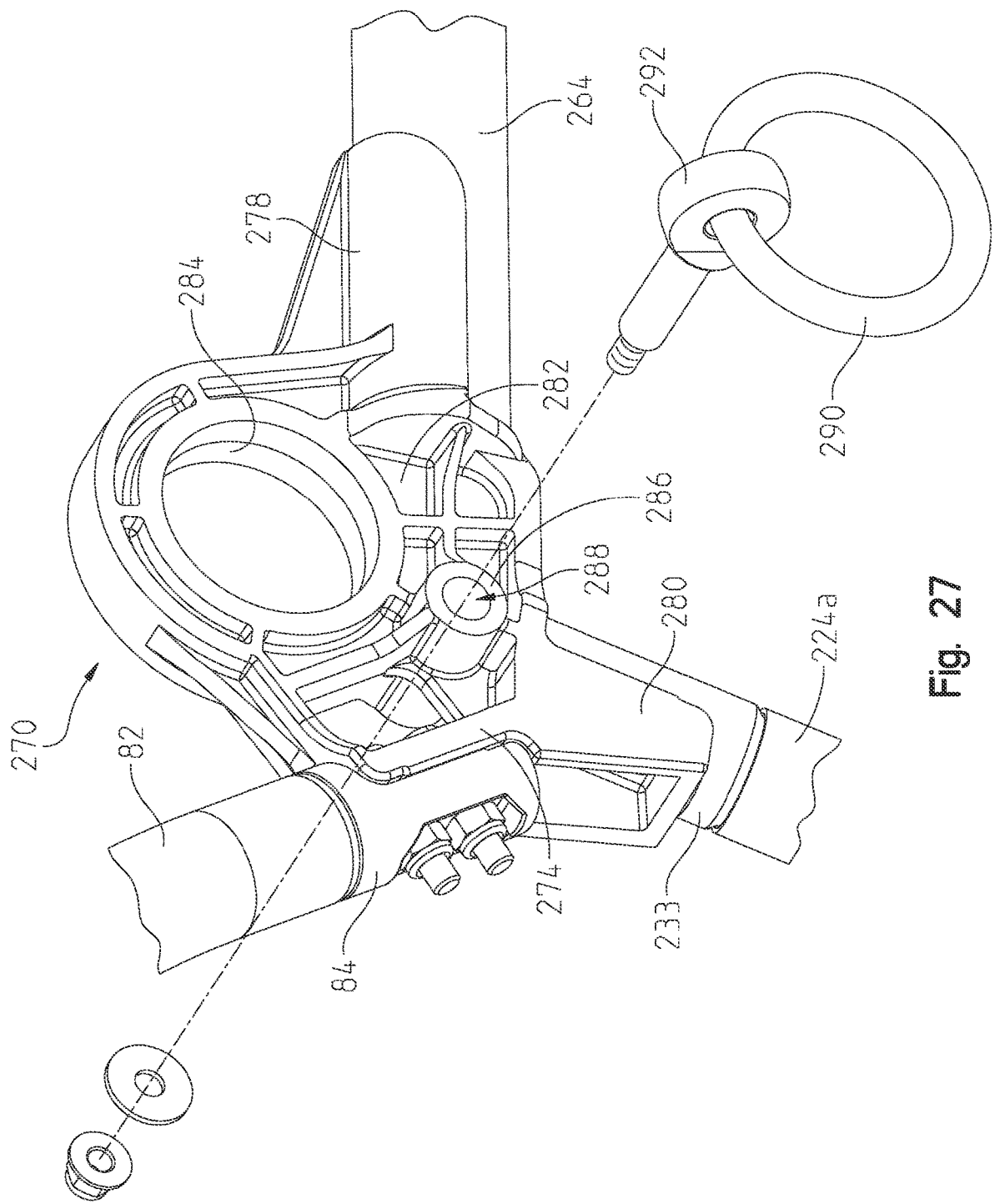
FIG. 27 is an exploded view of the tie-down member of FIG. 26.
Figure 28:
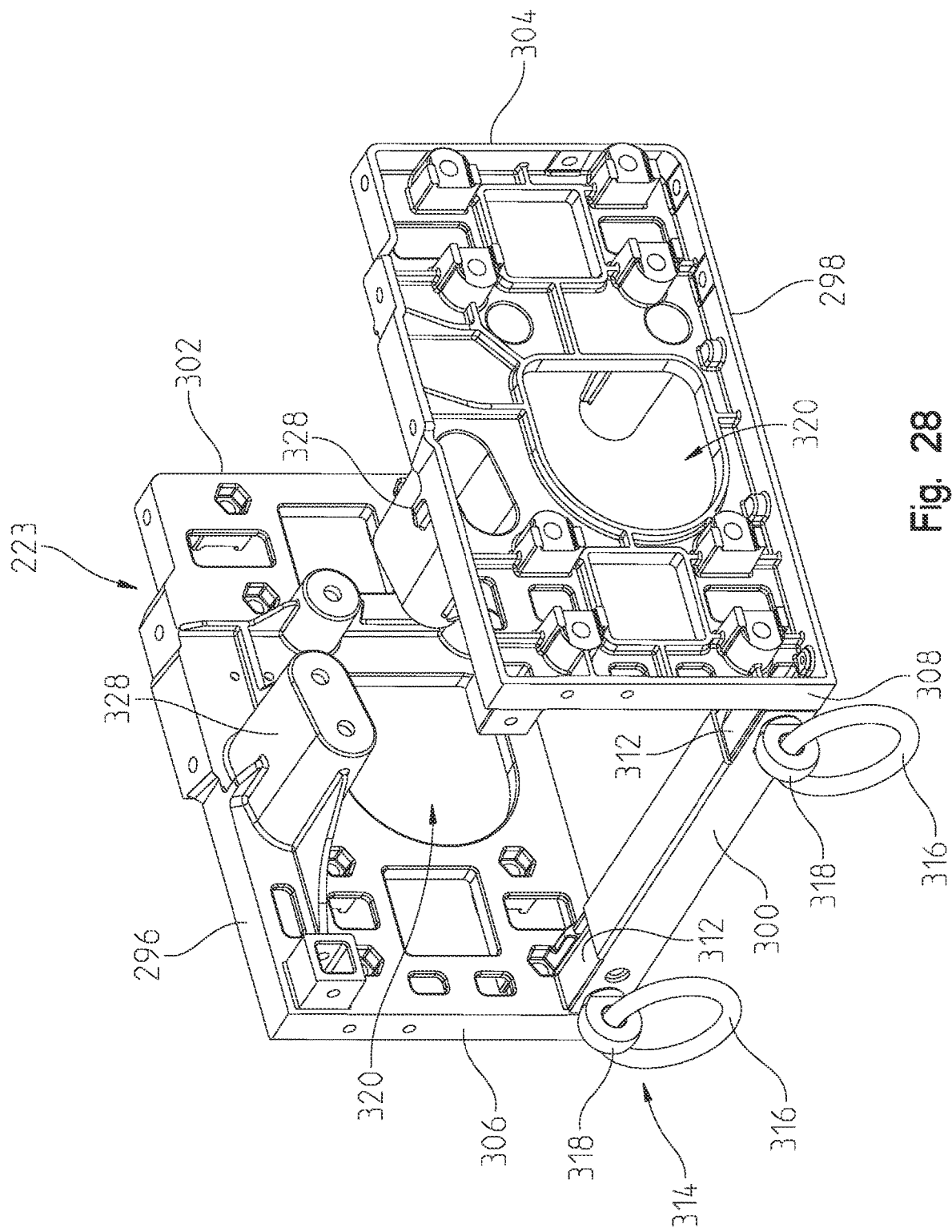
FIG. 28 is a rear right perspective view of a rear drive mount of the rear frame portion of FIG. 22.
Figure 29:
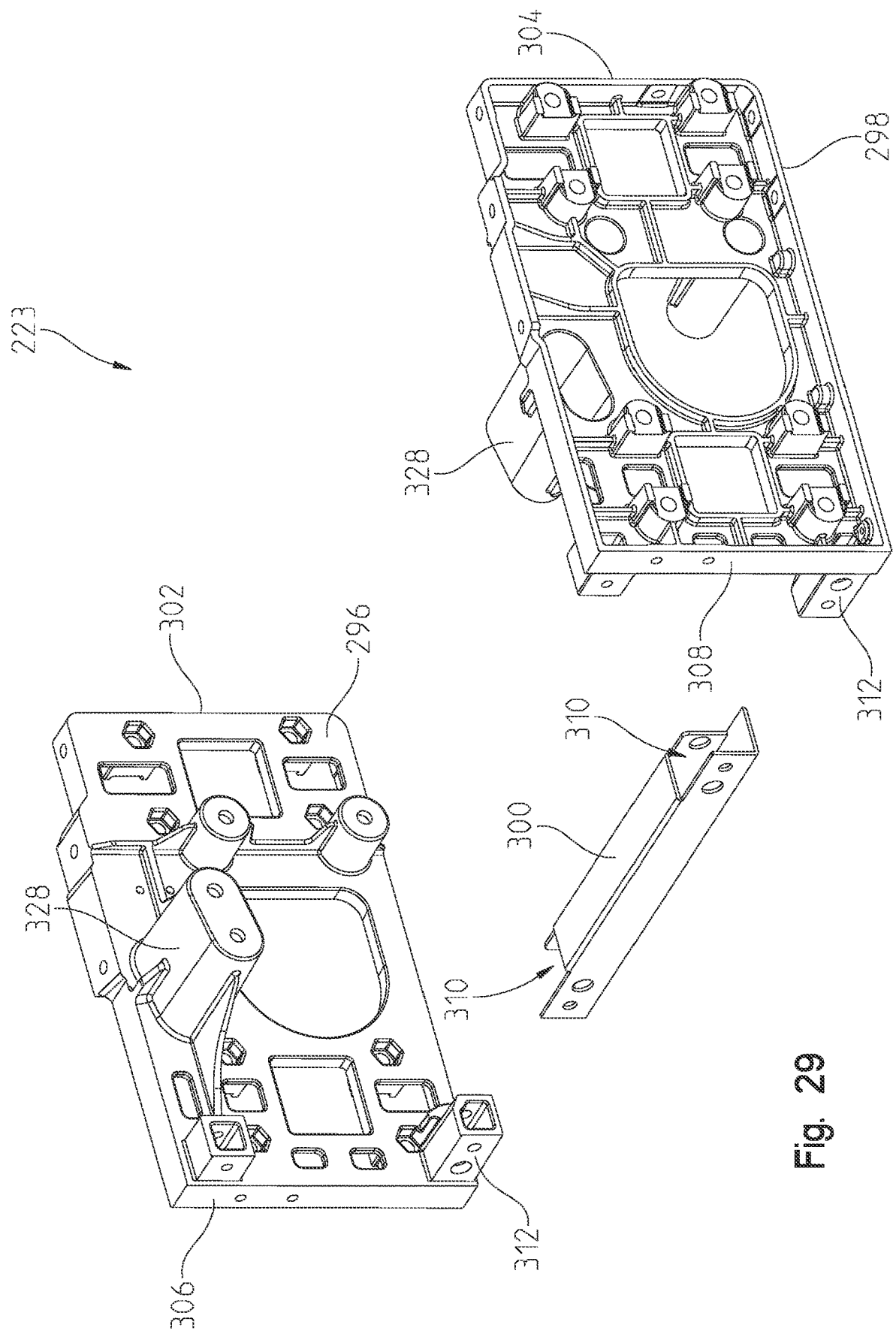
FIG. 29 is an exploded view of the rear drive mount of FIG. 28.

Referring still to FIGS. 26 and 27, mounting assembly 270 also includes a body portion 282 extending upwardly from couplers 274, 280 and receiver 278. In one embodiment, body portion 282, couplers 274, 280, and receiver 278 are integrally formed together. Body portion 282 includes an aperture 284 which is configured as a tie-down member and may be used to support loads on frame assembly 20 and/or secure vehicle 10 during transport.

Mounting assembly 270 includes a protrusion 286 which extends laterally outward from body portion 282. Protrusion 286 may be integrally formed with body portion 282 or may be removably coupled to body portion 282. Protrusion 286 includes an open channel 288 therein. Protrusion 286 is configured with a tie-down member 290, which is illustratively shown as a tie-down ring but may be provided in another configuration. Tie-down member 290 is coupled with a pin fastener 292 which is at least partially received within channel 288 of protrusion 286 for securing tie-down member 290 to body portion 282. Tie-down member 290 is configured to support a load and/or may be used for securing vehicle 10 during transport. It may be appreciated that mounting assembly 270 is part of lower frame assembly 34 and is directly coupled to several different frame members. As such, any load at mounting assembly 270 is distributed through lower frame assembly 34. In this way, it is not necessary for any other structure to be included on vehicle 10 to couple mounting assembly 270 with frame assembly 20.

As shown in at least FIGS. 1-4, 8-10, 13, 14, 22, 23, 32, 33, 37, and 38, lower frame assembly 34 may include additional mounting members 610 which extend laterally outward from lower frame assembly 34 and are positioned at a lower extent of lower frame assembly 34. Illustratively, mounting members 610 extend laterally outward from longitudinally-extending members 100, 224a of respective front and rear frame portions 28, 30. As such, mounting members 610 are directly coupled with lower frame assembly 34 and, therefore, any loads at mounting members 610 may be distributed through lower frame assembly 34. Further, the location of mounting members 610 may be used to tie down or otherwise secure vehicle 10 during transport.

Referring now to FIGS. 28-31, rear clip assembly 223 is disclosed in more detail. Rear clip assembly 223 is coupled to both main frame portion 220 and cargo frame assembly 222. More particularly, rear clip assembly 223 couples with bracket 236 (FIG. 23) of main frame portion 220 and brackets 294 (FIG. 23) of cargo frame assembly 222. Illustratively, brackets 294 are configured to couple with an upper surface of rear clip assembly 223 and bracket 236 is configured to couple with a forward extent or portion of rear clip assembly 223. Rear clip assembly 223 may be comprised of a plurality of cast metallic components coupled together or may be formed as a single cast component.

As shown best in FIGS. 28-31, rear clip assembly 223 is comprised of a first member 296, a second member 298, and a front bracket 300. First and second members 296, 298 extend generally longitudinally between respective forward ends 302, 304 and respective rearward ends 306, 308. First and second members 296, 298 are generally parallel to each other and bracket 300 extends laterally between first and second members 296, 298 and is removably coupled thereto. First and second members 296, 298 may be configured to support additional components of vehicle 10, including various components of driveline assembly 16, as disclosed further herein.

Bracket 300 is coupled to at least the inner surfaces of first and second members 296, 298. As such, bracket 300 is laterally aligned with portions of first and second members 296, 298. Bracket 300 may include recessed portions 310 for coupling with extensions 312 of first and second members 296, 298.

Referring still to FIGS. 28-31, rear clip assembly 223 includes mounting members 314 coupled to forward ends 302, 304 of respective first and second members 296, 298. Illustratively, mounting members 314 may be configured as mounting rings or other tie-down structures (e.g., pins, brackets, etc.) 316 coupled to a support member 318 for securing mounting structure 316 to first and second members 296, 298. Mounting members 314 are configured to support large loads and may be configured to support vehicle during transport (e.g., may be configured as tie-down members to secure vehicle 10 in an aircraft or other transportation). Like mounting members 130, 156 (FIG. 14), mounting members 314 are integrated into a portion of lower frame assembly 34 and, as such, loads at mounting members 314 are distributed through lower frame assembly 34. Additionally, mounting members 314 are positioned at the lowest extent of frame assembly 20 and, therefore, are easily accessible for applications requiring low mounting locations on vehicle 10.

Rear clip assembly 223 includes a plurality of apertures or openings. As disclosed herein, a plurality of such openings is configured to receive or act as a pass-through for additional components or systems of vehicle 10; however, other openings are present in rear clip assembly 223 to decrease the weight thereof. More particularly, each of first and second members 296, 298 includes an opening 320 which is configured to allow half shaft or drive axles 322 to extend through. A rear differential or drive gear 324 of driveline assembly 16 of vehicle 10 is supported on first and second members 296, 298 and half shafts 322 extend from rear differential 324 to rear ground-engaging members 14. Illustratively, half shafts 322 are operably coupled to a knuckle 326 of rear ground-engaging members 14.

As shown best in FIGS. 28-31, rear differential 324 is coupled to protrusion 328 extending inwardly from the inner surface of first and second members 296, 298. In this way, and because rear clip assembly 223 may not include a support plate, rear differential 324 may be suspended from rear clip assembly 223 when coupled thereto.

Figure 30:
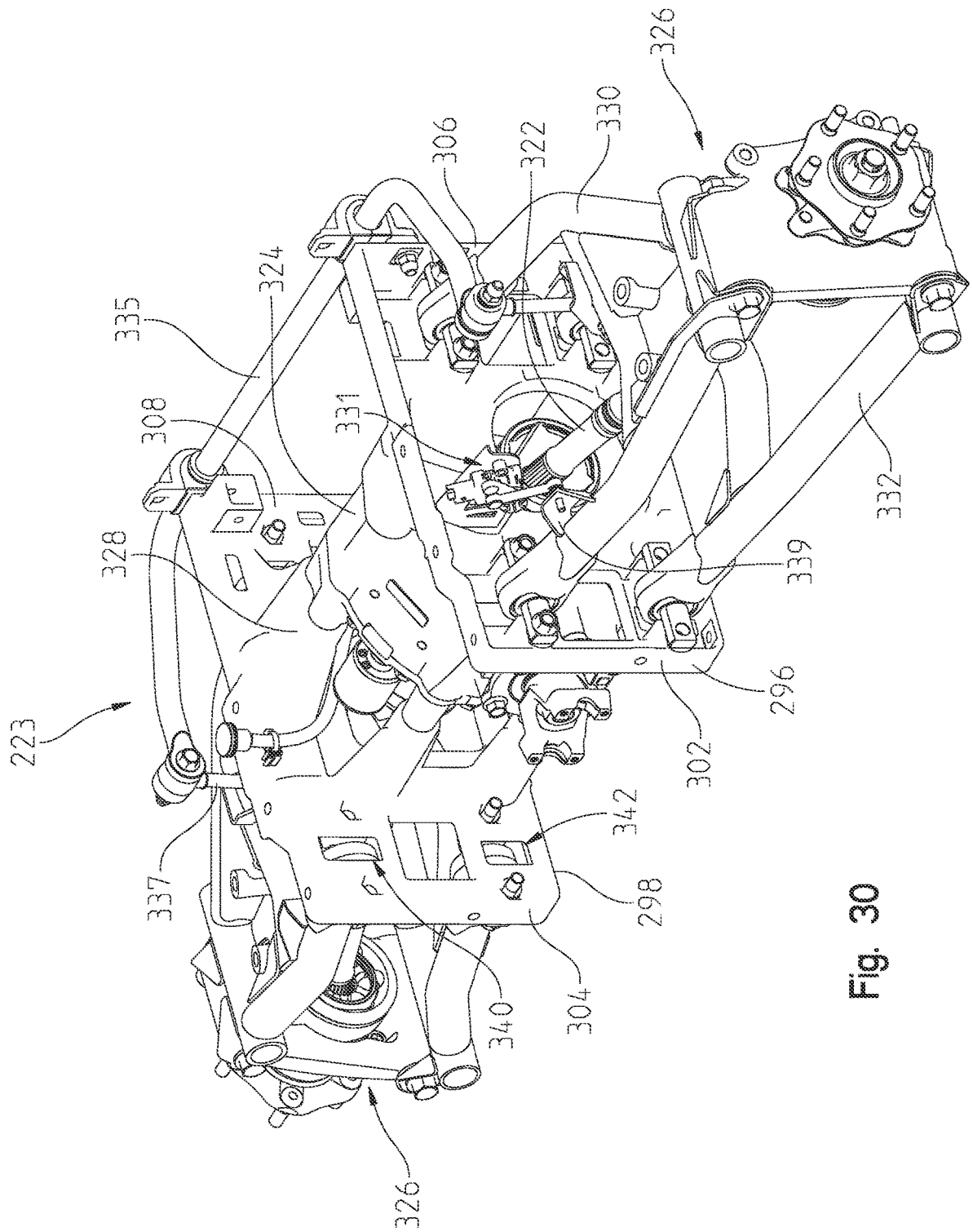
FIG. 30 is a front left perspective view of the rear drive mount of FIG. 28 and a rear suspension assembly of the vehicle of FIG. 1.
Figure 31:
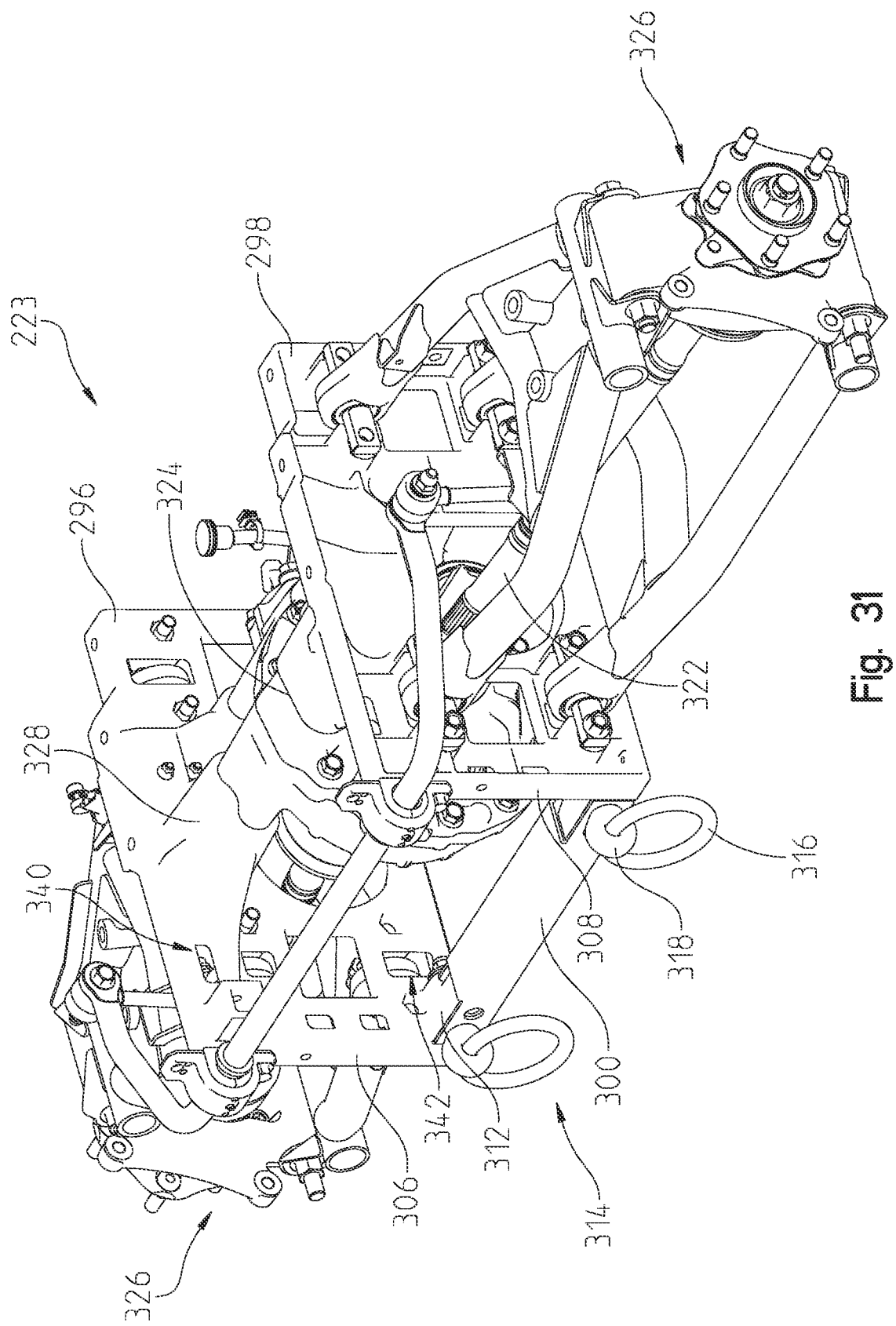
FIG. 31 is a rear right perspective view of the rear drive mount and the rear suspension assembly of FIG. 30.

Referring to FIGS. 30 and 31, rear clip assembly 223 is further configured to support at least a portion of rear suspension assembly 26. Rear suspension assembly 26 is comprised of upper control arms 330, a sensor 331 operably coupled to each upper control arm 330, lower control arms 332, shock absorbers 334 (FIG. 1), and a torsion bar 335 operably coupled to upper control arms 330 through link arms 337. Sensor 331 is coupled to a bracket 339 of each upper control arm 330 and is configured to sense the movement of upper control arm 330. It may be appreciated from FIGS. 30 and 31 that sensors 331 are positioned on both sides of rear suspension assembly 26 and, more particularly, each upper control arm 330 includes an individual sensor 331. As disclosed further herein, sensors 331 allow for independent measurement of the movement of each individual upper control arm 330 and may cooperate with a suspension adjustment system. Additional sensors may be included on rear suspension assembly 26 at any location.

Torsion bar 335 also may be coupled to rearward ends 306, 308 of first and second members 296, 298. Outer ends of upper and lower control arms 330, 332 are coupled to knuckle 326 and inner ends of upper and lower control arms 330, 332 are coupled to first and second members 296, 298 of rear clip assembly 223. Illustratively, each of first and second members 296, 298 includes an opening 340 configured to at least partially receive the inner ends of upper control arms 330. Similarly, each of first and second members 296, 298 includes an opening 342 configured to at least partially receive the inner ends of lower control arms 332.

Based on at least FIGS. 30 and 31, it may be appreciated that rear clip assembly 223 of frame assembly 20 is configured to support multiple components and systems of vehicle 10. For example, rear clip assembly 223 is configured to support mounting members 314, support rear differential 324, and support components of rear suspension assembly 26. To ensure that all above-mentioned components and systems are supported on rear clip assembly 223 and do not interfere with each other, various components are offset from each other. For example, half shafts 322 are positioned vertically intermediate upper and lower control arms 330, 332. Additionally, torsion bar 335 extends rearwardly from upper control arm 330 and is positioned above half shafts 322 and upper and lower control arms 330, 332.

Figure 32:
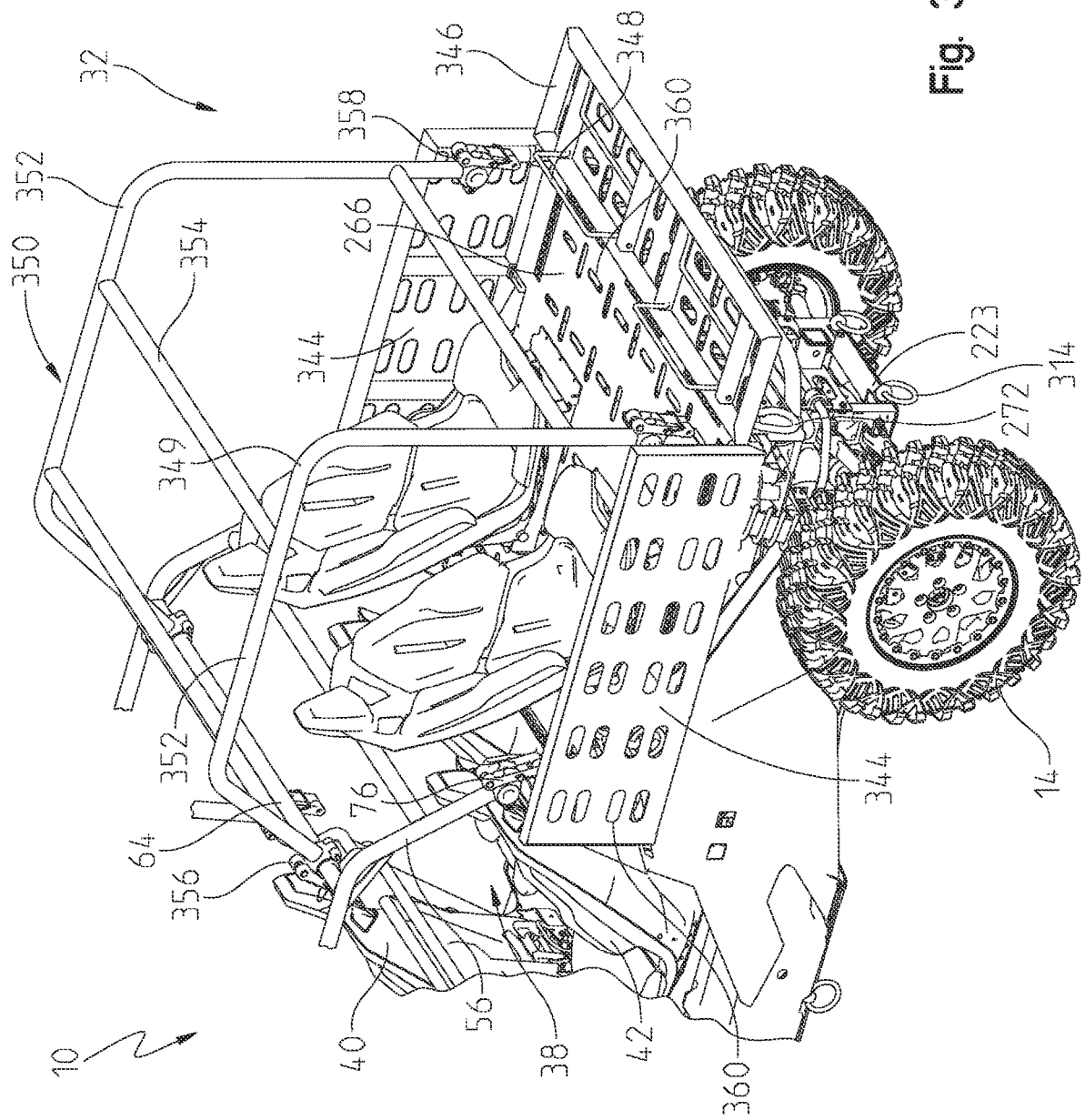
FIG. 32 is a rear left perspective view of a cargo bed of the rear frame portion of FIG. 22 in a first embodiment.
Figure 33:
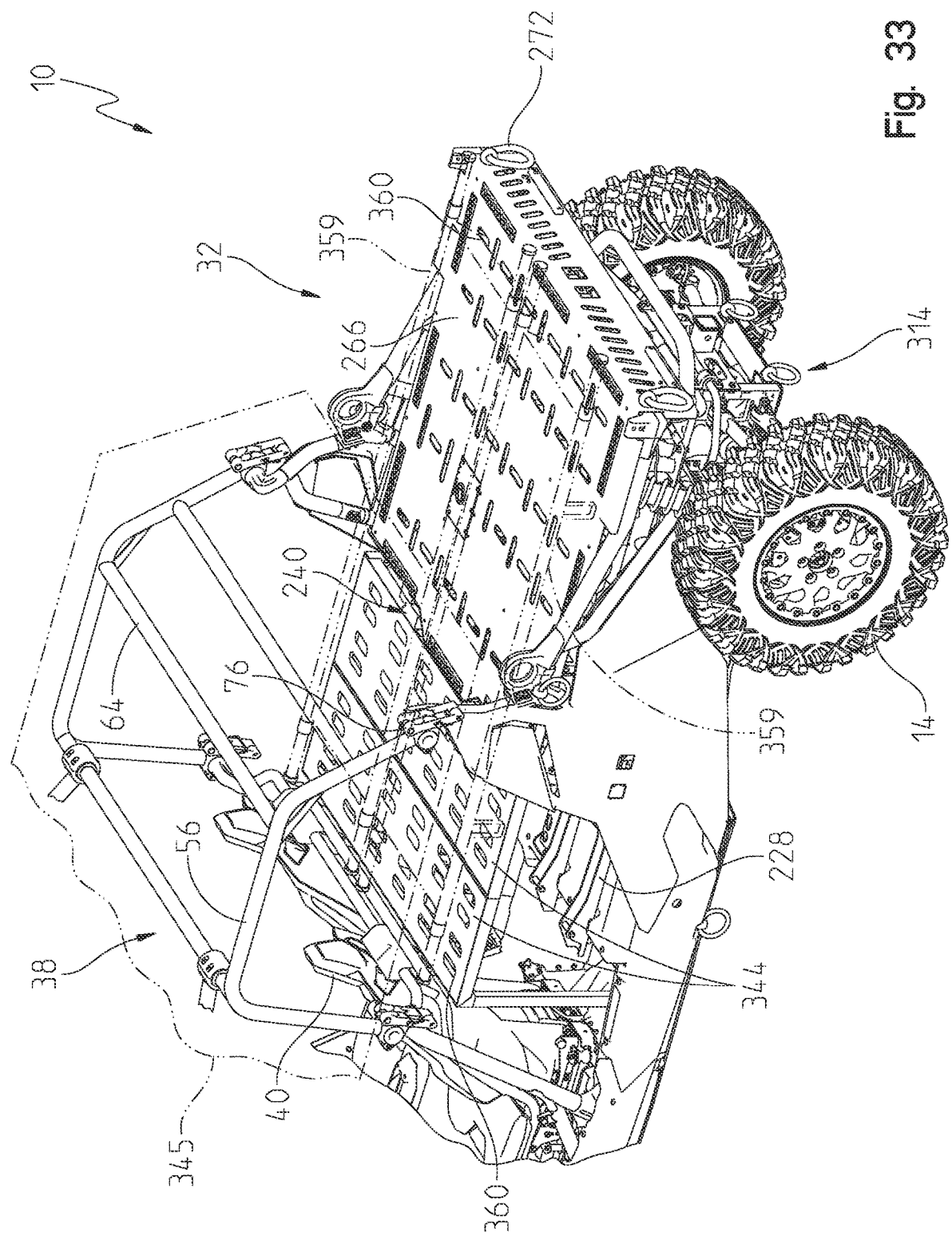
FIG. 33 is a rear left perspective view of the cargo bed in a second embodiment.

Referring to FIGS. 32 and 33, rear cargo area 32 is disclosed. Rear cargo area 32 may include cargo platform 266, side walls 344, and a tailgate 346. Side walls 344 extend upwardly from cargo platform 266 and are positioned longitudinally rearward of operator area 38. Illustratively, side walls 344 are positioned rearward of rear seats 42. Tailgate 346 is positioned approximately perpendicularly to side walls 344. Tailgate 346 is configured to rotate between an open position, as shown in FIG. 32, and a closed position in which tailgate 346 extends upwardly and is approximately perpendicular to cargo platform 266.

Tailgate 346 may include various configurations and embodiments, depending on the application of vehicle 10. For example, as shown in FIG. 32, tailgate 346 may include steps 348. In such an embodiment, tailgate 346 may be configured to rotate approximately 180° from the closed position such that tailgate 346 extends below cargo platform 266. When in such a position, steps 348 are configured to support a person standing thereon to access cargo area 32.

In one embodiment, cargo platform 266 is configured to support cargo and/or passengers and may include additional seating, such as seats 349. It may be desirable to include a rear upper frame assembly 350 over at least a portion of cargo area 32, for example when passengers and/or seats 349 are positioned therein. Rear upper frame assembly 350 includes generally longitudinally-extending members 352 and cross-members 354. Longitudinally-extending members 352 may be removably coupled to cross-member 64 of upper frame assembly 36 with clamps 356 and removably coupled to side walls 344 with clamps 358. As such, rear upper frame assembly 350 may be added to vehicle 10 or removed from vehicle 10, as necessary, based on the application thereof.

Figure 3:
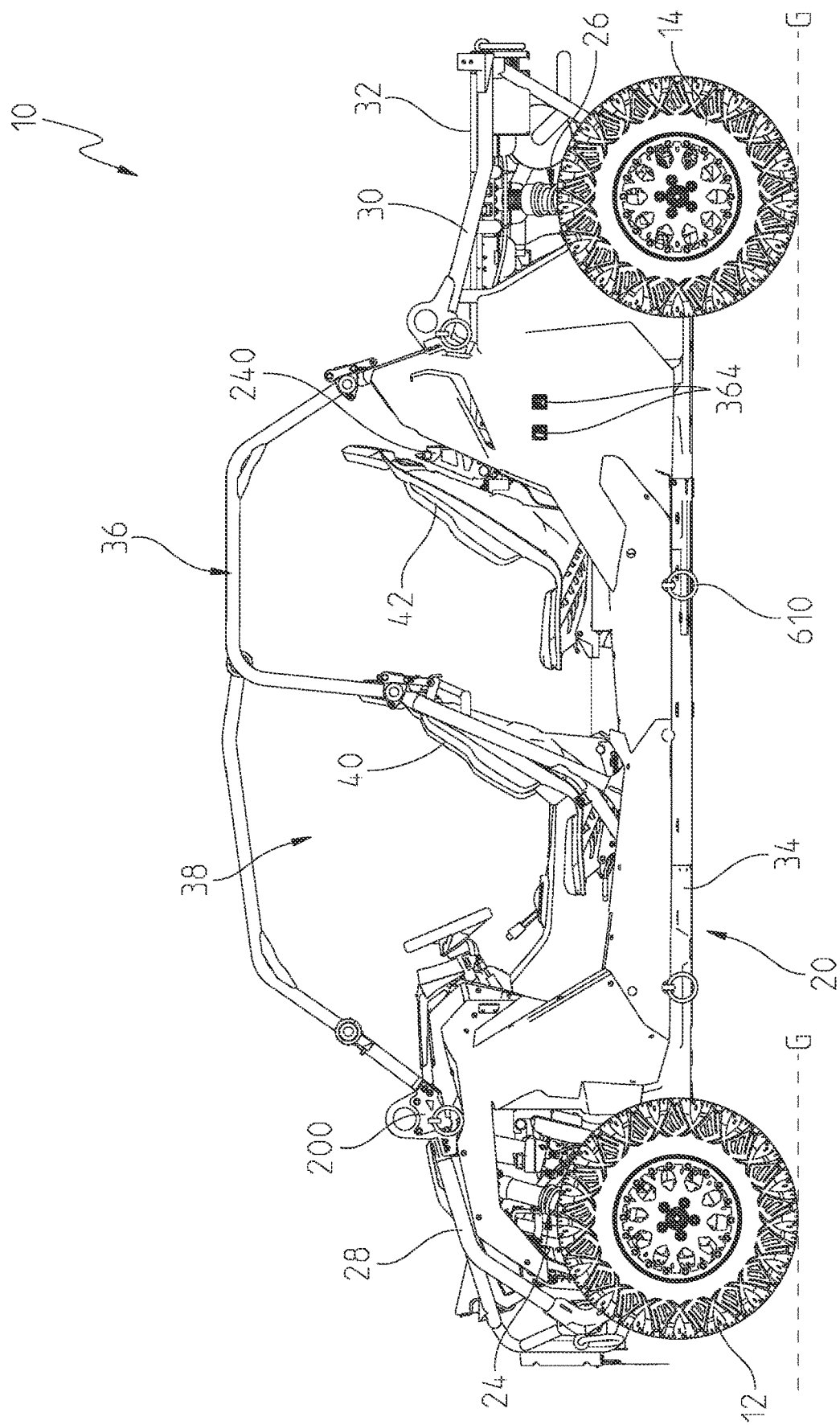
FIG. 3 is a left side view of the of the vehicle of FIG. 1.

Additionally, as shown in FIG. 33, another configuration of cargo area 32 is disclosed. Illustratively, when it is desired to extend the cargo space of rear cargo area 32, rear seats 42 may be removed. In order to extend cargo platform 266 into operator area 38 such that cargo platform 266 extends to a position directly rearward of seats 40, seat harness assemblies 240 may be rotated to the folded position (FIG. 24). When seat harness assemblies 240 are in the folded positions, cargo platform 266 can be extended into operator area 38 at a consistent height relative to ground surface G (FIG. 3). More particularly, side walls 344 may be removed from the position shown in FIG. 32 and, instead, may be positioned within operator area 38 to extend cargo platform 266 forwardly. Side walls 344 may extend laterally between a right and left side of operator area 38 and may be positioned in longitudinal alignment with each other at the forward extent of cargo platform 266 to define the forward end of cargo area 32. As shown, when side walls 344 are within operator area 38 (because rear seats 42 are removed), side walls 344 are positioned below a portion of upper frame assembly 36 and are within an envelope 345 (FIGS. 9 and 33) of upper frame assembly 36. In this way, side walls 344 extend the cargo space available by extending the longitudinal length of cargo platform 266 because side walls 344 occupy the space above seat supports 228 where rear seats 42 are shown in FIG. 32.

The length of this extended cargo area 32 is formed by cargo platform 266 and side walls 344, where side walls are positioned directly rearward of seats 40. This extended length of cargo area 32 may be able to accommodate the length of a litter or stretcher 359. Additionally, the lateral width of cargo platform 266 and side walls 344 in the configuration of FIG. 33 may be sufficient to accommodate two litters or stretchers 359 in a side-by-side arrangement. It may be appreciated that, because seat harness assemblies 240 are in the folded position, side walls 344 are positioned above seat harness assemblies 240 and, therefore, are positioned at the same height as cargo platform 266 relative to ground surface G. Conversely, if side walls 344 were to be positioned at a height greater or less than the height of cargo platform 266, stretchers 359 would be angled and it would not be conducive to transporting a person on stretcher 359.

Further, certain known off-road vehicles include a rear cross-member positioned rearward of rear seats 42. Such a cross-member may be positioned at a height which would interfere with the ability to extend the length of cargo area and maintain a constant height of cargo area 32. As such, frame assembly 20 of vehicle 10 does not include such a cross-member so as to allow cargo area 32 to be extended at a constant height.

Referring still to FIGS. 32 and 33, cargo area 32 includes a plurality of mounting members or tie-downs. For example, side walls 344 and cargo platform 266 include a plurality of apertures 360 which may be used to secure cargo thereon. Additionally, tie-down members 272 are positioned at a rearward-most extent of cargo platform 266. The configuration of cargo area 32 is not limited to that disclosed herein and any variant of a cargo area is contemplated.

Figure 34:
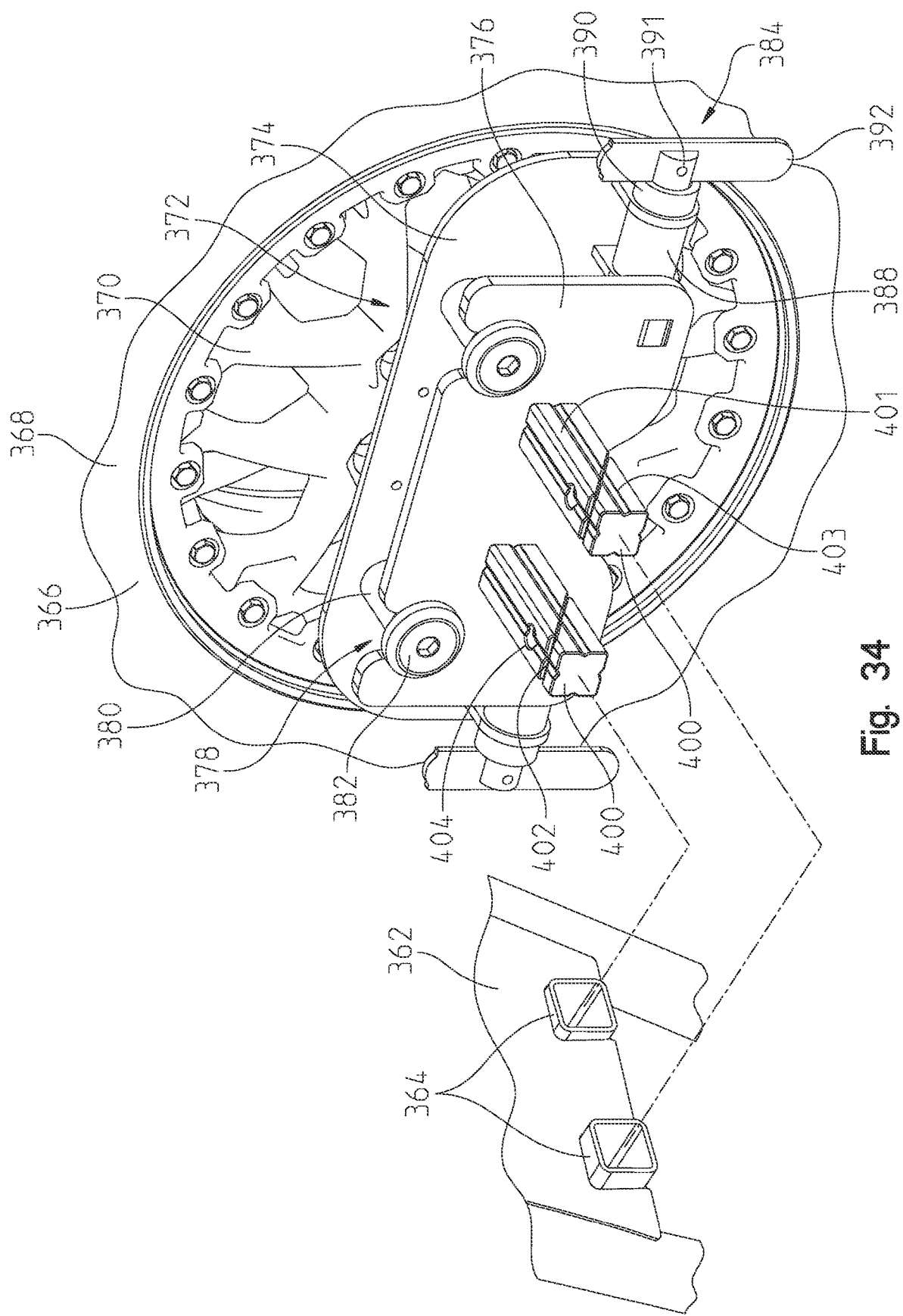
FIG. 34 is an exploded view of a spare-tire mounting assembly configured to be supported on the cargo bed of FIG. 32.
Figure 35:
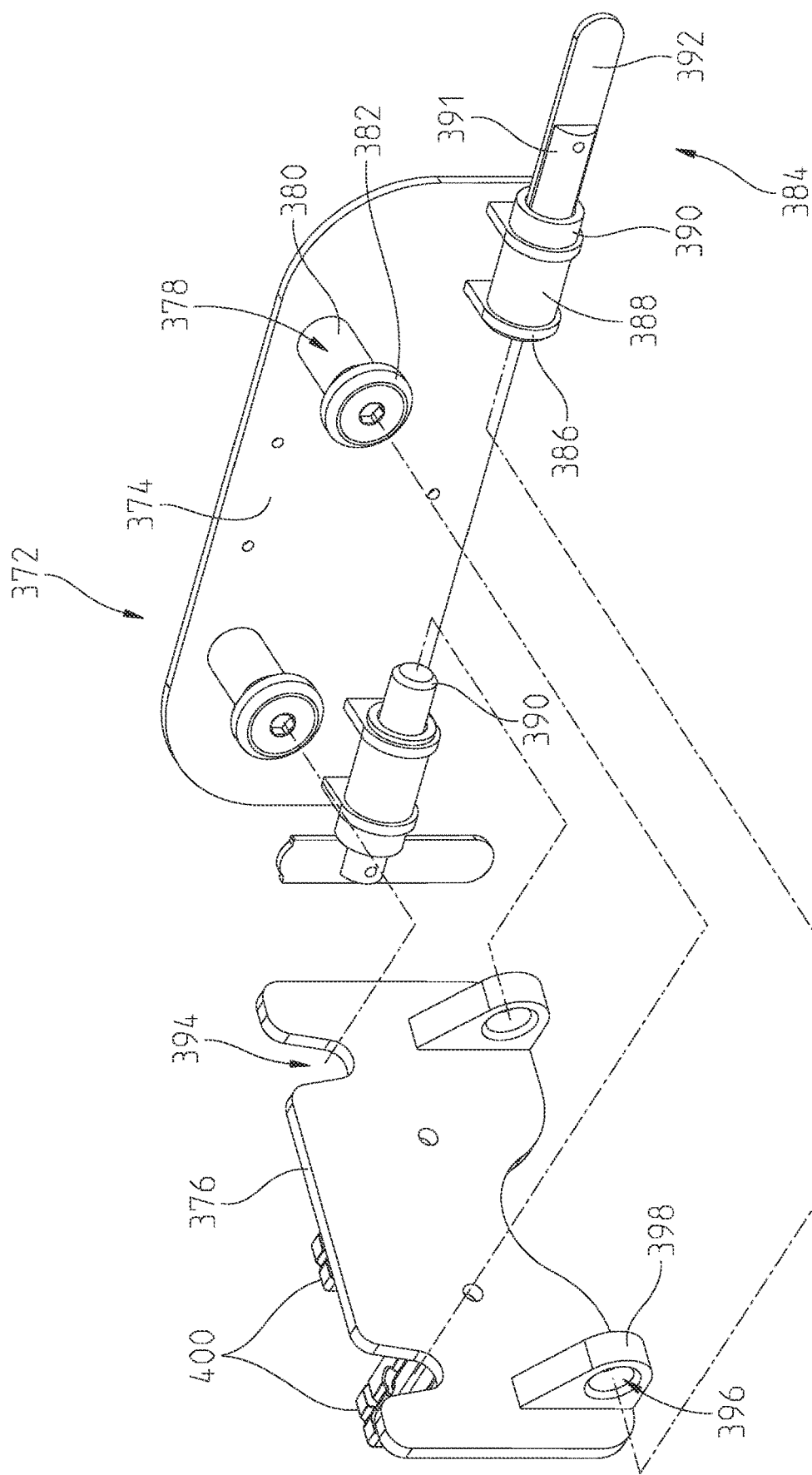
FIG. 35 is a further exploded view of the spare-tire mounting assembly of FIG. 34.
Figure 36:
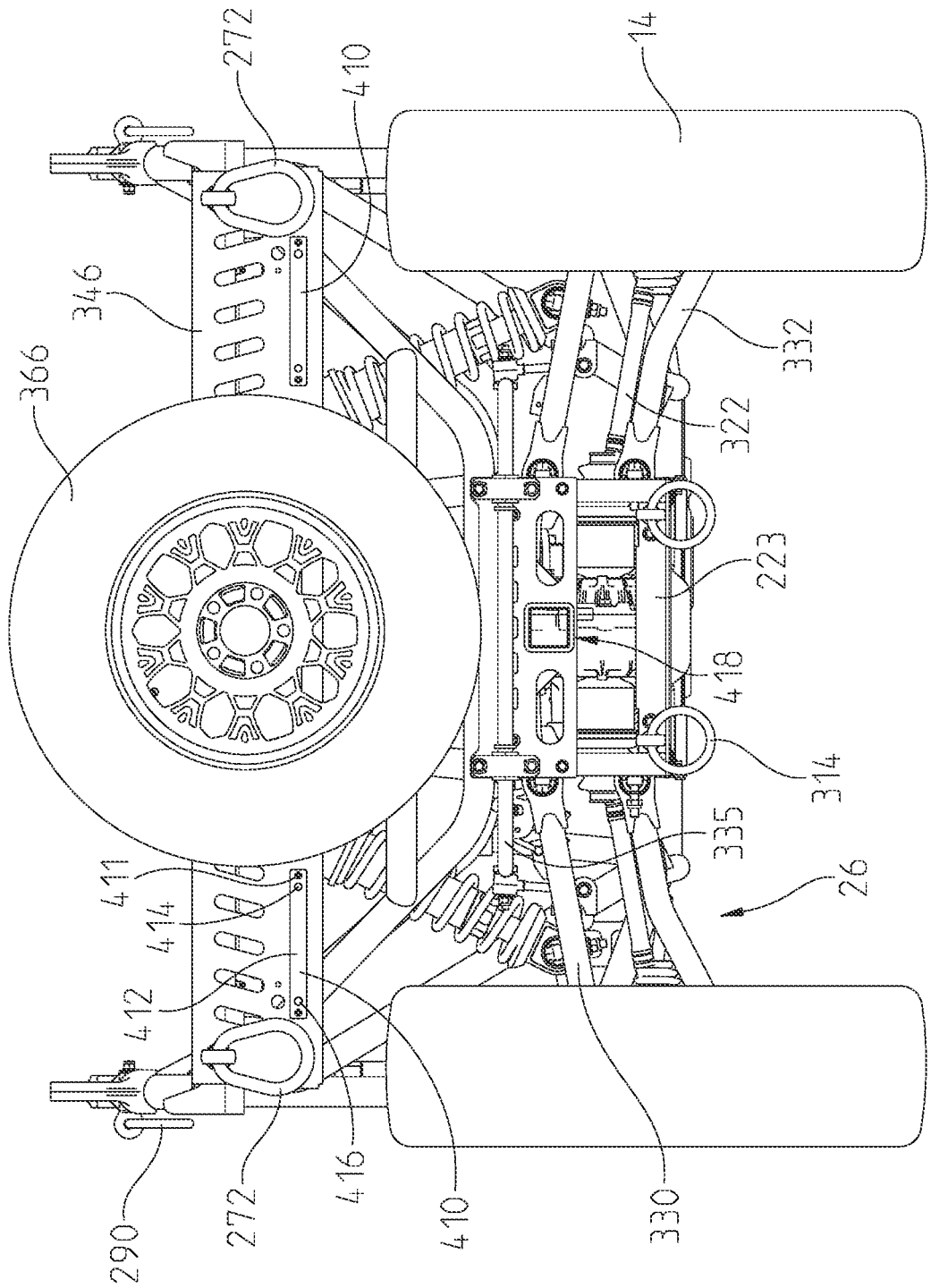
FIG. 36 is a rear view of the vehicle of FIG. 1, showing a spare tire, a trailer hitch receiver, and rear tail lights.

Referring to FIGS. 34-36, cargo frame assembly 222 further includes a mounting bracket 362. Mounting bracket 362 illustratively includes receivers 364 configured to receive an accessory. More particularly, vehicle 10 may be configured to support a spare tire 366 thereon. Spare tire 366 includes a tire 368 and a wheel 370. A support assembly 372 is configured to be removably coupled to wheel 370 and cooperate with receivers 364 to support spare tire 366. Illustratively, support assembly 372 includes a first plate 374 directly coupled to wheel 370 and a second plate 376 configured to be coupled to first plate 374 and receivers 364. A rearward surface of first plate 374 is coupled to wheel 370 and a forward surface of first plate 374 includes pegs 378 extending forwardly. Pegs 378 include a body portion 380 and a head portion 382.

The forward surface of first plate 374 also includes locking assemblies 384 comprised of a bracket 386, a sleeve 388, a pin 390, a lever body 391, and a lever or rotatable arm 392. Sleeve 388 is retained within bracket 386 and pin 390 is received within sleeve 388. Pin 390 may be extended from sleeve 388 and received through apertures 396 of brackets 398 in order to couple first and second plates 374, 376 together. When pin 390 is extended to the desired position to be received within bracket 398, lever arm 392 may rotate from a horizontal position shown in FIG. 35 to a vertical position shown in FIG. 34 in order to secure the position of pin 390 relative to sleeve 388.

First and second plates 374, 376 are further coupled to each other through pegs 378. More particularly, second plate 376 includes recesses or groove 394 which are configured to receive body portion 380 of pegs 378. Head portion 382 of pegs 378 is positioned forward of second plate 376 to retain first plate 374 on second plate 376.

Referring still to FIGS. 34 and 35, a forward surface of second plate 376 includes tubular members 400 which are received within receivers 364. Tubular members 400 and receivers 364 may have any cross-sectional shape, including circular, rectangular, or any other desired shape. Tubular members 400 are configured as wedges and may include a channel 402 and an opening 404 for further securing tubular members 400 within receivers 364. More particularly, channel 402 separates a first portion 401 of tubular member 400 and a second portion 403 of tubular members 400. When spare tire 366 is supported on vehicle 10, a fastener (not shown) extends through portions 401, 403 and when, when tightened, first and/or second portion(s) 401, 403 move relative to each other, thereby applying a pressure on receivers 364 to lock tubular members 400 within receivers 364. To remove spare tire 366, the fastener may be loosed to bring portions 401, 403 closer together and, therefore, releases the pressure on receivers 364 to allow tubular members 400 to be removed from receivers 364.

Figure 4:
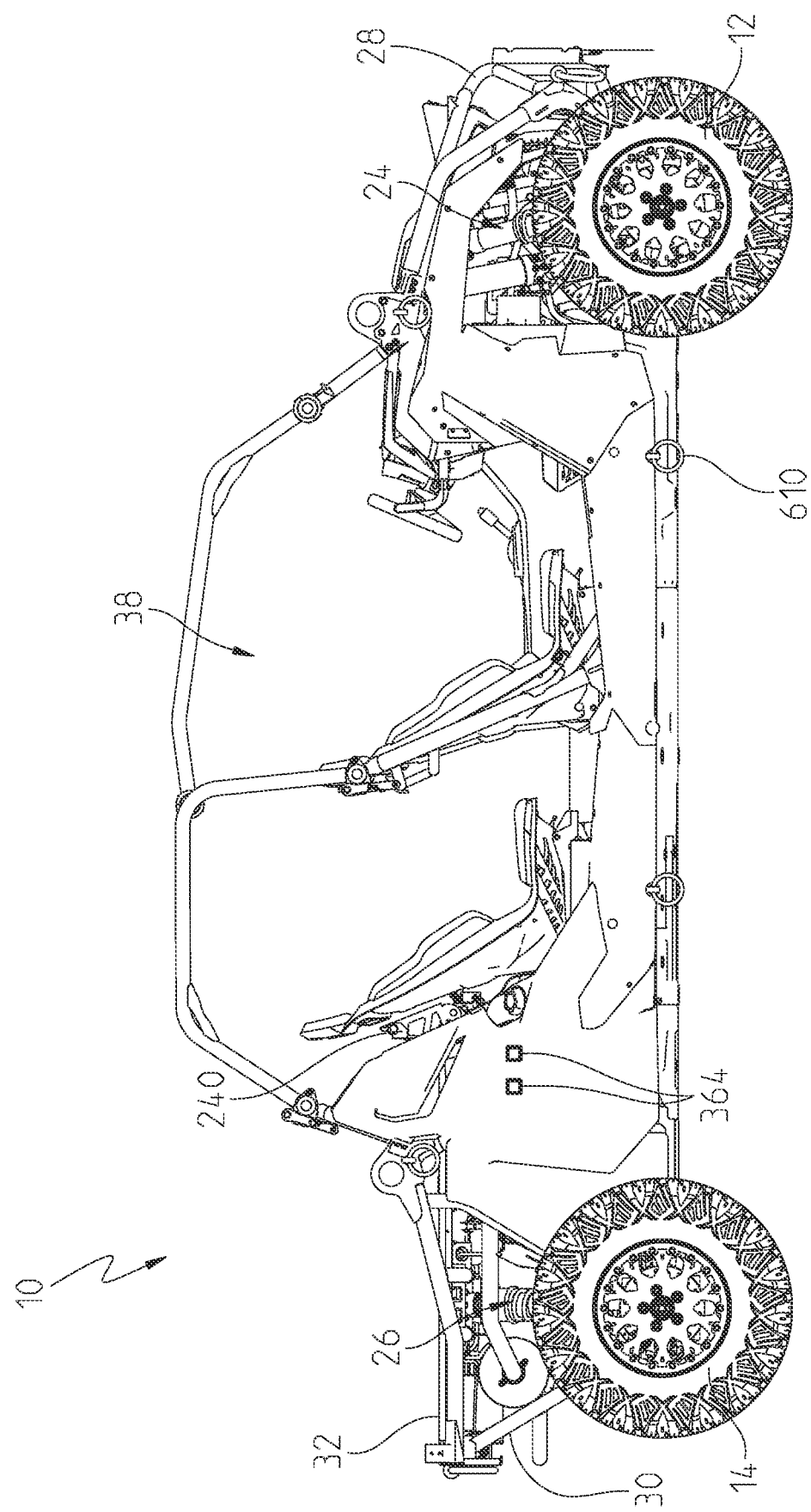
FIG. 4 is a right side view of the vehicle of FIG. 1.
Figure 5:
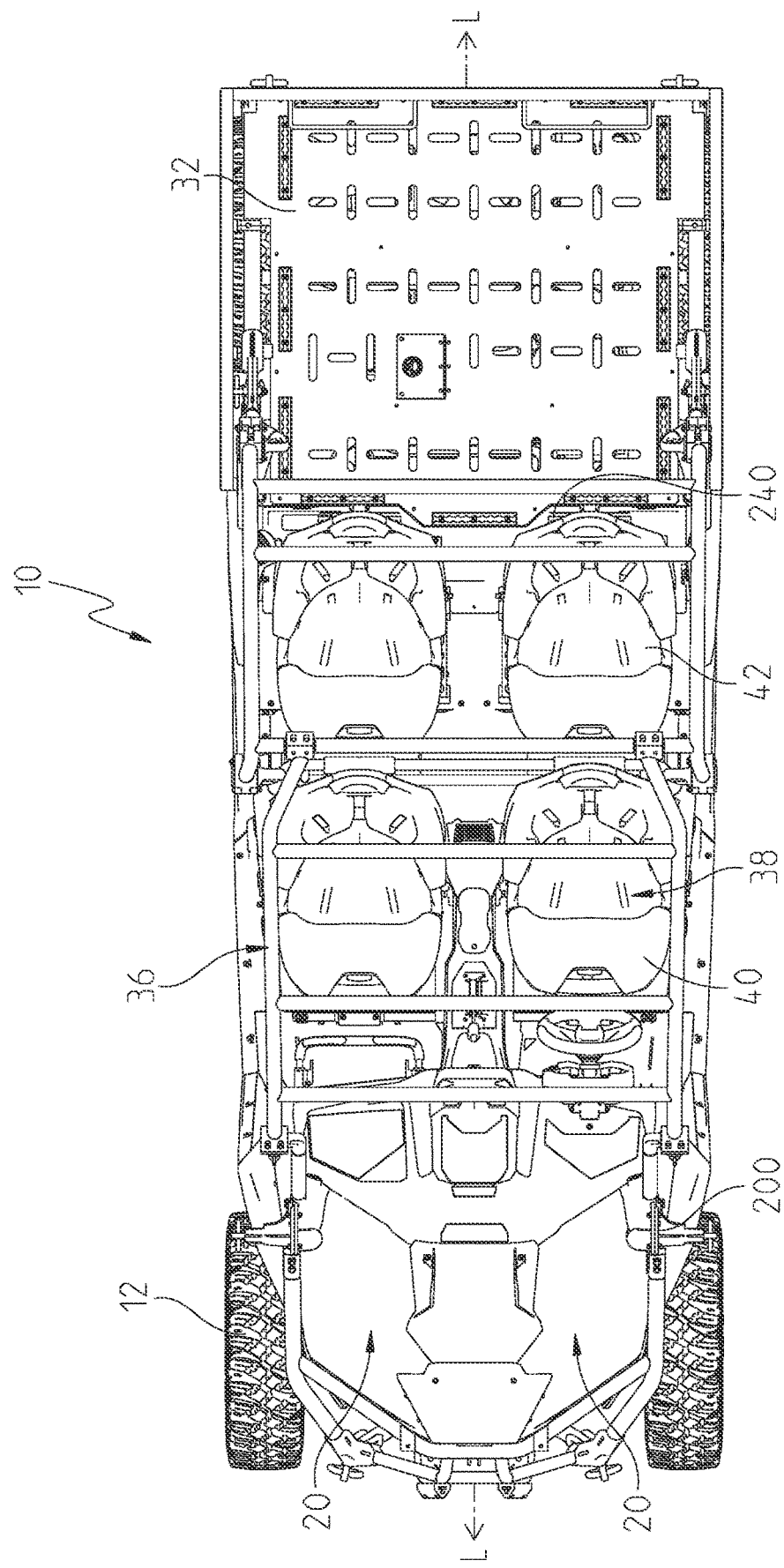
FIG. 5 is a top view of the vehicle of FIG. 1.
Figure 7:
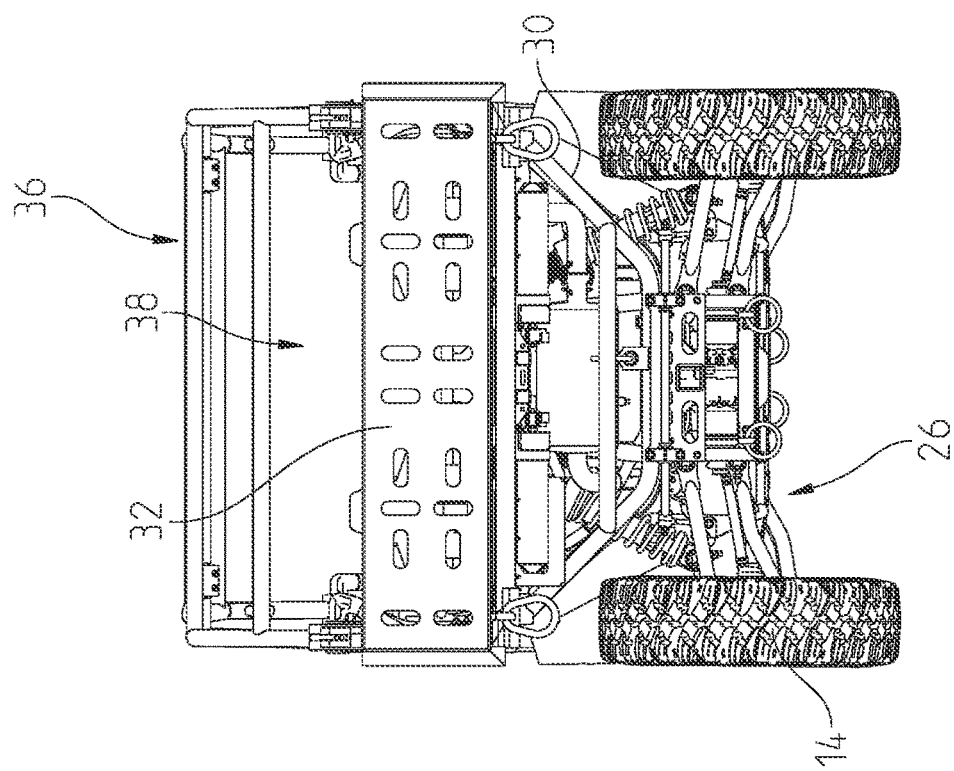
FIG. 7 is a rear view of the vehicle of FIG. 1.
Figure 6:
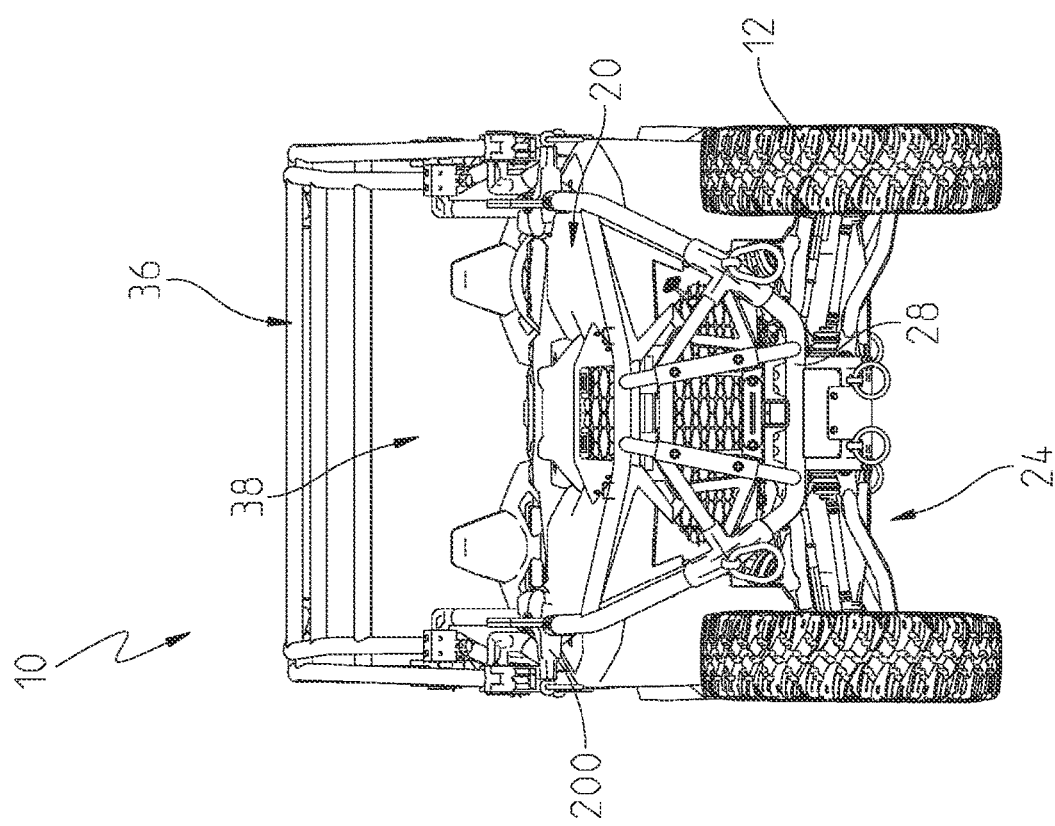
FIG. 6 is a front view of the vehicle of FIG. 1.

It may be apparent that vehicle 10 further includes additional receivers 364 positioned on both the right and left sides of vehicle 10 to support additional accessories (FIGS. 3 and 4). Receivers 364 are shown in a pair and configured to receive a complementary pair of tubular members 400. By having two receivers 364 and two tubular members 400, it is possible to reduce any twisting and loading from the accessory or cargo compared to using a single receiver and a single tubular member because the load of the accessory or cargo is distributed between both tubular members 400 and receivers 364.

Referring to FIG. 36, when spare tire 366 is supported on tailgate 346, spare tire 366 is positioned along longitudinal centerline L and at approximately the lateral mid-point of tailgate 346, although other positions of spare tire 366 are possible. The location of spare tire 366 ensures that spare tire 366 does not conceal or otherwise block other components of vehicle 10 needed during operation thereof. For example, spare tire 366 is positioned laterally intermediate rear tail lights 410 such that rear tail lights 410 are entirely visible. In this way, rear tail lights 410 are positioned outside of the envelope of spare tire 366. Rear tail lights 410 are coupled to tailgate 346 with fasteners 411.

Rear tail lights 410 define a bar light 412 which may be used in various operating conditions of vehicle 10. However, rear tail light 410 also may include an infrared ("IR") light 414. IR light 414 may be used during other operating conditions of vehicle 10, such as during nighttime use and when vehicle 10 is operating in a blackout mode. As such, rear tail lights 410 will not appear illuminated (i.e., bar lights 412 will not be illuminated) but IR light 414 will be visible to other vehicles and/or operators of other vehicles using night-vision technology. Rear tail lights 410 also may include a light-emitting diode ("LED") 416 positioned generally opposite IR light 414. Illustratively, LED 416 is positioned along an outer extent of rear tail light 410 while IR light 414 is positioned along an inner extent of rear tail light 410.

Referring still to FIG. 36, spare tire 366 is mounted to tailgate 346 at a position that also does not interfere with other components of vehicle 10. For example, spare tire 366 is positioned above a trailer hitch location 418 and does not block or conceal trailer hitch location 418. In this way, vehicle 10 is configured for carrying spare tire 366 while also towing cargo, another vehicle, etc. Trailer hitch location 418 is positioned above mounting members 314 and is located along longitudinal centerline L. As such, trailer hitch location 418 is generally laterally intermediate upper control arms 330. Trailer hitch location 418 is positioned at a vertical height relative to ground surface G (FIG. 3) greater than that of half shafts 322 and lower control arms 332 but less than that of torsion bar 335. Trailer hitch location 418 also may be positioned longitudinally rearward of torsion bar 335, half shafts 322, and upper and lower control arms 330, 332. In this way, trailer hitch location 418 is not concealed by other components of vehicle 10 and does not interfere with other components of vehicle 10. An electrical connection may be positioned at or in close proximity to trailer hitch location 418 to easily connect with an electrical system of another vehicle during towing.

As is further shown in FIG. 36, tie-down or mounting members 272 are positioned laterally outward of spare tire 366 and along the right and left extents of vehicle 10. As such, spare tire 366 also does not interfere with mounting members 272 and, therefore, spare tire 366 may remain on vehicle 10 even when mounting members 272 are being used to support cargo or transport vehicle 10. Additionally, spare tire 366 is positioned above mounting members 314 and may be supported on tailgate 346 when mounting members 314 are in use for transporting vehicle 10 or otherwise supporting a load thereon.

Additionally, it may be appreciated that portions of frame assembly 20, including lower frame assembly 34 and upper frame assembly 36, are configured to support various components or accessories of vehicle 10. For example, frame assembly 20 may be configured to support military weapons, radar or autonomous systems, sensors, and any other component for vehicle 10 and/or the operator or passengers supported therein.

Figure 37:
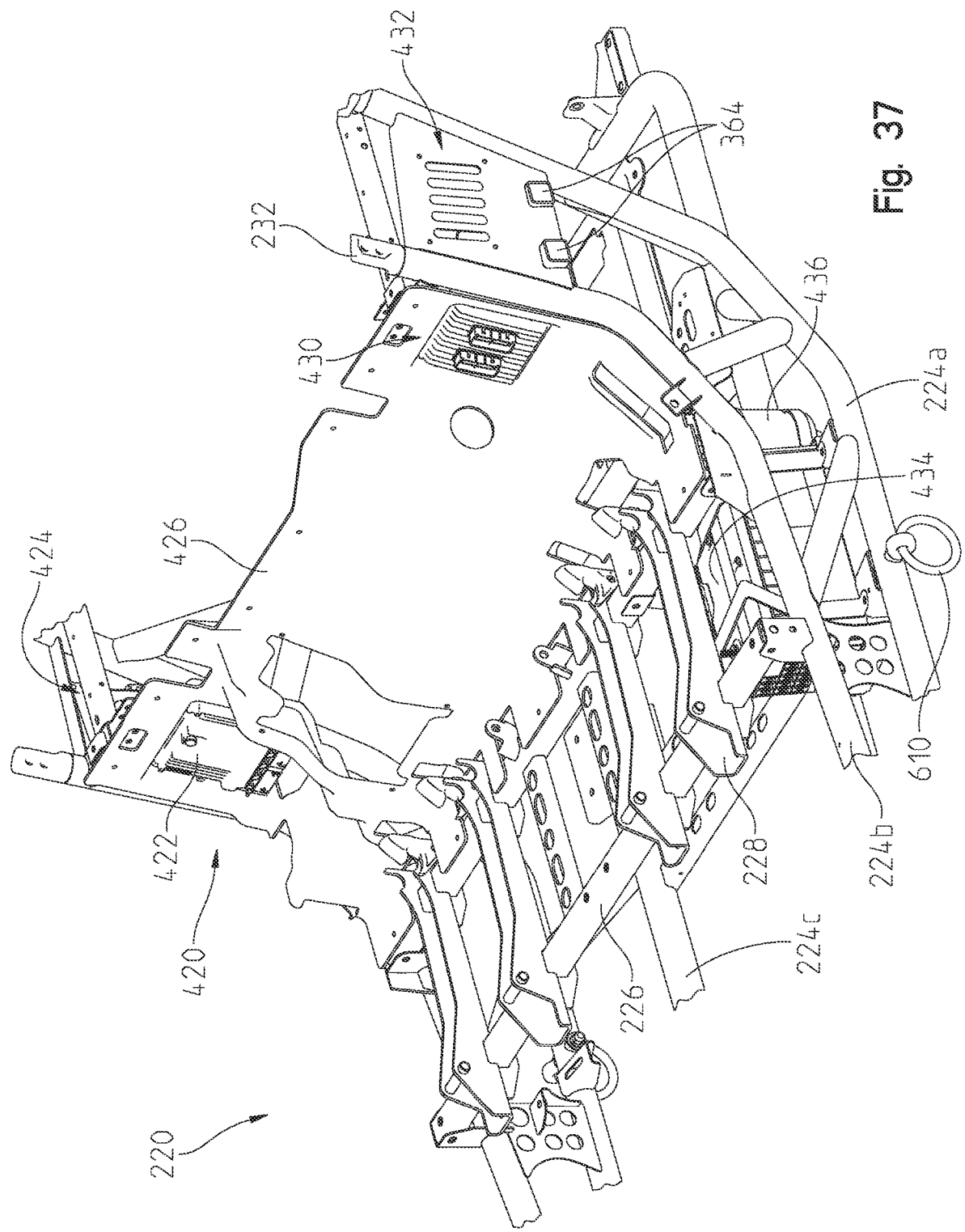
FIG. 37 is a front left perspective view of a portion of the lower frame assembly of FIG. 8 supporting an electrical assembly of the vehicle of FIG. 1.

Referring to FIGS. 37-41, an electrical system 420 of vehicle 10 is disclosed. Electrical system 420 may be operably coupled with many different systems and components of vehicle 10, such as components within operator area 38, driveline assembly 16, powertrain assembly 15, etc. Electrical system 420 includes an engine control module ("ECM") 422 and a transmission control module ("TCM") 424. Illustratively, ECM 422 and TCM 424 are positioned along a right side of vehicle 10 and are supported by body panels 426, however, in other embodiments, ECM 422 and TCM 424 may be positioned at any location on vehicle 10 and may be supported by other components, such as frame assembly 20. As shown in FIG. 37, body panel 426 may define a partition or wall between a portion of operator area 38 (e.g., seats 40, 42) and cargo frame assembly 222 and is positioned directly rearward of seat supports 228 for rear seats 42. In one embodiment, ECM 422 is supported within body panel 426 at a position rearward of and adjacent rear seat 42 along the right side of vehicle 10. TCM 424 is positioned approximately perpendicularly to ECM 422 and may be supported within body panel 426 or another body panel of vehicle 10. TCM 424 may be positioned laterally outward of ECM 422. In this way, ECM 422 and TCM 424 are positioned near the engine and transmission of powertrain assembly 15, as disclosed further herein, which decreases the length of wiring, cables, or other components required for ECM 422 to join with the engine and TCM 424 to join with the transmission.

Referring still to FIG. 37, electrical system 420 may include additional electrical components along a left side of vehicle 10. For example, additional electrical components may be supported within body panel 426 at a location 430 and may be supported by body panels or other vehicle components (e.g., frame assembly 20) at a location 432. In one embodiment, location 432 is positioned generally above receivers 364 on the left side of vehicle 10.

Figure 38:
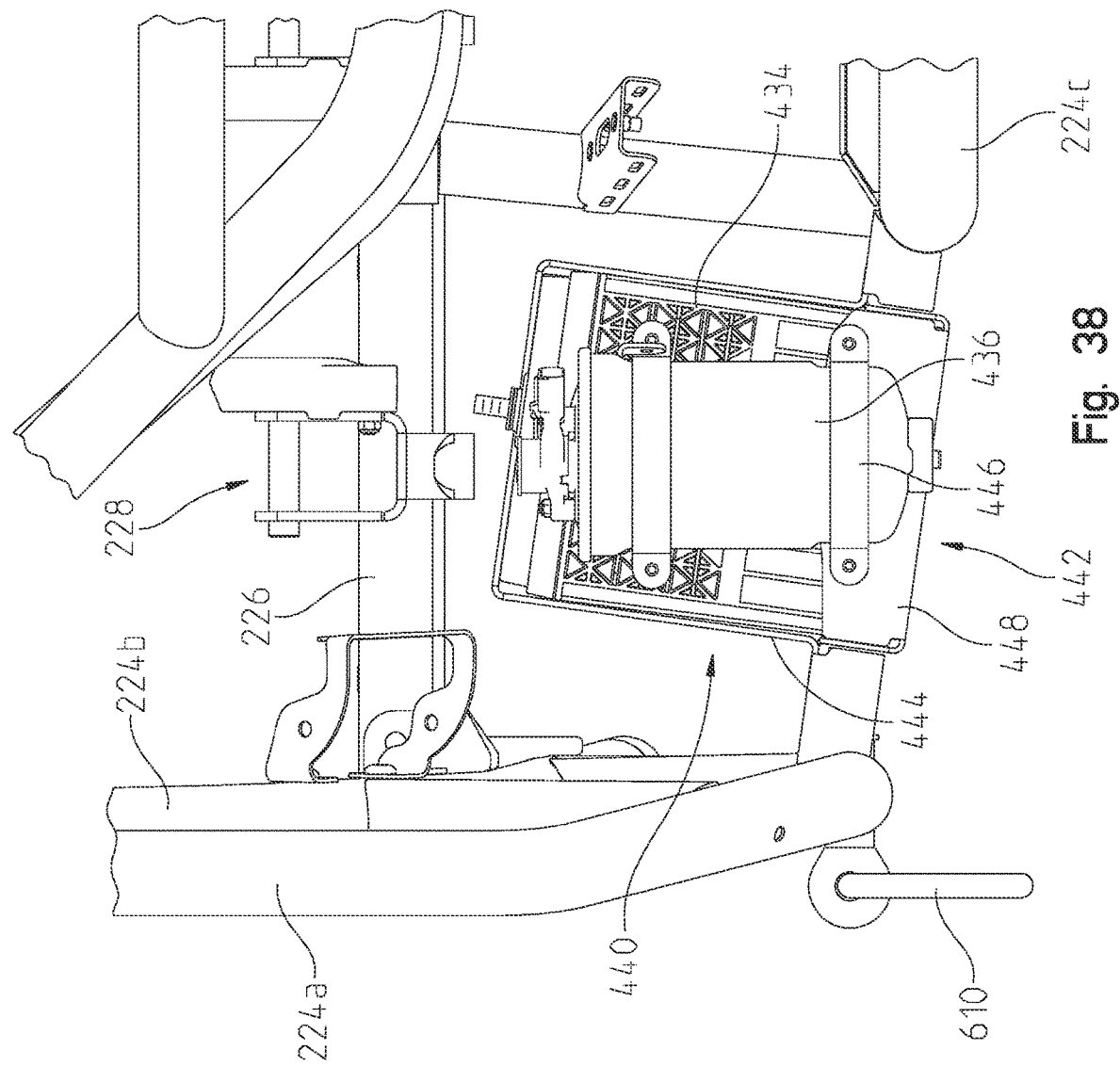
FIG. 38 is a left side view of the portion of the lower frame assembly of FIG. 37 supporting a battery of the electrical system.
Figure 39:
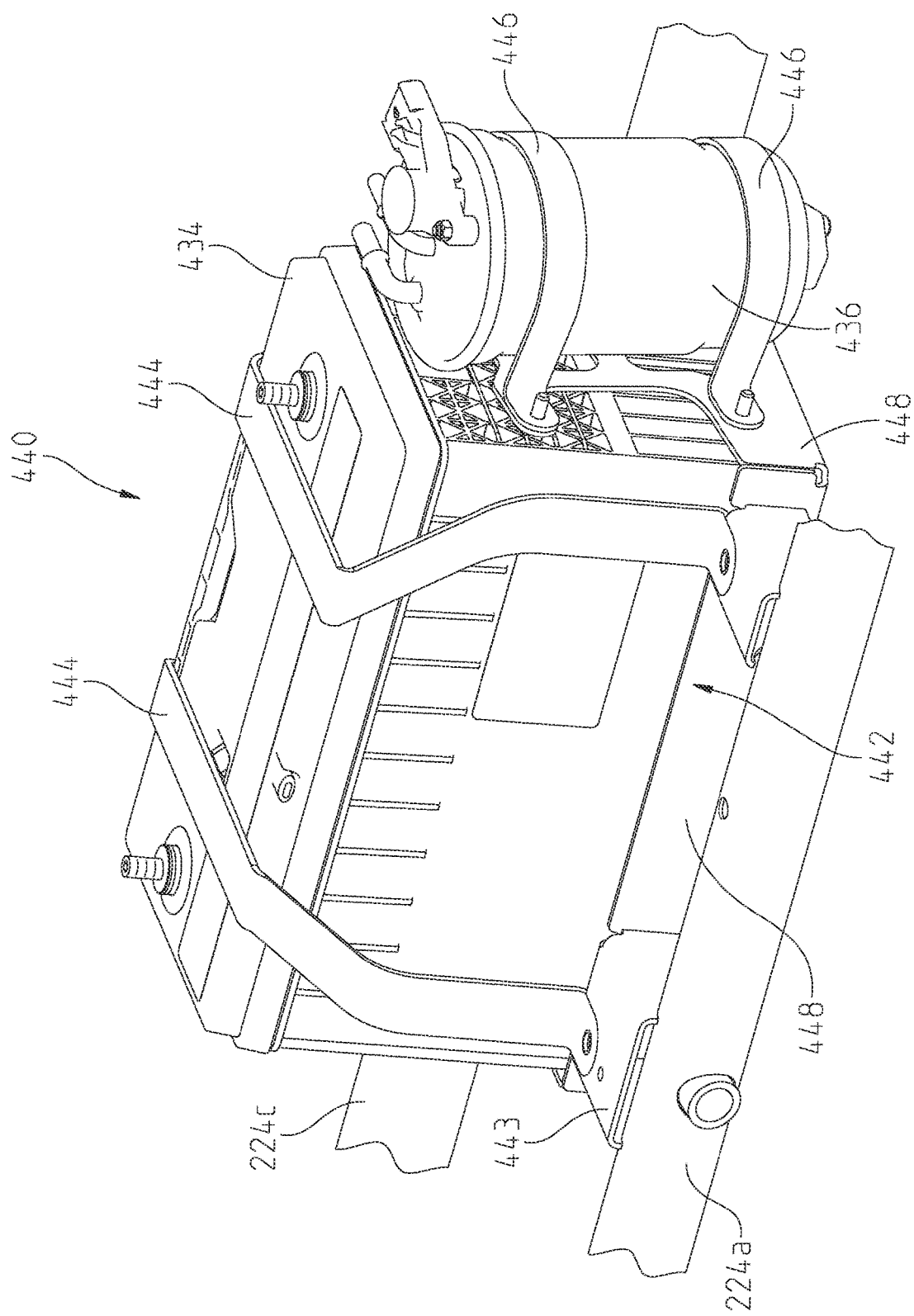
FIG. 39 is a front left perspective view of the battery and a battery mounting assembly of FIG. 38.
Figure 40:
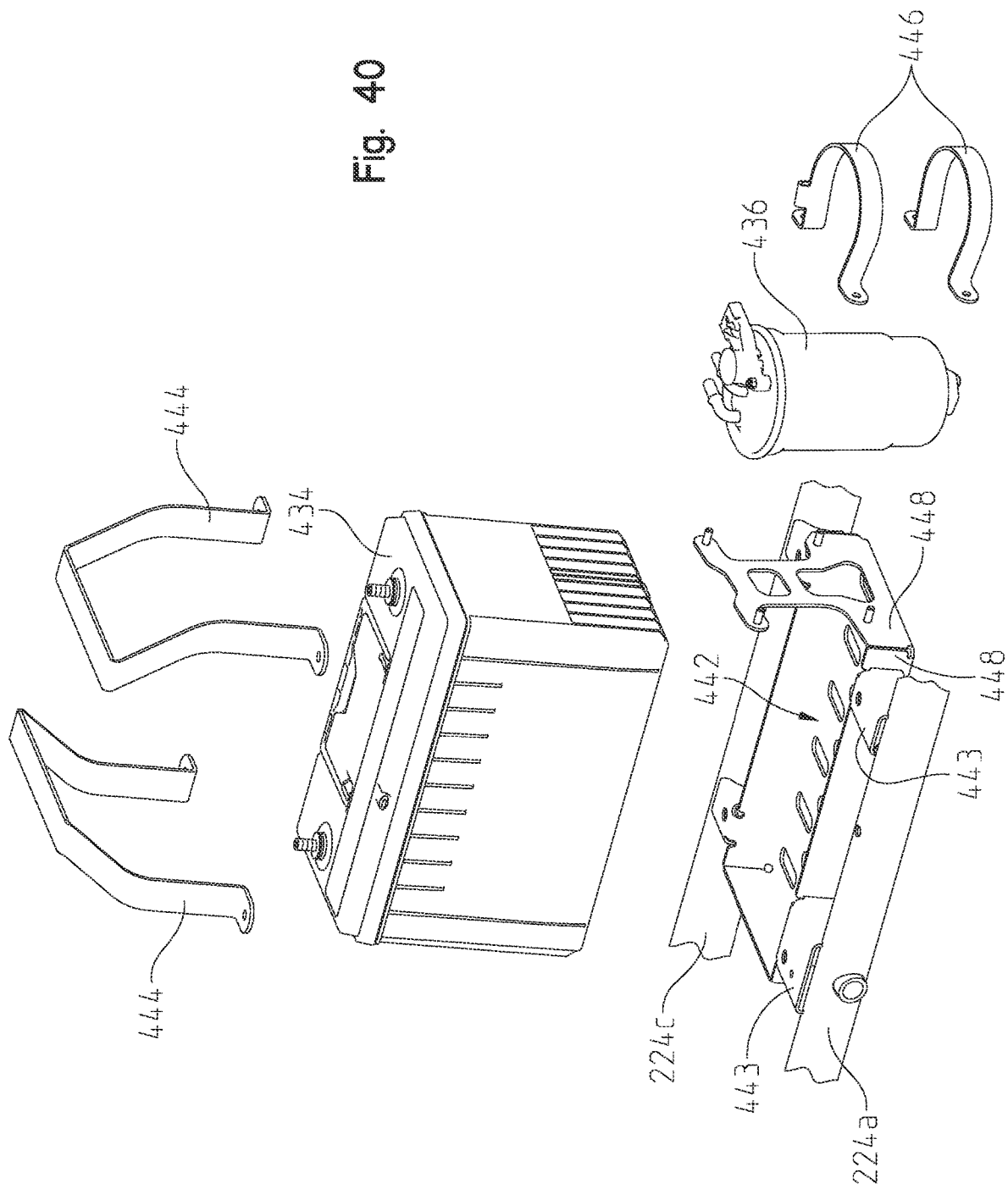
FIG. 40 is an exploded view of the battery and the battery mounting assembly of FIG. 39.

Referring to FIGS. 38-40, electrical system 420 also includes at least one battery 434. Battery 434 may be positioned below at least one of rear seats 42 and, more particularly, may be positioned below at least one of seat supports 228. Illustratively, battery 434 is positioned adjacent first longitudinally-extending frame members 224a and second longitudinally-extending frame members 224b of main frame portion 220 and, more particularly, is positioned laterally inward of first and second longitudinally-extending frame members 224a, 224b. Battery 434 also is positioned below cross-members 226. In this way, battery 434 is generally protected by at least main frame portion 220 of rear frame portion 30. Battery 434 also may be positioned adjacent a fuel/water separator 436.

As shown in FIGS. 38-41, a battery mounting assembly 440 is disclosed. Battery mounting assembly 440 includes a support plate 442, a first strap 444 (illustratively two first straps 444), and a second strap 446 (illustratively two second straps 446). Support plate 442 is coupled to first and third longitudinally-extending members 224a, 224c of main frame portion 220 through extensions 443 of support plate 442. Support plate 442 includes upstanding partial walls 448 and is configured to support a lower portion of battery 434 between walls 448. First straps 444 are configured to extend over an upper portion of battery 434 and along the longitudinal sides of battery 434 to couple with an upper surface of extensions 443. In this way, battery 434 is retained on support plate 442 with walls 448 and first straps 444.

Support plate 442 also includes an upstanding bracket 449 defining the rearward-most wall of support plate 442. Bracket 449 extends above walls 448 and is positioned longitudinally intermediate battery 434 and fuel/water separator 436. Second straps 446 have a shape generally complementary to that of fuel/water separator 436 and extend around at least a portion of fuel/water separator 436 for securing fuel/water separator 436 to bracket 449. In this way, battery mounting assembly 440 is configured to both support battery 434 and an additional component, such as fuel/water separator 436. Because of the configuration of bracket 449, fuel/water separator 436 is positioned directly rearward of battery 434.

Figure 41:
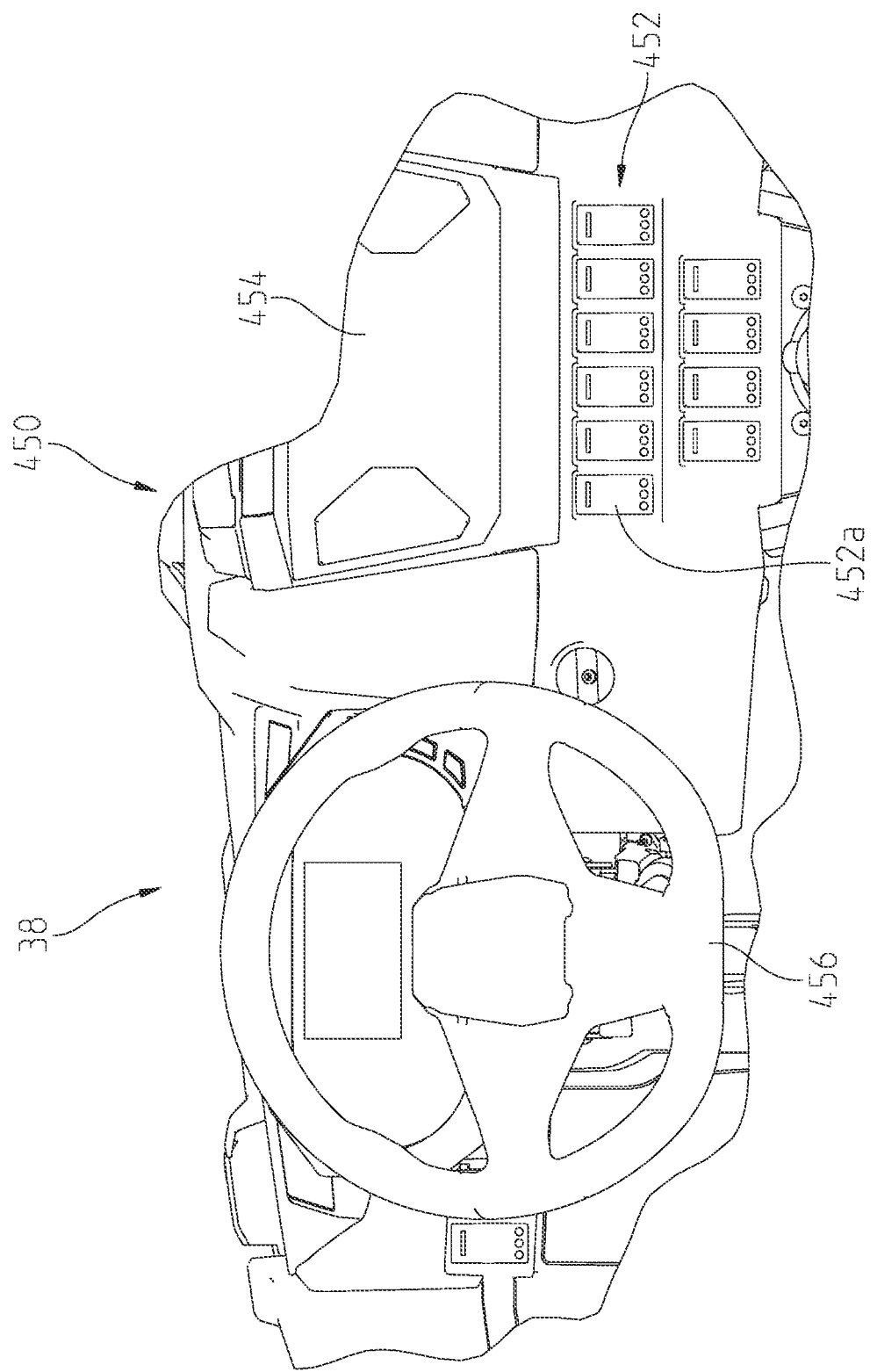
FIG. 41 is a rear view of an operator area of the vehicle of FIG. 1.

Referring now to FIG. 41, electrical system 420 includes a plurality of operator controls 450 positioned within operator area 38. Operator controls 450 may be defined as inputs configured to be selectively activated or deactivated by the operator or passengers of vehicle 10. For example, operator controls 450 may include a plurality of inputs 452 defined as push buttons, levers, knobs, switches, cables, and the like. Additionally, operator controls 450 may include a display or gauge 454, which, in various embodiments, may be a touch-screen display configured to provide information to the operator and/or receive an input from the operator or passenger.

Operator inputs 452 may control various aspects of powertrain assembly 15 and driveline assembly 16. Additionally, operator inputs 452 may control various aspects of suspension assemblies 24, 26, operating modes, etc. In particular, one of operator inputs 452 is shown as input 452a and is positioned closest to a steering wheel 456 in order to easily allow the operator to select or deselect the input available at input 452a. For example, input 452a may be configured as a rocker switch allowing the operator to upshift or downshift when vehicle 10 operates in a manual mode. Therefore, because the operator's hands are already at steering wheel 456, it is easy and convenient for the operator to access input 452a adjacent steering wheel 456 when it is desired to make a transmission shift selection.

Based on the application of vehicle 10, it may be desirable for vehicle 10 to operate in the blackout mode or stealth noted herein. When in the blackout mode, vehicle 10 does not have any visible lights illuminated. Instead, vehicle 10 relies on IR lights capable of being seen with night-vision technology only. As such, operator inputs 450 are configured with IR lights such that the operator can see (via night-vision technology) and select of any operator controls 450 when in the blackout mode without any visible lights illuminated. Additionally, if it is necessary to send a notification to the operator on display 454 or otherwise when vehicle 10 is operating in the blackout mode, the message (e.g., error code/message) is an IR code and is not illuminated with visible light. In this way, the operator can see the message with night-vision technology but the message does not illuminate otherwise.

Referring to FIGS. 42-48, powertrain assembly 15 and driveline assembly 16 are disclosed. Powertrain assembly 15 includes a prime mover 460 and a transmission 462. Prime mover 460 may be a diesel, natural gas, or gasoline internal combustion engine. Alternatively, prime mover 460 may be a hybrid engine, a motor/generator, or any other type of propulsion device configured to provide motive power to front and rear ground-engaging members 12, 14. Illustratively, prime mover 460 extends longitudinally and is positioned longitudinally rearward of transmission 462. Transmission 462 may be a continuously variable transmission or a shiftable transmission. In one embodiment, transmission 462 may be a rubber belt or steel belt continuously variable transmission. Transmission 462 is illustratively shown as a transaxle transmission and may be an automatic or manual transmission. Additional details of transmission 462 and vehicle 10 may be disclosed in U.S. Provisional Patent Application Ser. No. 62/961,442, filed Jan. 15, 2020, and entitled "POWERTRAIN FOR A UTILITY VEHICLE," the complete disclosure of which is expressly incorporated by reference herein.

Prime mover 460 is operably coupled to transmission 462. For example, prime mover 460 may be operably coupled to transmission 462 through a crankshaft (not shown) and a transmission input shaft (not shown). Transmission 462 is operably coupled with driveline assembly 16 through an output 464. More particularly, output 464 is operably coupled to a front prop shaft 466 which extends forwardly from output 464. Front prop shaft 466 is rotatably coupled to both output 464 and front differential 174 such that power from prime mover 460 is transferred to front prop shaft 466 through output 464 of transmission 462 in order to provide rotational power to half shafts 172 and front ground-engaging members 12 for moving vehicle 10.

A connection or joint 467 (e.g., a U-joint) of front prop shaft 466 may be operably coupled to a disconnect assembly 470 of front differential 174. Illustratively, disconnect assembly 470 includes an input shaft 472 rotatably coupled to front prop shaft 466 through joint 467 and is configured to engage or disengage front differential 174 from front prop shaft 466 depending on the selected operating mode of vehicle 10. More particularly, disconnect assembly 470 may include an electronic solenoid (not shown) configured to slide on a splined collar to engage or disengage front differential 174. As such, when it is desirable to operate vehicle 10 in an all-wheel drive or four-wheel drive mode, disconnect assembly 470 may slide the solenoid to a position that connects front differential 174 to front prop shaft 466. In this way, rotational power from transmission 462 is transmitted to front differential 174 through front prop shaft 466 in order to provide power to front ground-engaging members 12. However, when it is desirable to operate vehicle 10 a two-wheel drive mode and, therefore, not provide power to front ground-engaging members 12, disconnect assembly 470 may slide the solenoid to a position which disengages or disconnects front prop shaft 466 from front differential 174. In this way, power from transmission 462 is not transmitted to front ground-engaging members 12. Disconnect assembly 470 may be separable from a housing of front differential 174 or may be integral with the housing of front differential 174.

Output 464 also is operably coupled to a rear prop shaft 468 which extends rearwardly from output 464. Rear prop shaft 468 is rotatably coupled to both output 464 and rear differential 324 such that power from prime mover 460 is transferred to rear prop shaft 468 through output 464 of transmission 462 in order to provide rotational power to half shafts 322 and rear ground-engaging members 14 for moving vehicle 10.

Based on the configuration of driveline assembly 16, vehicle 10 may be selectively operated in any of a one-wheel drive mode, a two-wheel drive mode, a three-wheel drive mode, and a four-wheel drive mode. In one embodiment, transmission 462 may be a transaxle transmission configured with a locked spool at output 464 to turn prop shafts 466, 468 simultaneously and with the same torque. Rear prop shaft 468 is operably coupled to rear differential 324 with either an electric or manual lock. Front prop shaft 466 is operably coupled to disconnect assembly 470 which is actuated electronically or manually. Front differential 174, like rear differential 324, also may include an electric or manual lock. In this way, it is possible to drive all ground-engaging members 12, 14 simultaneously or to just drive one or some of ground-engaging members 12, 14.

More particularly, the operator can select from any of the following drive wheel combinations: (1) a one-wheel drive mode, where rear differential 324 is open and disconnect assembly 470 is open; (2) a first two-wheel drive mode, where rear differential 324 is locked and disconnect assembly 470 is open; (3) a second two-wheel drive mode, where rear differential 324 is open, disconnect assembly 470 is locked, and front differential 174 is open; (4) a first three-wheel drive mode, where rear differential is locked, disconnect assembly 470 is locked, and front differential 174 is open; (5) a second three-wheel drive mode, where rear differential 324 is open, disconnect assembly 470 is locked, and front differential 174 is locked; and (6) a four-wheel drive mode, where rear differential 324, disconnect assembly 470, and front differential 174 are locked.

Driving in the one-wheel drive mode may be beneficial for reducing the vehicle turn diameter and reducing or eliminating damage to grass and similar surfaces when ground-engaging members 12, 14 are turning. Driving with one front ground-engaging member 12 and one rear ground-engaging member 14 provides additional traction while still reducing the vehicle turn diameter and reducing/eliminating damage to grass or similar surfaces. Driving with both of rear ground-engaging members 14 provides additional traction by preventing rear differential 324 from shifting torque to the wheel with the least resistance. Driving with both of rear ground-engaging members 14 and one front ground-engaging member 12 provides additional traction over operation in the two-wheel drive mode but does not increase the steering effort. Driving with both front ground-engaging members 12 and one rear ground-engaging member 14 provides additional traction over the two-wheel drive mode and, in low traction conditions (e.g., snow), front ground-engaging members 12 may pull vehicle 10 while the non-driven rear ground-engaging member 14 provides stability to keep the rear of vehicle 10 from fishtailing. The four-wheel drive mode provides full torque to all ground-engaging members 12, 14 for the highest level of traction. Selection between any of these operating modes can be through any of operator inputs 450 (FIG. 41) (e.g., electrical switches, levers, cables, or any combination of inputs disclosed herein). Additional details of the operating modes and other aspects of vehicle 10 disclosed herein may be disclosed in U.S. Pat. No. 8,998,253, issued on Apr. 7, 2015, and entitled "FOLDING CAB FRAME;" U.S. Pat. No. 9,440,671, issued on Sep. 13, 2016, and entitled "VEHICLE;" U.S. Pat. No. 9,150,182, issued on Oct. 6, 2015, and entitled "VEHICLE;" U.S. Pat. No. 9,623,912, issued on Apr. 18, 2017, and entitled "VEHICLE;" U.S. Pat. No. 9,592,782, issued on Mar. 14, 2017, and entitled "VEHICLE;" U.S. Pat. No. 10,118,477, issued on Nov. 6, 2018, and entitled "HYBRID UTILITY VEHICLE;" U.S. patent application Ser. No. 16/414,217, filed on May 16, 2019, and entitled "HYBRID UTILITY VEHICLE;" and U.S. patent application Ser. No. 16/152,719, filed on Oct. 5, 2018, and entitled "HYBRID UTILITY VEHICLE," the complete disclosures of which are expressly incorporated by reference herein.

Referring still to FIGS. 42-48, a mounting assembly 472 for supporting powertrain assembly 15 on lower frame assembly 34 is disclosed. Mounting assembly 472 includes a front mounting assembly 474, an intermediate mounting assembly 475, and a rear mounting assembly 476. Front mounting assembly 474 is configured to secure transmission 462 to lower frame assembly 34 and includes a frame arm 478, a support arm 480, and a mounting bracket 482. Mounting bracket 482 is removably coupled to a frame extension 484 extending from third longitudinally-extending member 224c of main frame portion 220. In particular, a removable fastener 486 extends through an aperture 488 of mounting bracket 482 and into frame extension 484 to couple mounting bracket 482 to third longitudinally-extending member 224c. Because third longitudinally-extending member 224c defines a lower extent of lower frame assembly 34, mounting bracket 482 is positioned generally adjacent a lower portion of transmission 462.

Figure 46:
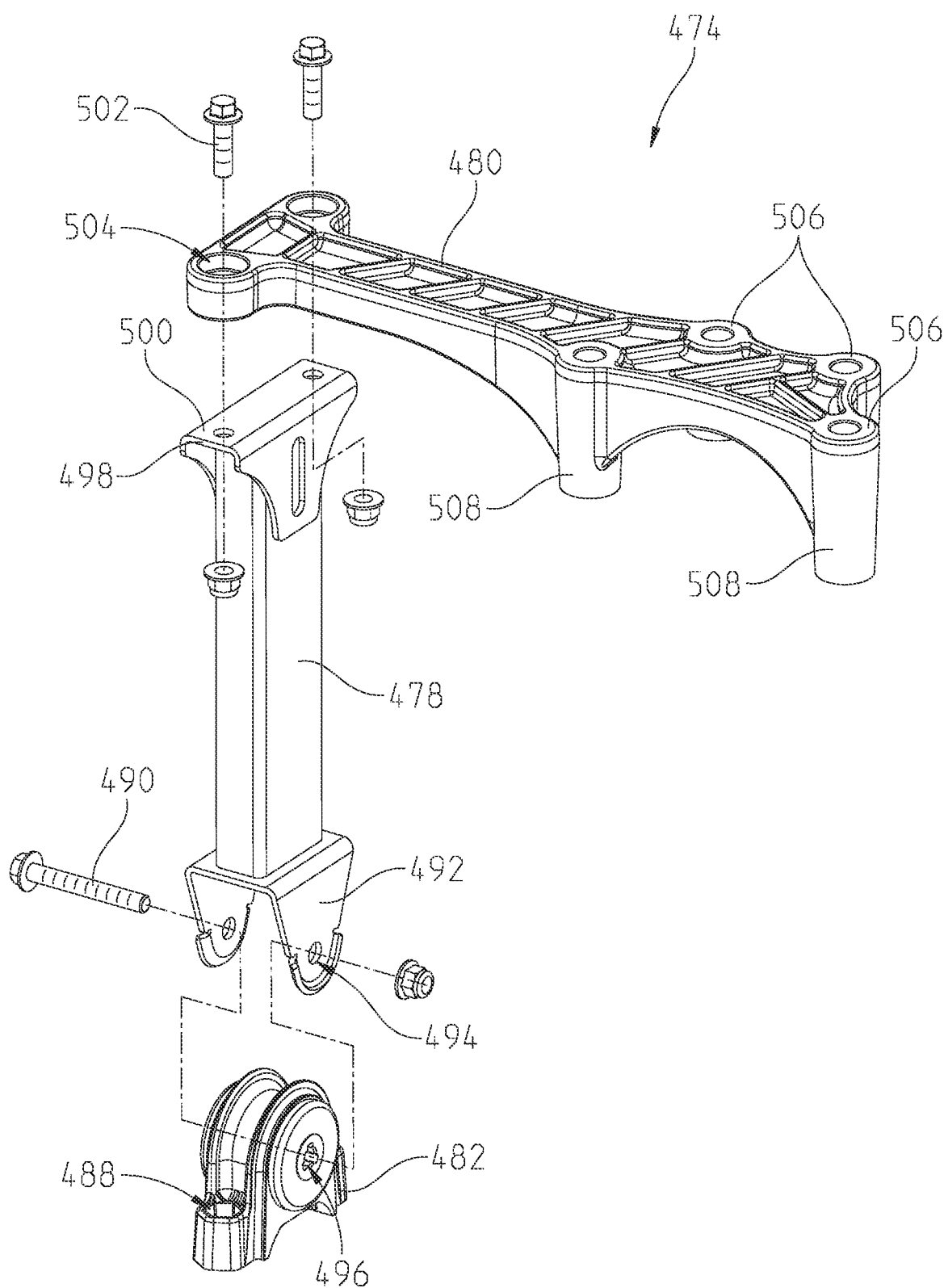
FIG. 46 is a front left perspective view of a first engine mount of the engine mounting assembly of FIG. 45.

Frame arm 478 is coupled to mounting bracket 482 with removable fasteners 490 and extends vertically from mounting bracket 482. Illustratively, flanges 492 of frame arm 478 extend around a portion of mounting bracket 482 such that respective apertures 494, 496 are aligned to receive fasteners 490. An upper end of frame arm 478 includes a coupling portion 498 having apertures 500 for receiving removable fasteners 502. As shown in FIG. 46, apertures 500 align with apertures 504 of support arm 480 to receive fasteners 502 and couple the upper end of frame arm 478 with an outer end of support arm 480.

Support arm 480 extends inwardly and over an upper surface of the housing of transmission 462. Support arm 480 includes a plurality of openings 506 configured to receive removable fasteners, such as bolts. The fasteners extend through openings 506 and bosses 508 and into the upper surface of the housing of transmission 462. As such, support arm 480 may prevent transmission 462 from moving longitudinally in vehicle 10; however, it is frame arm 478 and mounting bracket 482 which secure transmission 462 to frame assembly 20. In this way, transmission 462 is coupled to frame assembly 20 and does not merely hang from support arm 480.

Figure 47:
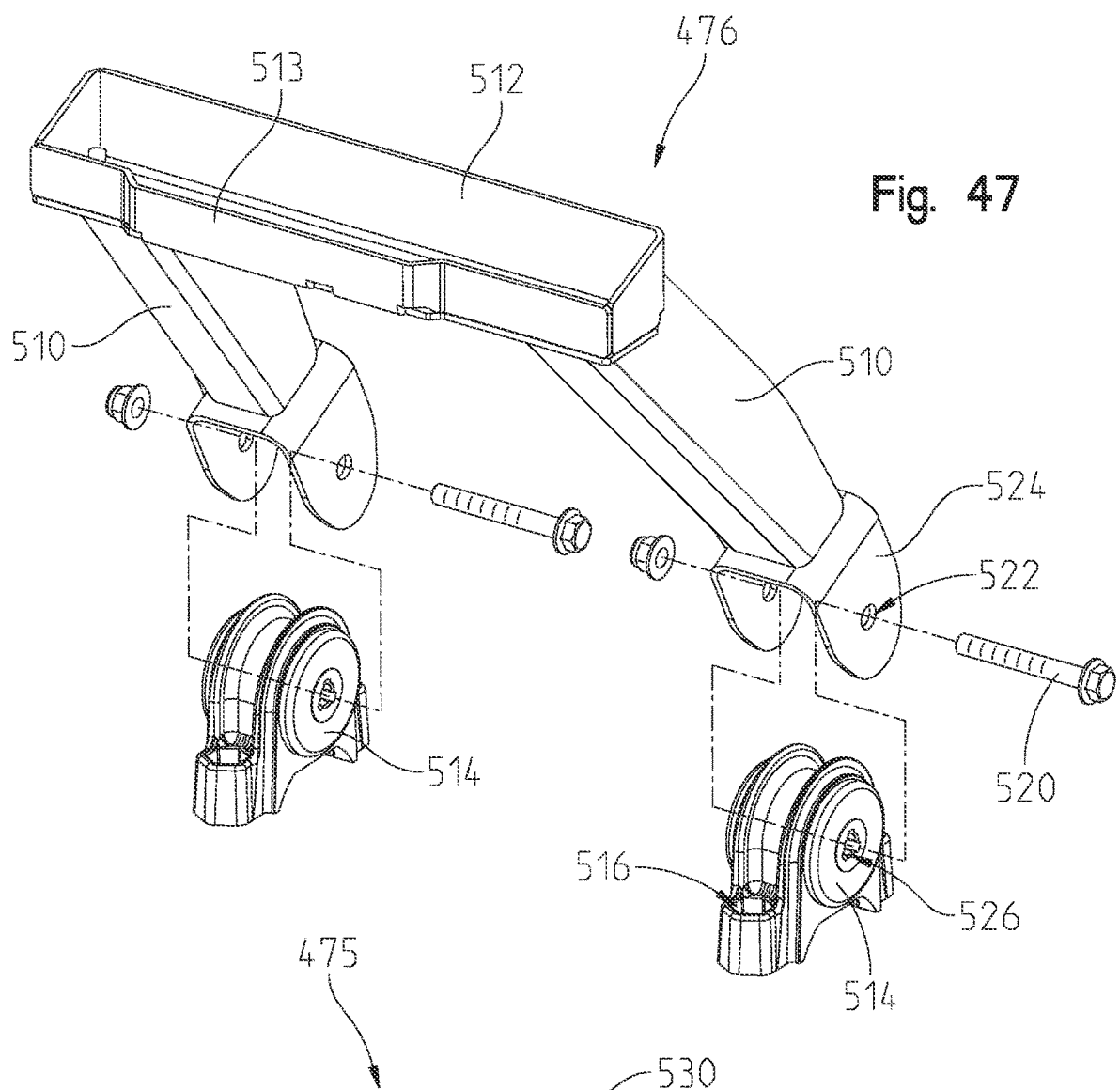
FIG. 47 is a front left perspective view of a second engine mount of the engine mounting assembly of FIG. 45.

As shown best in FIG. 47, rear mounting assembly 476 is configured to secure at least a rear portion of prime mover 460 to lower frame assembly 34 and includes parallel frame arms 510, a support arm 512, and mounting brackets 514. Mounting brackets 514 are removably coupled to a portion of rear frame portion 30 (FIG. 22) with removable fasteners (not shown) extending through an aperture 516 of each mounting bracket 514. More particularly, mounting brackets 514 are coupled to engine mounts 263 (FIG. 22). As shown best in FIG. 43, each mounting bracket 514 may be positioned above an oil pan of prime mover 460 based on the location of engine mounts 263.

Frame arms 510 are coupled to mounting brackets 514 with removable fasteners 520 and extend vertically forward at an angle from mounting brackets 514. Illustratively, flanges 522 of each frame arm 510 extend around a portion of the corresponding mounting bracket 514 such that respective apertures 524, 526 are aligned to receive fasteners 522. An upper end of each frame arm 510 is joined with support arm 512, either removably or integrally.

Support arm 512 extends between frame arms 510 and at an upper surface of prime mover 460. Support arm 512 includes a contact surface 513 which is configured to contact an upper, rear surface of prime mover 460. As such, support arm 512 may prevent prime mover 460 from moving longitudinally in vehicle 10; however, it is frame arms 510 and mounting brackets 514 which secure prime mover 460 to frame assembly 20. In this way, prime mover 460 is coupled to frame assembly 20.

Figure 48:
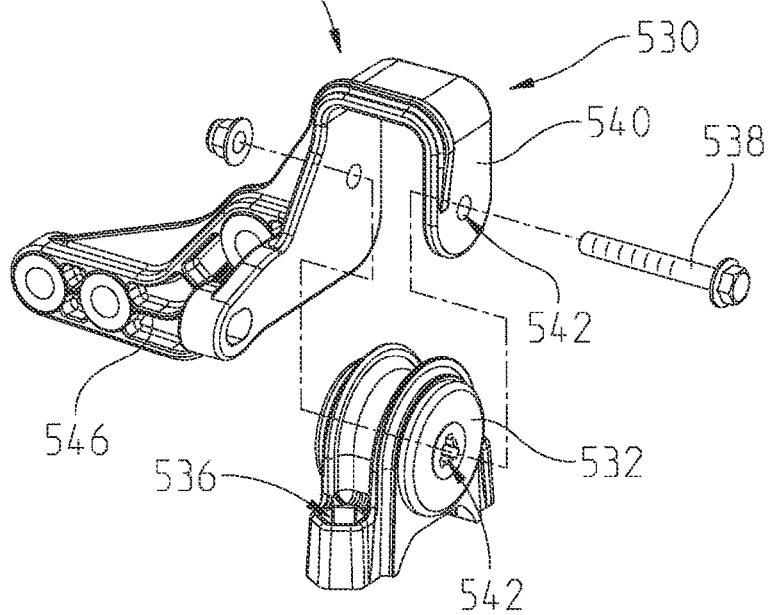
FIG. 48 is a front left perspective view of a third engine mount of the engine mounting assembly of FIG. 45.

With respect to FIG. 48, intermediate mounting assembly 475 is shown. Intermediate mounting assembly 475 is configured to secure output 464 of transmission 462 to lower frame assembly 34 and includes a support arm 530 and a mounting bracket 532. Mounting bracket 532 is removably coupled to a frame extension 534 (FIG. 45) extending from third longitudinally-extending member 224c of main frame portion 220. In particular, a removable fastener (not shown) extends through an aperture 536 of mounting bracket 532 and into frame extension 534 to couple mounting bracket 532 to third longitudinally-extending member 224c. Because third longitudinally-extending member 224c defines a lower extent of lower frame assembly 34, mounting bracket 532 is positioned generally adjacent a lower portion of output 464.

Support arm 530 is coupled to mounting bracket 532 with at least one removable fastener 538 and extends upwardly from mounting bracket 532. Illustratively, a flange 540 of support arm 530 extend around a portion of mounting bracket 532 such that respective apertures 542, 544 are aligned to receive fasteners 538. An inner portion 546 of support arm 530 extends laterally inwardly from flange 540 and is configured to couple with a portion of output 464.

Figure 42:
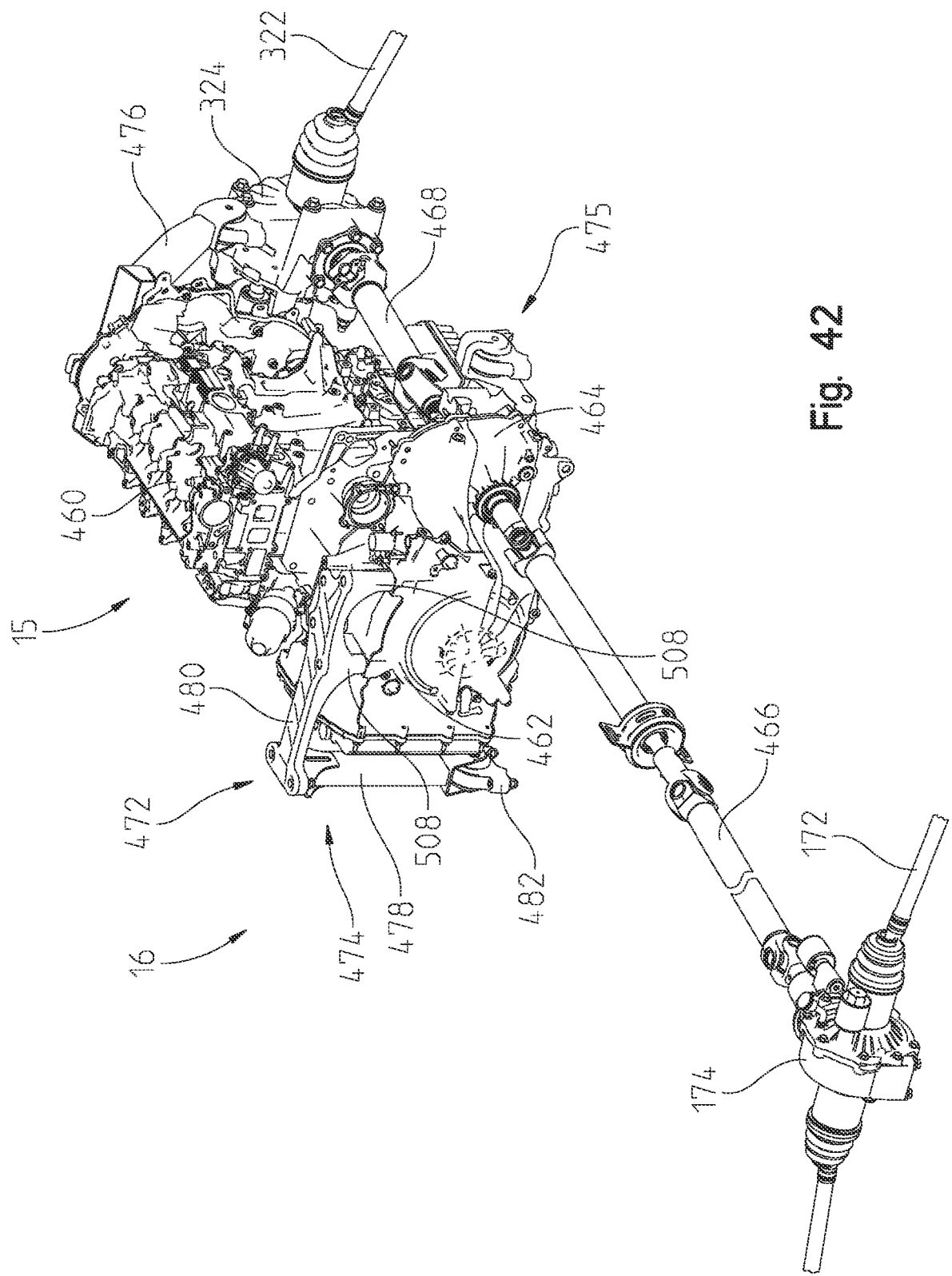
FIG. 42 is a front left perspective view of a powertrain assembly of the vehicle of FIG. 1.
Figure 43:
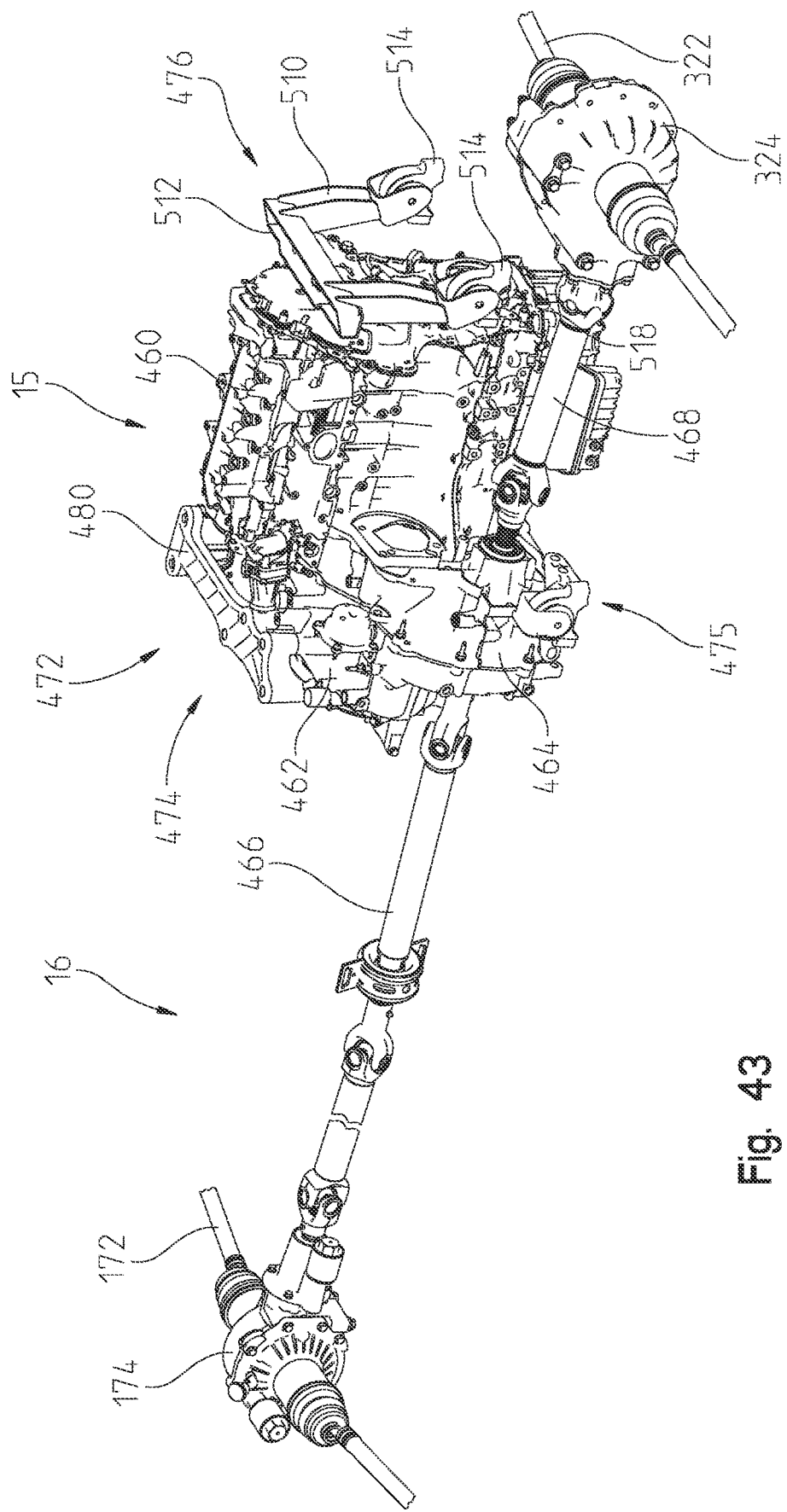
FIG. 43 is a rear left perspective view of the powertrain assembly of FIG. 42.
Figure 44:
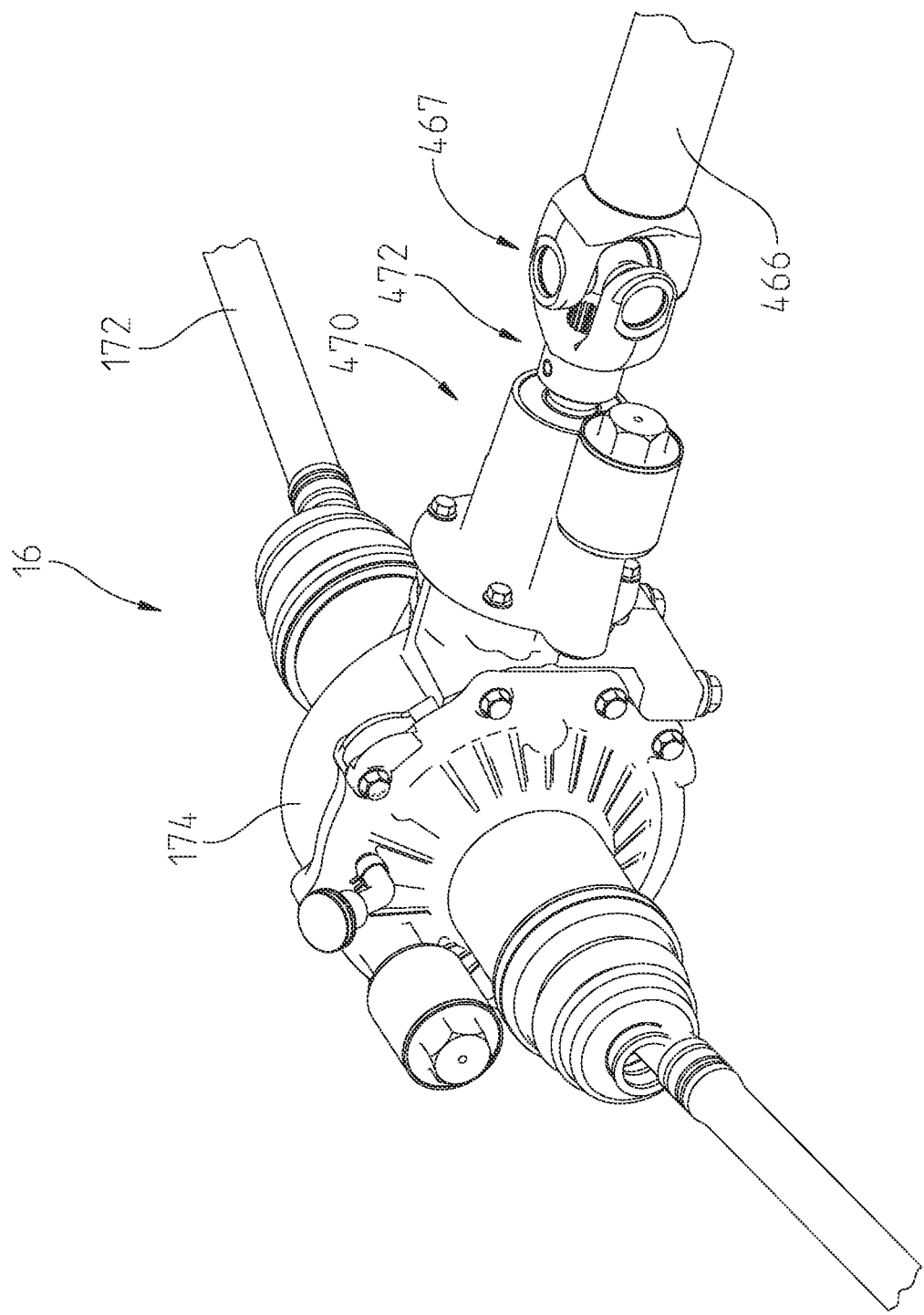
FIG. 44 is a rear left perspective view of a prop shaft coupled to a front drive or front gearcase of the powertrain assembly of FIG. 42.
Figure 45:
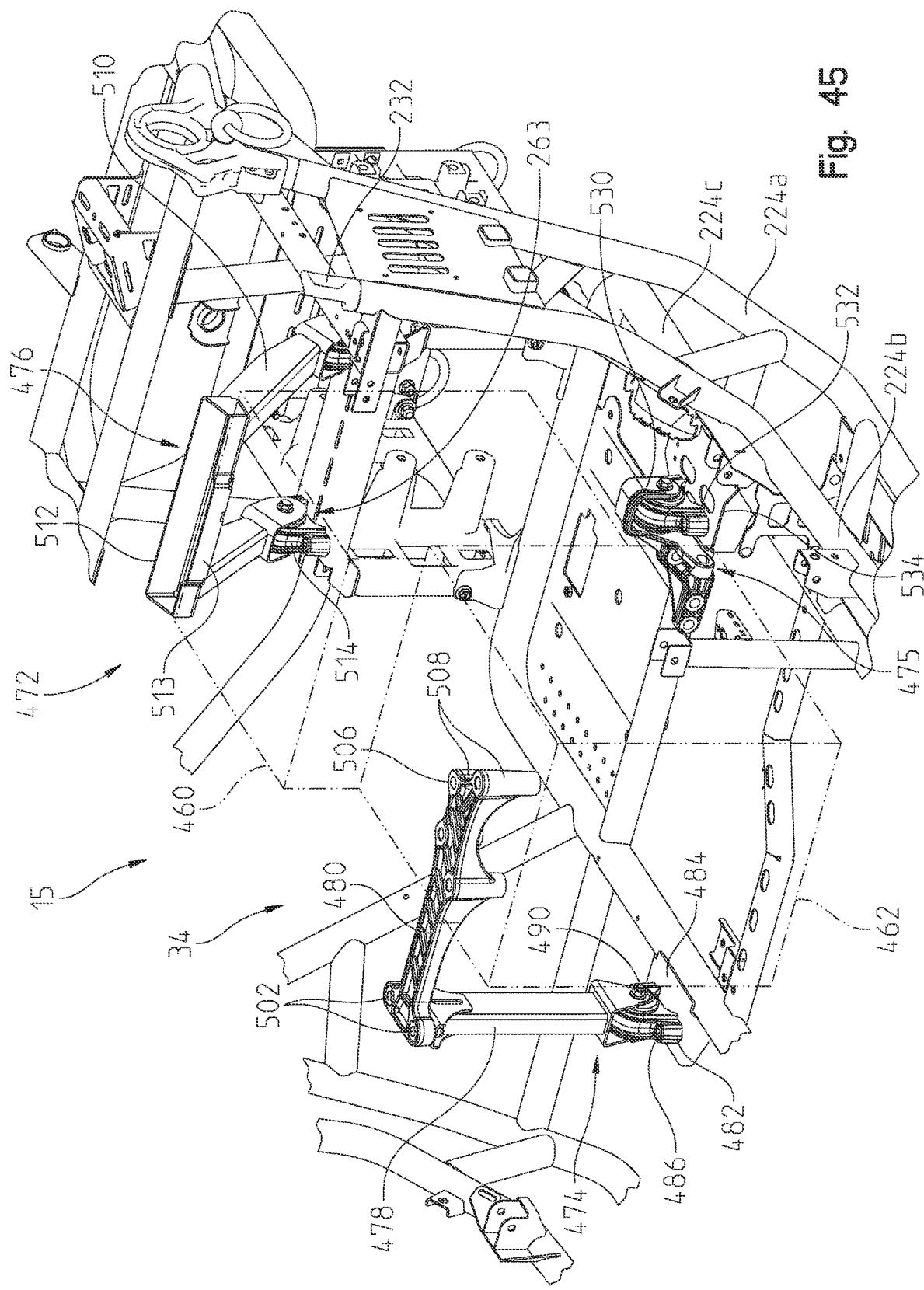
FIG. 45 is a front left perspective view of an engine mounting assembly of the powertrain assembly of FIG. 42.
Figure 49:
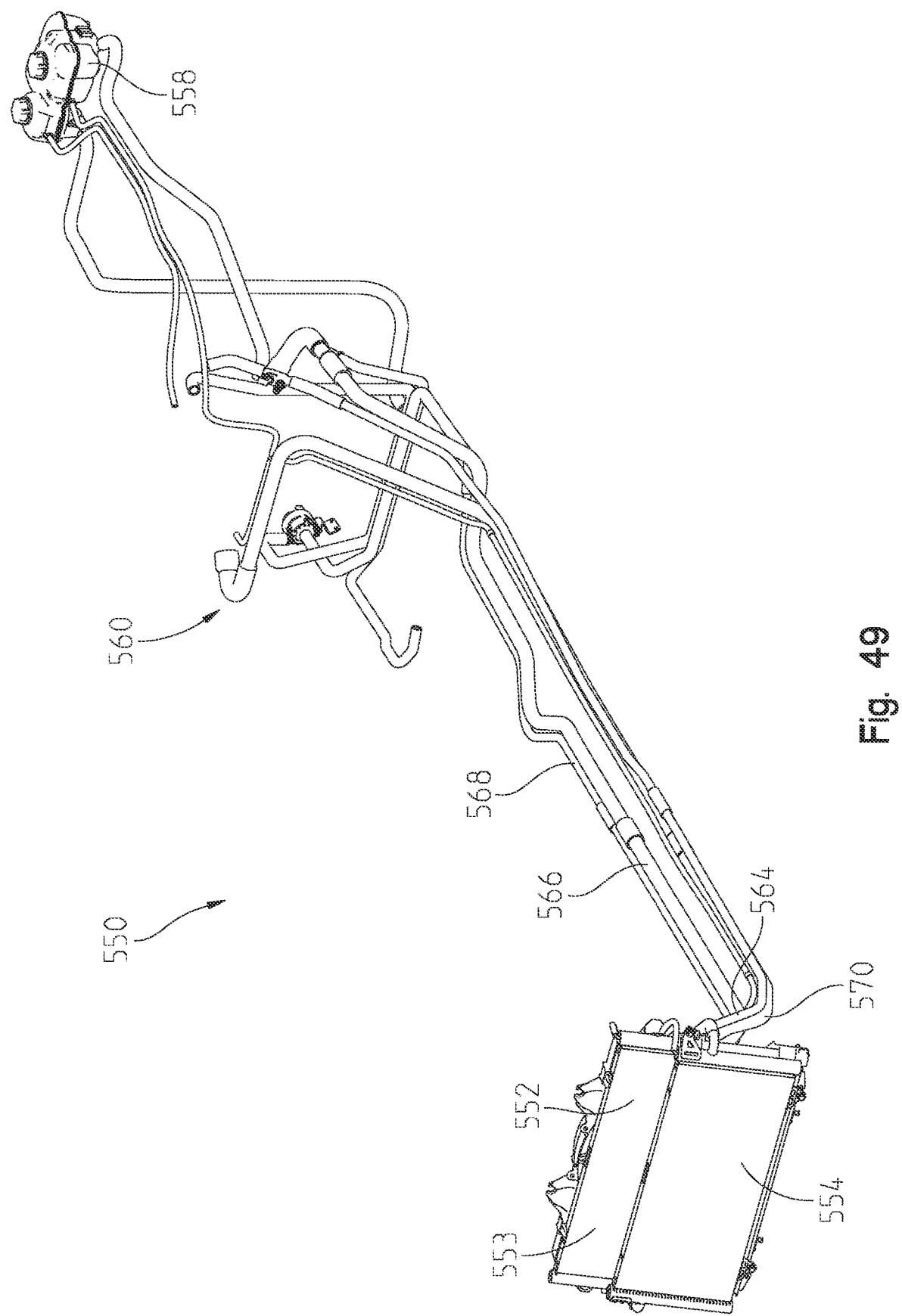
FIG. 49 is a front left perspective view of a first embodiment cooling assembly of the vehicle of FIG. 1.
Figure 50:
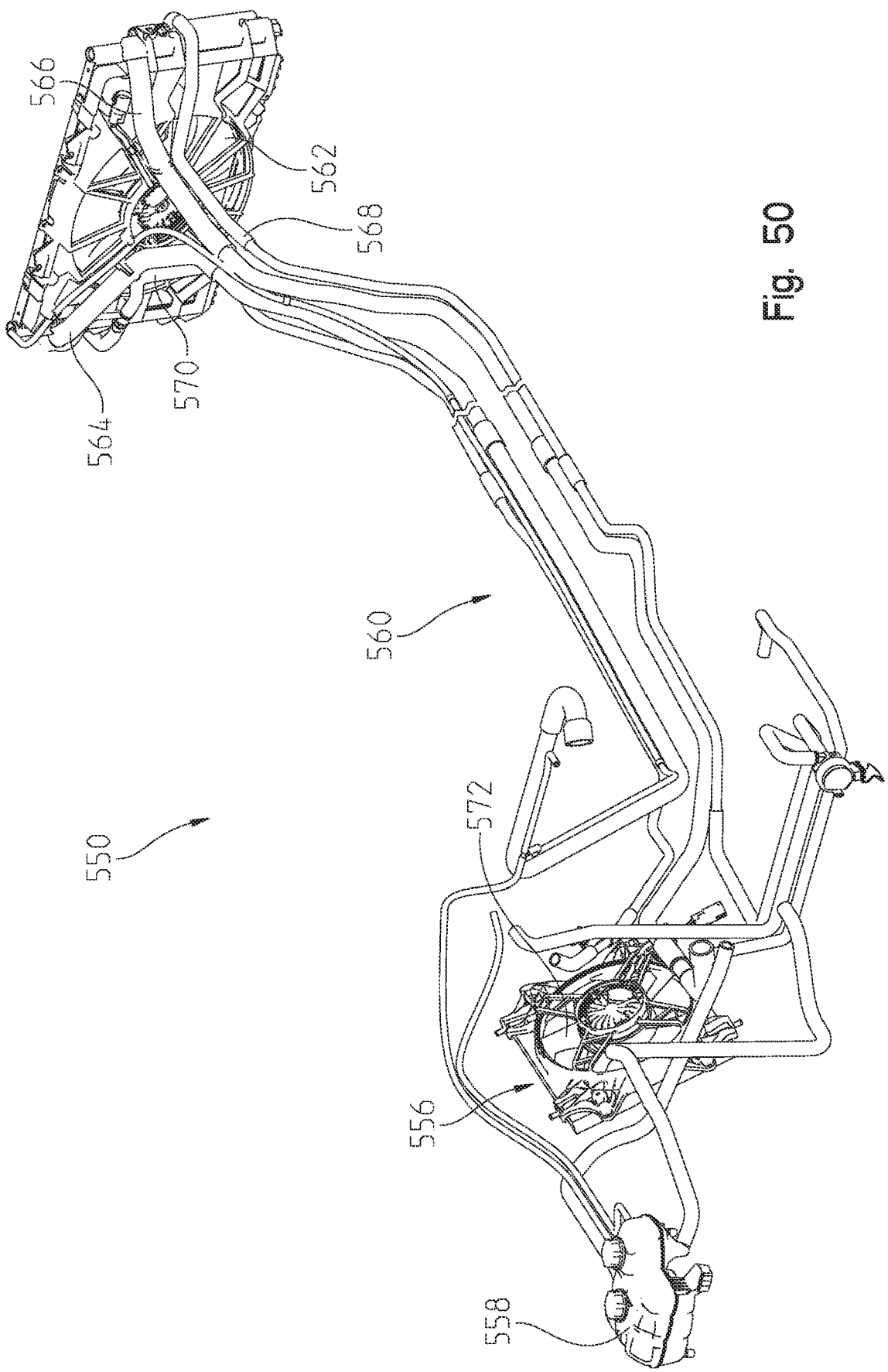
FIG. 50 is a rear right perspective view of a second embodiment cooling assembly of the vehicle of FIG. 1.
Figure 51:
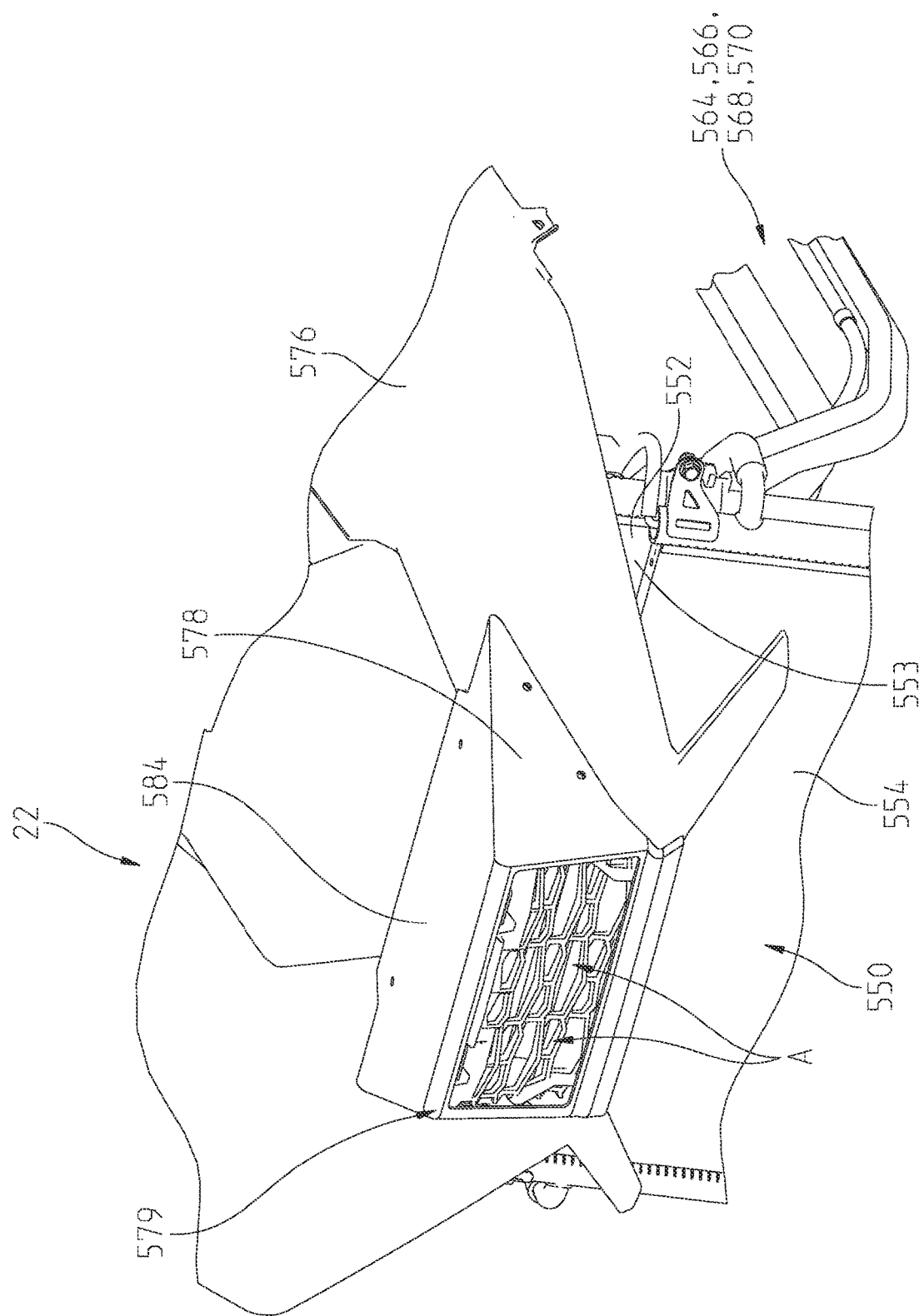
FIG. 51 is a front left perspective view of a portion of the cooling assembly of FIG. 49.

Referring to FIGS. 49-51, a cooling assembly 550 is disclosed. In the embodiment of FIG. 49, cooling assembly 550 includes at least a first radiator or heat exchanger 552, an secondary radiator 554, a coolant reservoir 558, and a plurality of coolant lines 560. Radiator 552 is part of a high-temperature system of cooling assembly 550 and is configured to cool prime mover 460 (FIG. 42). Secondary radiator 554 is part of a low-temperature system of cooling assembly 550. Illustratively, radiator 552 and secondary radiator 554 are positioned at a forward portion of vehicle 10 and supported by front frame portion 28. Secondary radiator 554 may be forward of radiator 552 and may be smaller than radiator 552 such that an upper portion 553 of radiator 552 is exposed and not concealed by secondary radiator 554. A fan 562 is positioned rearward of radiator 552 and secondary radiator 554 and is supported by front frame portion 28. Fan 562 is configured to pull ambient air A from the front of vehicle 10 to cool the coolant flowing through radiator 552 and secondary radiator 554.

Radiator 554 is fluidly coupled to at least prime mover 460 (FIG. 42) through coolant lines 564, 566. Secondary radiator 554 is fluidly coupled to at least one other component of vehicle 10, such as a water pump and/or a turbocharger (not shown) of powertrain assembly 15, through coolant lines 568, 570. More particularly, when secondary radiator 554 is fluidly coupled with a turbocharger of vehicle 10, secondary radiator 554 is configured to cool the charged air flowing from the turbocharger to prime mover 460.

Coolant reservoir 558 may be fluidly coupled to radiator 552 and secondary radiator 554 through any of coolant lines 564, 566, 568, 570. Coolant reservoir 558 may have a plurality of chambers therein or may be configured as a plurality of coolant reservoirs joined together. More particularly, coolant reservoir 558 includes at least a chamber or reservoir for prime mover 460 and a chamber for the low-temperature component(s) fluidly coupled to secondary radiator 554 (e.g., turbocharger).

In one embodiment of cooling assembly 550, as shown in FIG. 50, an oil cooler 556 also is provided and configured for cooling the oil for transmission 462 (FIG. 42). A fan 572 is positioned with oil cooler 556 to promote air flow through oil cooler 556. More particularly, if oil cooler 556 was to be positioned at front frame portion 28 with radiator 552 and secondary radiator 554, then there may not be sufficient air flow through radiator 552 to cool prime mover 460 or radiator 552 would have to increase in size in order to accommodate the decreased flow of cooling ambient air therethrough to be able to sufficiently cool prime mover 460. Therefore, oil cooler 556 may be positioned away from radiator 552 and secondary radiator 554 in order to allow radiator 552 to operate properly and minimize the size thereof. As such, oil cooler 556 is supported at rear frame portion 30 (FIG. 8) and may face laterally outward. However, at this location, there may not be sufficient RAM air like there is at the front of vehicle 10 and, therefore, fan 572 is provided to pull air through oil cooler 556.

Additionally, by positioning oil cooler 556 at rear frame portion 30, oil cooler 556 is closer to transmission 462 and, therefore, lines or conduits fluidly coupling oil cooler 556 and transmission 462 may be reduced in length. Shorter lines or conduits between oil cooler 556 and transmission 462 may mean that there is less risk of restriction in the lines or conduits. Therefore, smaller lines or conduits may be used with the same restriction.

As disclosed herein, cooling assembly 550 includes at least three heat exchangers 552, 554, 556 and at least two fans 562, 572. Illustratively, radiator 552, secondary radiator 554, and fan 562 are positioned at front frame portion 28 and oil cooler 556 and fan 572 are positioned at rear frame portion 30. Oil cooler 556 is longitudinally rearward of radiator 552 and secondary radiator 554 and is positioned laterally outward of radiator 552 and secondary radiator 554. More particularly, radiator 552 and secondary radiator 554 are positioned along longitudinal centerline L while oil cooler 556 may be laterally outward of longitudinal centerline L. As such, oil cooler 556 is longitudinally and laterally offset from radiator 552 and secondary radiator 554.

Referring to FIG. 51, regardless of whether cooling assembly 550 includes oil cooler 556 (FIG. 50) or not (FIG. 49), body panels 22 are configured to facilitate air flow through at least radiator 552 and secondary radiator 554 at the front of vehicle 10. Body panels 22 include a hood assembly 574 comprised of a main hood portion 576 and a hood scoop 578 coupled to main hood portion 576. Hood scoop 578 includes an open end 579 facing forwardly which is rectangular or square in shape and expands laterally while reducing vertically along a rear wall 584. The geometric shape of hood scoop 578 is such that it promotes air capture and flow from bypass air flowing over hood assembly 574 and directs such air towards radiators 552, 554. Once air is captured at opening 579, it is redirected via angled rear wall 584 and distributed across the width of radiators 552, 554 to optimize cooling at radiators 552, 554. Additionally, the height of hood scoop 578 allows hood scoop 578 to act as a shroud to capture as much of the bypass air flowing along hood assembly 574 as possible.

Hood scoop 578 includes a secondary grille 580 which is positioned above a primary grille 582 (FIG. 1) and is configured to capture air flowing over main hood portion 576, which would normally bypass radiator 522, and instead direct such bypass air (shown as A) into radiator 552. More particularly, the angled shape of rear wall 584 angles incoming ambient air A towards upper and exposed portion 553 of radiator 552. As such, air flowing through primary grille 582 is generally perpendicular to radiator 552 and secondary radiator 554 and flows first through secondary radiator 554 before flowing through radiator 552. However, the air A flowing through secondary grille 580 flows above the air at primary grille 582 and hood scoop 578 is configured to direct air A specifically at upper exposed portion 553 of radiator 552. Additionally, air from hood scoop 578 also may be directed into secondary radiator 554.

By including hood scoop 578 on vehicle 10, various accessories (e.g., a winch, drone carrier, breaching implements, etc.) may be placed on vehicle 10 at front frame portion 28 and, more particularly, in front of radiators 552, 554, because even if such accessories blocked some air flow through primary grille 582, additional air is received through hood scoop 578 to ensure proper cooling at radiators 552, 554. Hood scoop 578 may be particularly beneficial at higher vehicle speeds when cooling assembly 550 is dependent on RAM air to provide cooling.

Figure 52:
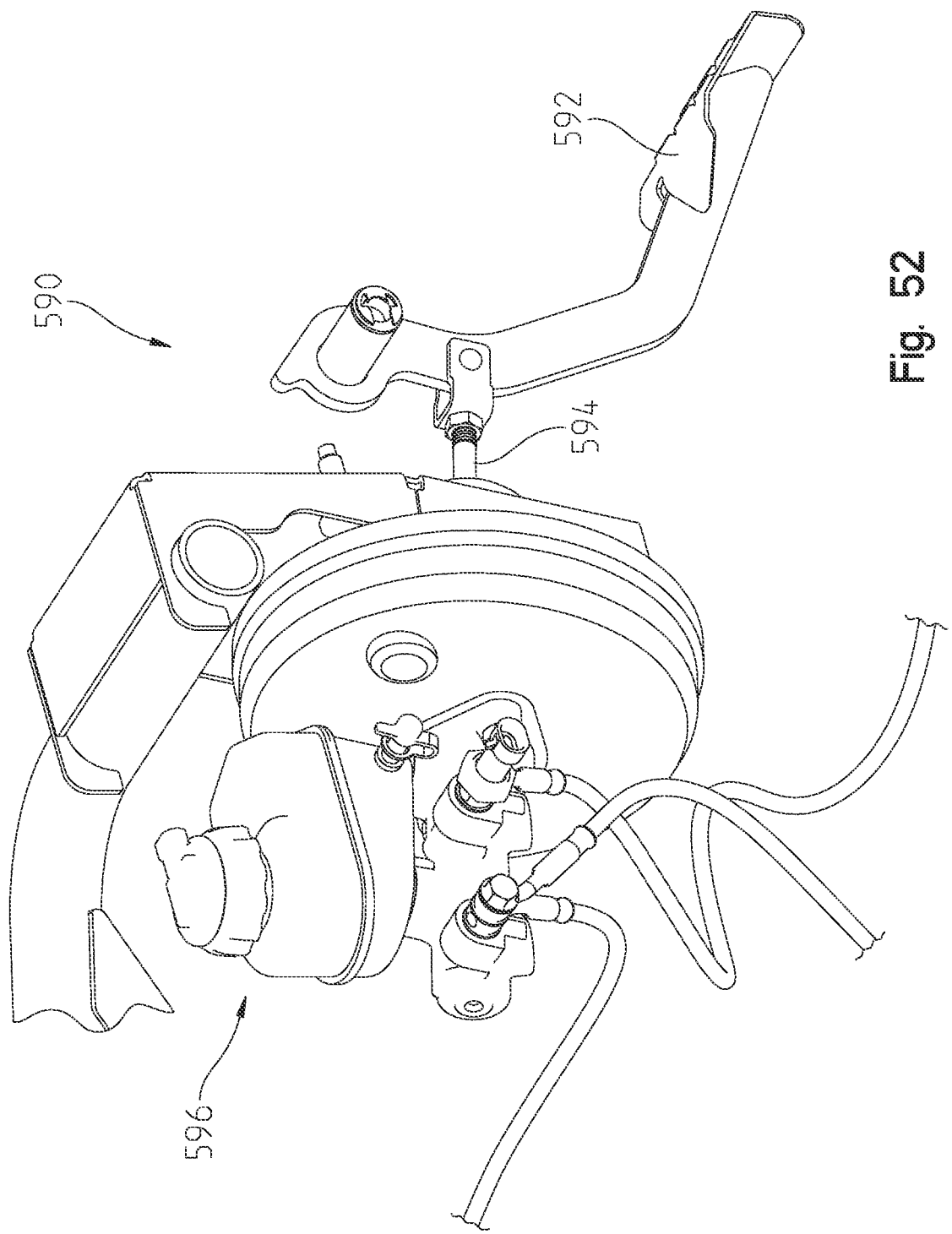
FIG. 52 is a front left perspective view of a portion of a braking assembly of the vehicle of FIG. 1.

Referring to FIG. 52, a brake assembly 590 is disclosed. Brake assembly 590 includes a brake pedal 592, an input rod 594, and a brake booster system 596. Brake booster system 596 is positioned forward of brake pedal 592 and is operably coupled to brake pedal 592 through input rod 594. More particularly, as the operator depresses brake pedal 592, the braking force applied to brake pedal 592 determines how much braking force to apply to front and/or rear ground-engaging members 12, 14. Based on vehicle weight, terrain conditions, environmental conditions, and other factors, it may be necessary to apply a large braking force to brake pedal 592 in order to ensure that vehicle 10 stops moving or remains stationary. As such, brake booster system 596 is configured to reduce the effort needed by the operator to apply a large braking force to brake pedal 592 under certain conditions. In operation, brake booster system 596 receives, via input rod 594, an input indicative of the braking force applied to brake pedal 592 by the operator. With the brake input from the operator, brake booster system 596 is configured to enhance the braking force applied at front and/or rear ground-engaging members 12, 14 such that the operator does not need to apply as large of a force on brake pedal 592 in order to achieve the braking result. Brake booster system 596 may be positioned where a brake master cylinder might normally be positioned relative to brake pedal 592.

Figure 53:
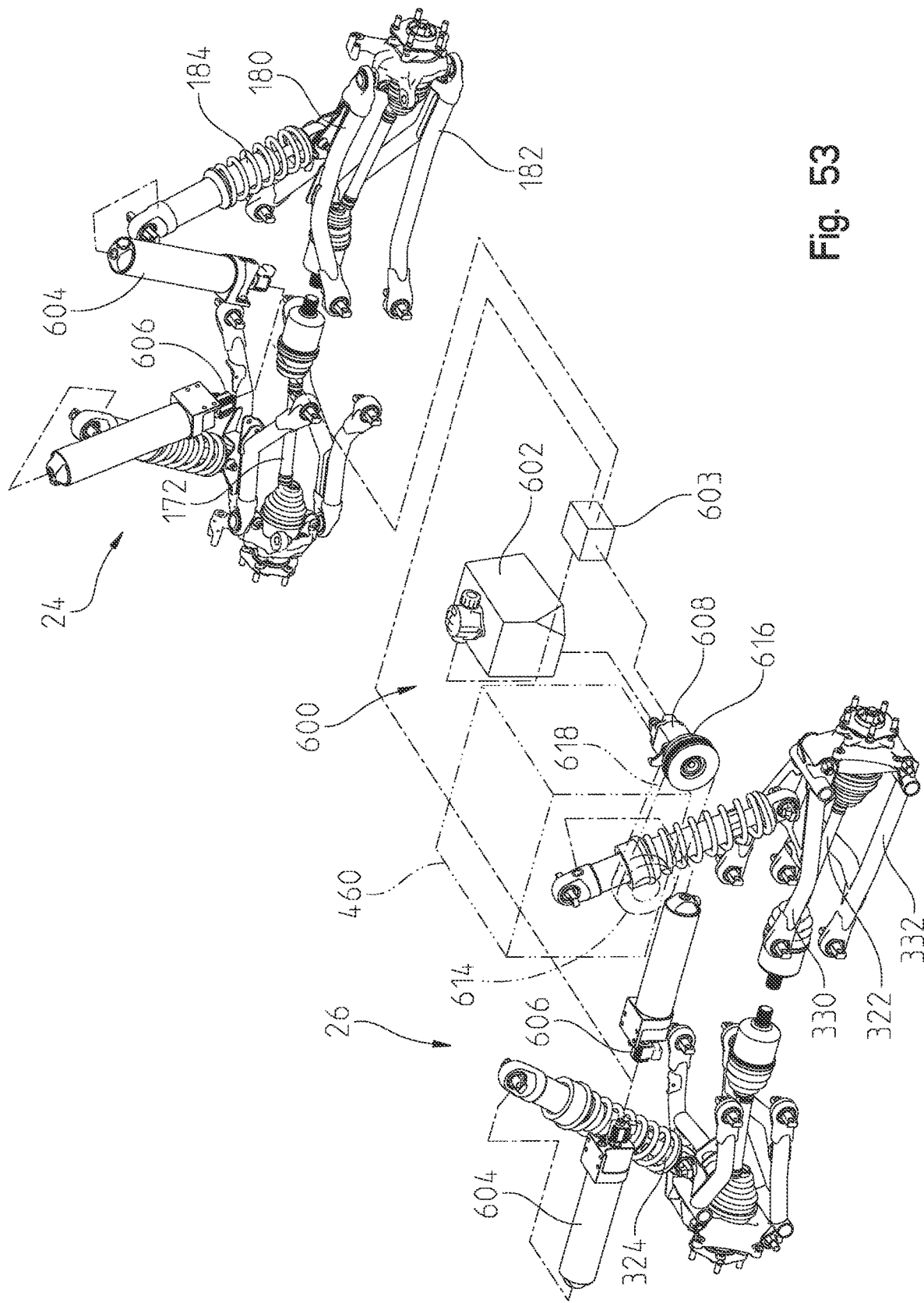
FIG. 53 is a front left perspective view of an adjustment system configured to adjust at least one parameter or condition of the front and rear suspension assemblies.

Referring to FIG. 53, front and rear suspension assemblies 24, 26 are shown operably coupled to a suspension adjustment system 600. In one embodiment, suspension adjustment system 600 is a ride-height or ride-leveling system configured to adjust the height of suspension assemblies 24, 26 relative to ground surface G (FIG. 3) by adjusting parameters of respective shock absorbers 184, 334. For example, sensors 181, 331 (FIGS. 17 and 30) of front and rear suspension assemblies 24, 26 are configured to communicate (electrically or otherwise; directly or indirectly) with suspension adjustment assembly 600 to transfer information about the vertical movement (e.g., jounce) of at least upper control arms 180, 330.

Suspension adjustment system 600 includes a central reservoir 602 fluidly coupled to shock reservoirs 604. In one embodiment, central reservoir 602 is a hydraulic reservoir configured to provide hydraulic fluid to any or all of shock reservoirs 604. Shock reservoirs 604 may be coupled to torsion bars 185, 335. A hydraulic manifold 603 is fluidly coupled to both central reservoir 602 and shock absorbers 184, 334 to provide hydraulic fluid from central reservoir 602 to shock reservoirs 604. For example, hydraulic manifold 603 may receive hydraulic fluid from central reservoir 602 and is configured to distribute, via hydraulic conduits or lines, the fluid between any or all of shock reservoirs 604. Shock reservoirs 604 are fluidly coupled to shock absorbers 184, 334 at ports 606 and are configured to adjust the height of shock absorbers 184, 334 with the fluid from central reservoir 602 and manifold 603. More particularly, a hydraulic conduit (not shown) extends between port 606 and shock absorber 184, 334 to flow hydraulic fluid to/from shock absorber 184, 334.

A controller may have a known plurality of positions from each sensor 181, 331 to achieve a ride height with a predetermined amount of ground clearance (e.g., 12" or 14" relative to ground surface G). For each shock absorber 184, 334, suspension adjustment system 600 can pump hydraulic fluid to raise suspension assemblies 24, 26 or dump hydraulic fluid to lower suspension assemblies 24, 26. The fluid will shuttle a piston in each shock reservoir 604 changing the gas volume (e.g., nitrogen) and, therefore, changing the gas pressure within each reservoir 604. By providing each shock absorber 184, 334 with its own reservoir 604 and controlling distribution of the hydraulic fluid at manifold 603, the height of each shock absorber 184, 334 may be adjusted independently from any other shock absorber 184, 334.

Central reservoir 602 is operably coupled to prime mover 460 (FIG. 42). More particularly, a pump 608 may be operably coupled with prime mover 460 through a belt 618 or other connecting mechanism such that prime mover 460 drives pump 608. Belt 618 may be a serpentine belt which also drives other components, such as an alternator, or may be a separate drive belt. More particularly, belt 618 is entrained about at least a drive pulley 614 on a crankshaft (not shown) of prime mover 460 and a driven pulley 616 operably coupled to pump 608. In this way, rotation of the crankshaft of prime mover 460 and drive pulley 614 causes rotation of belt 618, which in turn, drives driven pulley 616 to operate pump 608.

In one embodiment, driven pulley 616 is configured as or with an electromagnetic clutch. By using an electromagnetic clutch driven pulley 616 for pump 608, even though pump 608 is operably coupled to prime mover 460, it is not necessary for pump 608 to be actuated at all times. Instead, pump 608 only needs to operate when it is necessary to adjust one or more of shock absorbers 184, 334. More particularly, the electromagnetic clutch of driven pulley 616 allows belt 618 to rotate but does not engage with belt 618 until suspension adjustment system 600 receives an input to adjust a parameter of front and/or rear suspension assembly 24, 26. At that time, the electromagnetic clutch may be actuated such that pulley 616 and belt 618 (driven by prime mover 460) drive pump 608 to allow hydraulic fluid from central reservoir 602 to be distributed to any of shock absorbers 184, 334.

Based on various operating conditions or operator selections, pump 608 may be selectively or automatically engaged when it is desired to adjust the height of shock absorbers 184, 334. For example, the operator may select an input 452 (FIG. 41) to engage suspension adjustment system 600 to raise or lower the height of any of portion of front and rear suspension assemblies 24, 26 relative to ground surface G (FIG. 3) based on operating, terrain, or other conditions. Additionally, if vehicle 10 is being transported (e.g., via aircraft), it may be desirable to adjust (e.g., lower) front and rear suspension assemblies 24, 26 to facilitate to vehicle 10 being secured with the various mounting members disclosed herein. Because pump 608 is operably coupled to prime mover 460, pump 608 may be actuated any time prime mover 460 is operating, but pump 608 only needs to be actuated for adjusting the height of shock absorbers 184, 334. Therefore, no additional drag occurs on prime mover 460, less heat is generated, and the life of pump 608 may be extended.

In one embodiment, pump 608 may be operably coupled to prime mover 460 at a position for an air-conditioner compressor. However, it may be less desirable to use other/existing pumps on prime mover 460 (e.g., a power steering pump) for operating central reservoir 602 because such pumps may be always operating and generating heat in the oil. Additionally, it may not be possible to generate sufficient pressure from certain pumps (e.g., the power steering pump).

Figure 54:
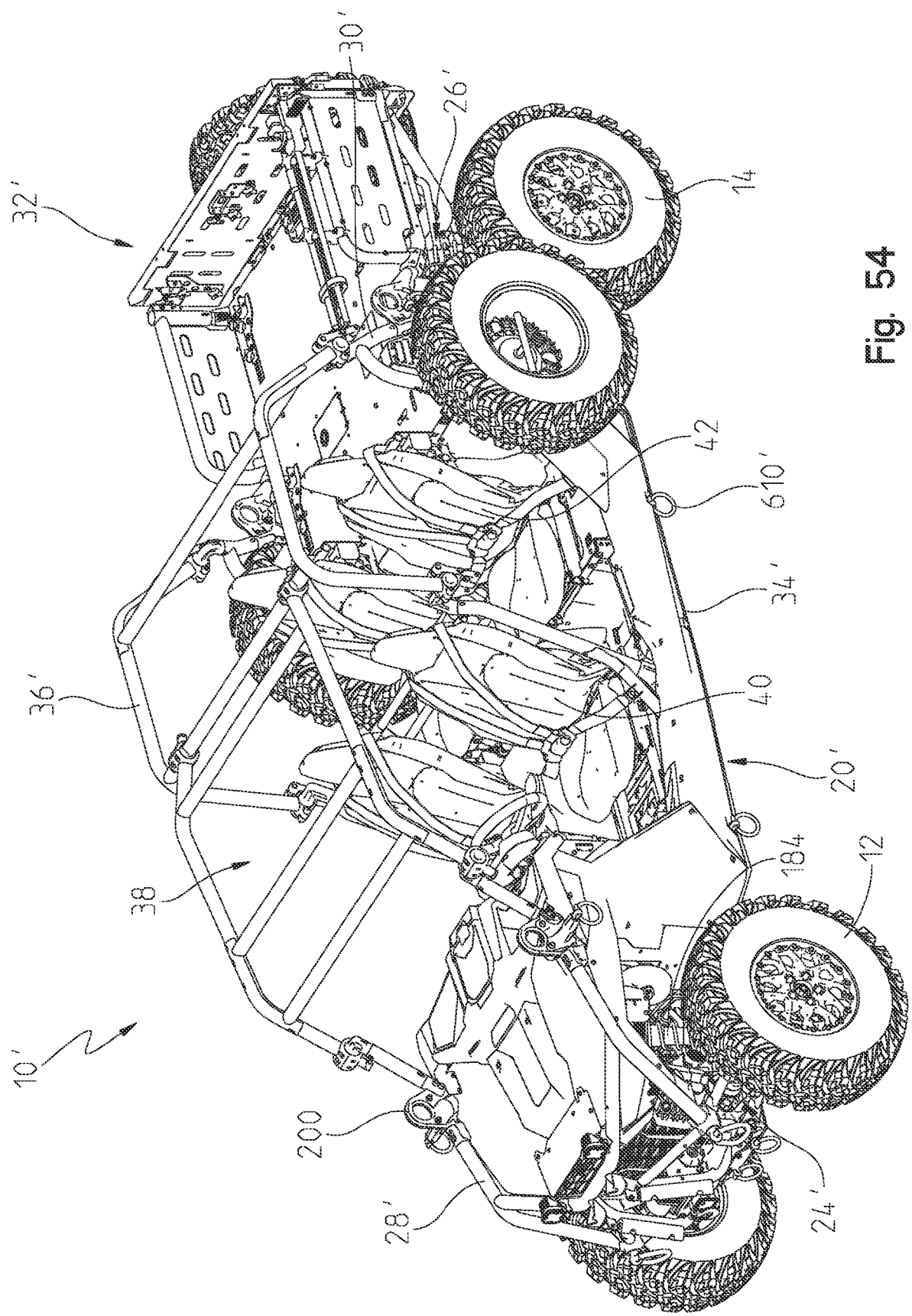
FIG. 54 is a front left perspective view of an alternative embodiment of the utility vehicle of FIG. 1.
Figure 55:
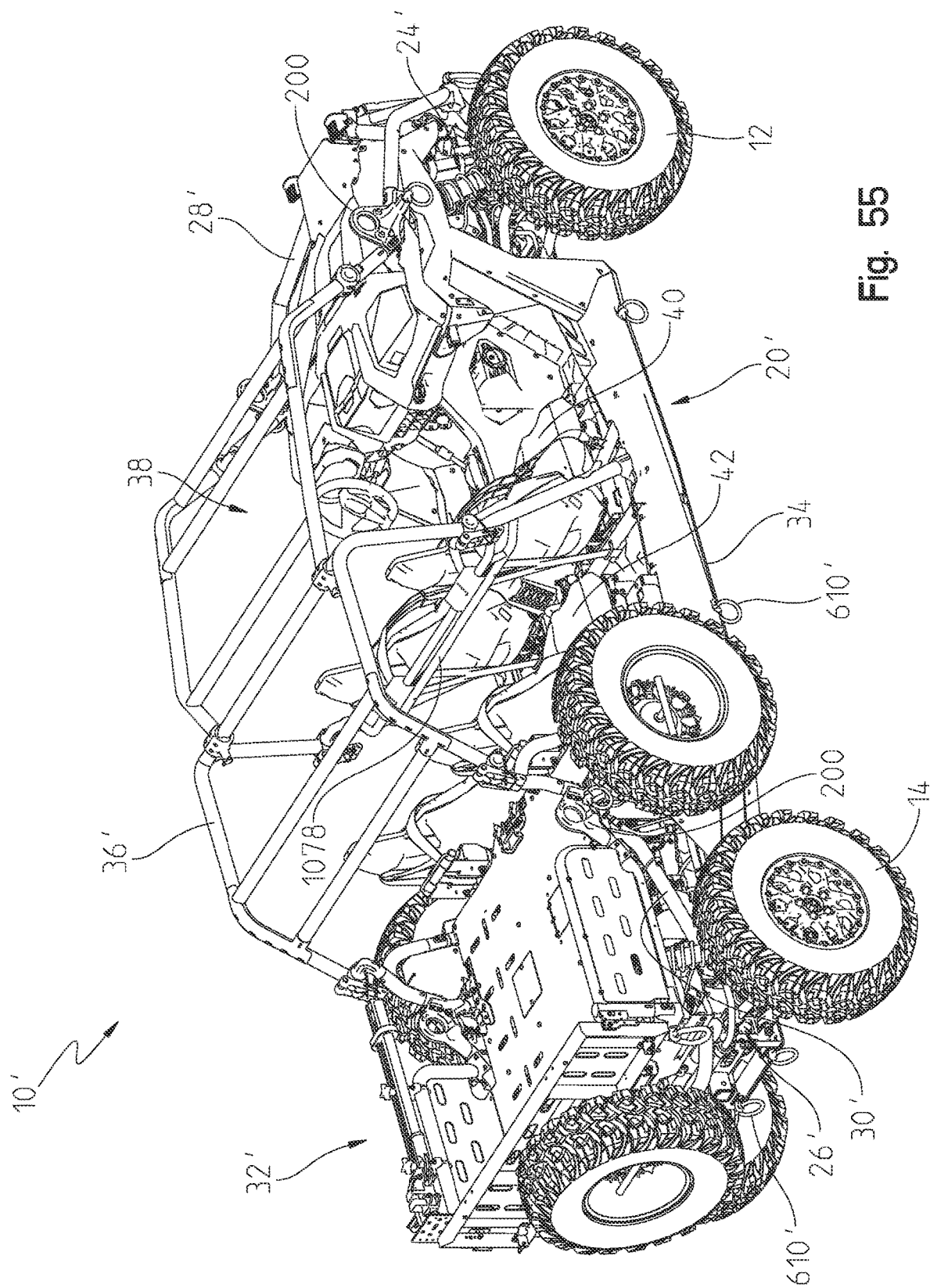
FIG. 55 is a rear right perspective view of the utility vehicle of FIG. 54.

Referring to FIGS. 54 and 55, an alternative embodiment of utility vehicle 10 of FIGS. 1-7 is disclosed as utility vehicle 10', with like reference symbols indicating like components/assemblies. Utility vehicle 10' includes a frame assembly 20' which is comprised of at least a lower frame assembly 34' and an upper frame assembly 36'. Frame assembly 20' supports operator area 38 and seats 40, 42. Lower frame assembly 34' extends between a front frame portion 28' and a rear frame portion 30'. Rear frame portion 30' of lower frame assembly 34' supports a rear cargo area 32'. Utility vehicle 10' includes front ground-engaging members 12 and rear ground-engaging members 14 which are operably coupled to frame assembly 20' through at least a front suspension assembly 24' and a rear suspension assembly 26', respectively.

Figure 56:
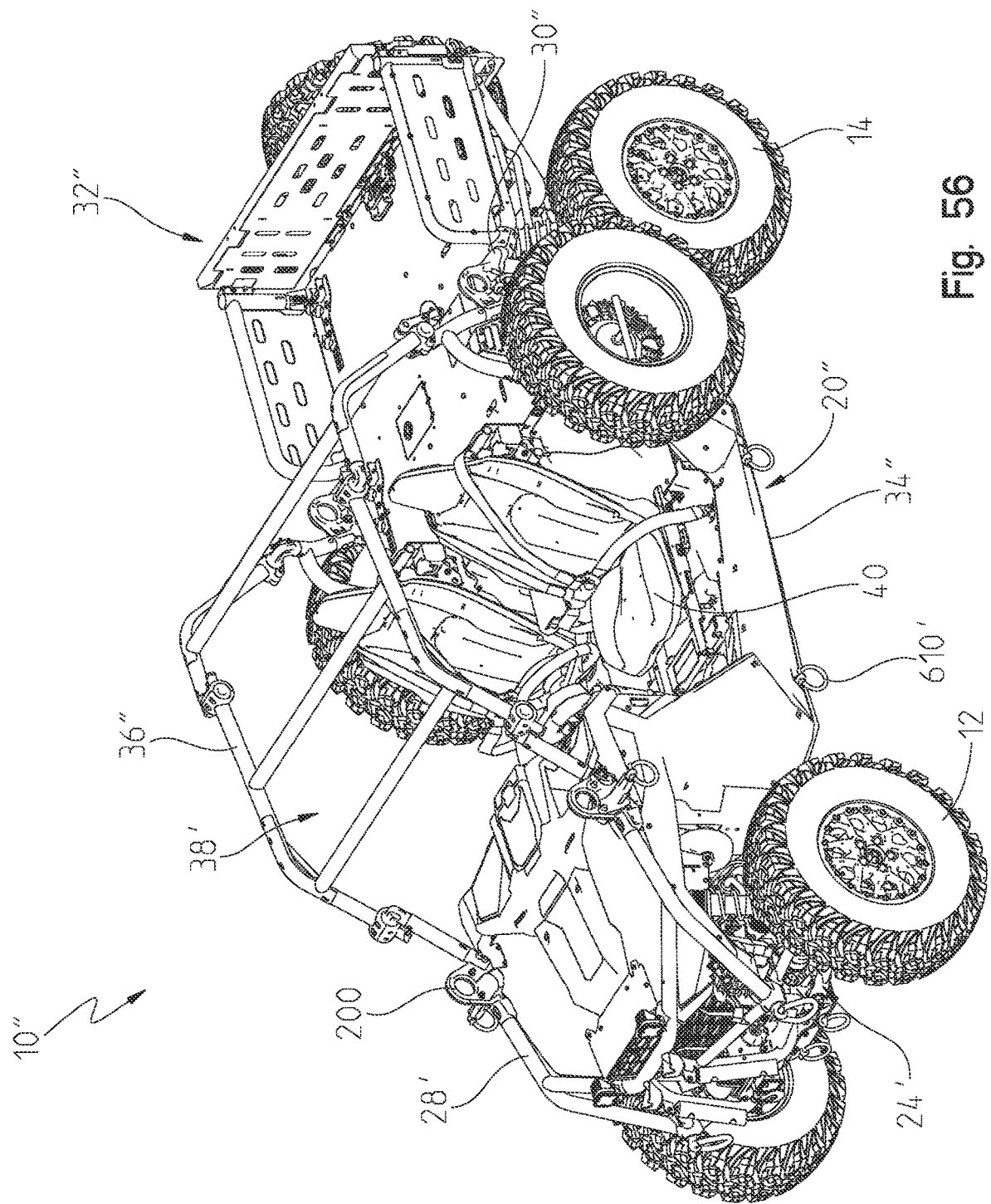
FIG. 56 is a front left perspective view of an alternative embodiment of the utility vehicle of FIG. 54, having two seats.
Figure 57:
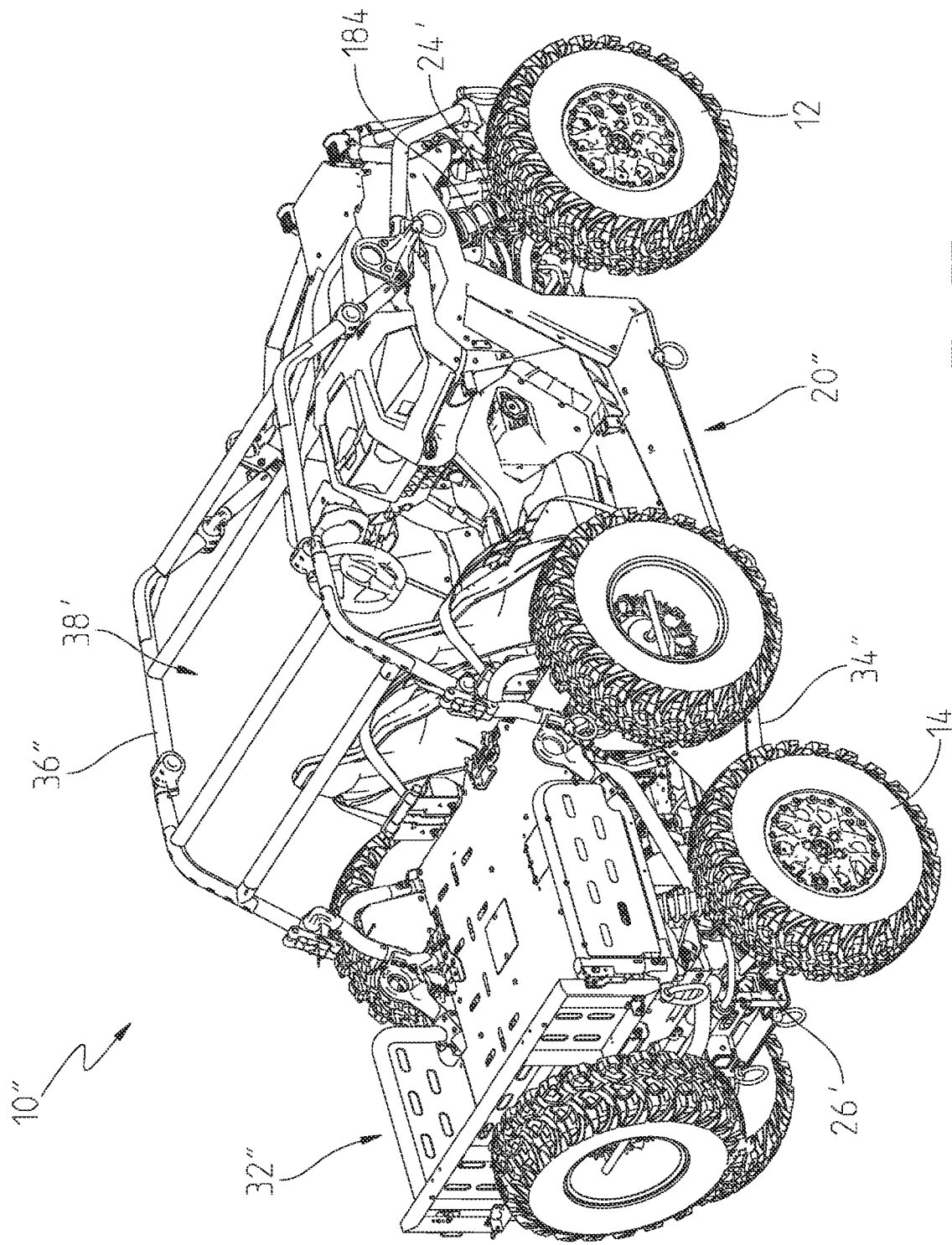
FIG. 57 is a rear right perspective view of the utility vehicle of FIG. 56.

Referring to FIGS. 56 and 57, an alternative embodiment of utility vehicle 10' of FIGS. 54 and 55 is shown as utility vehicle 10", with like reference symbols indicating like components/assemblies. While vehicle 10' is shown as having at least four seats, specifically front seats 40 and rear seats 42, vehicle 10" is shown as having two seats, specifically front seats 40 only. As such, an operator area 38' of vehicle 10" is smaller than that of vehicle 10' and, similarly, frame assembly 20" is smaller than frame assembly 20'. More particularly, the length of a lower frame assembly 34" and an upper frame assembly 36" is less than that of lower and upper frame assemblies 34' and 36' of FIGS. 54 and 55. The components and assemblies disclosed herein are equally applicable to vehicle 10" as to vehicle 10 (FIGS. 1-7) and vehicle 10' (FIGS. 54 and 55).

Figure 58:
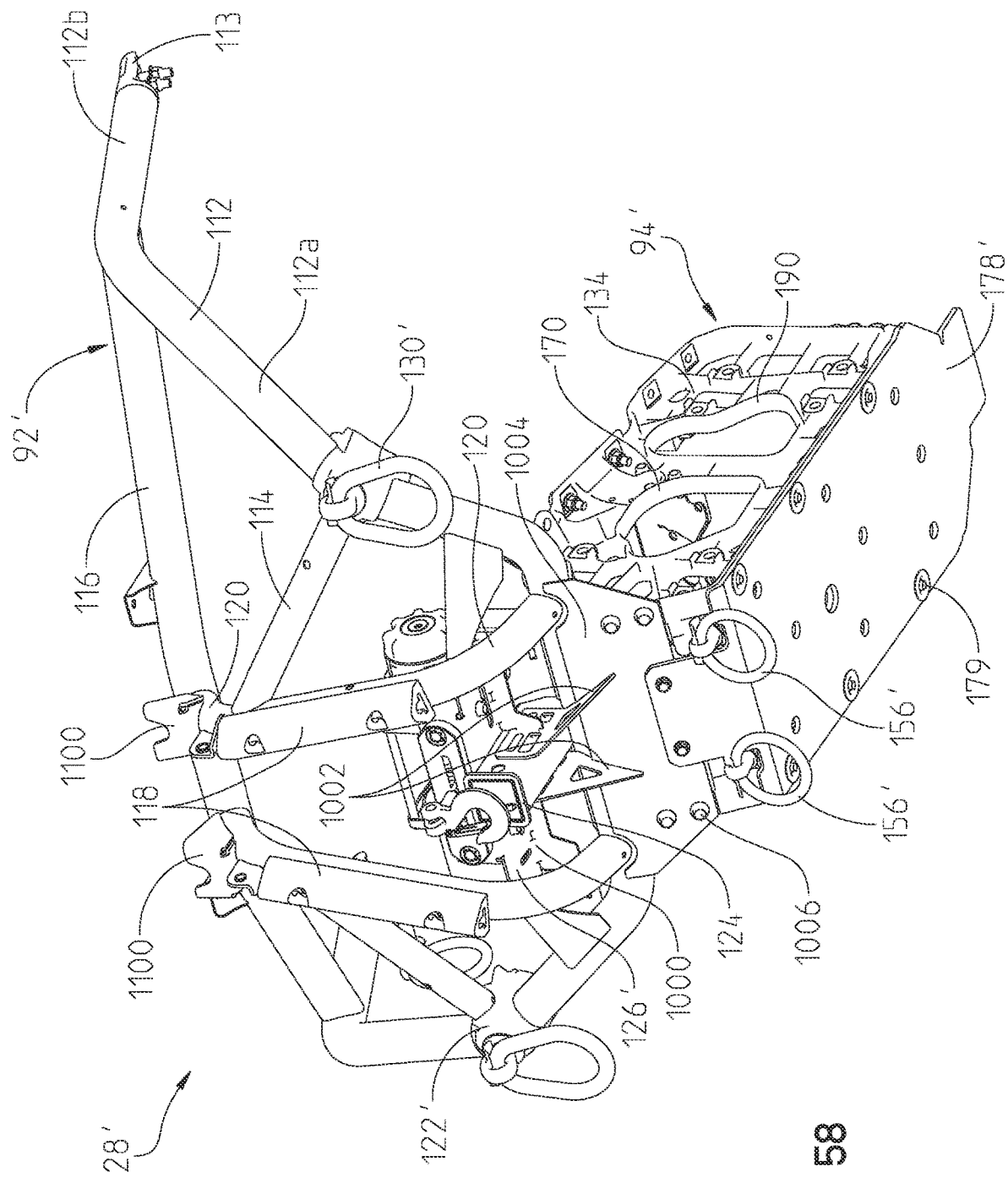
FIG. 58 is a front left perspective view of an underside of a front frame portion of the utility vehicle of FIG. 54.
Figure 59:
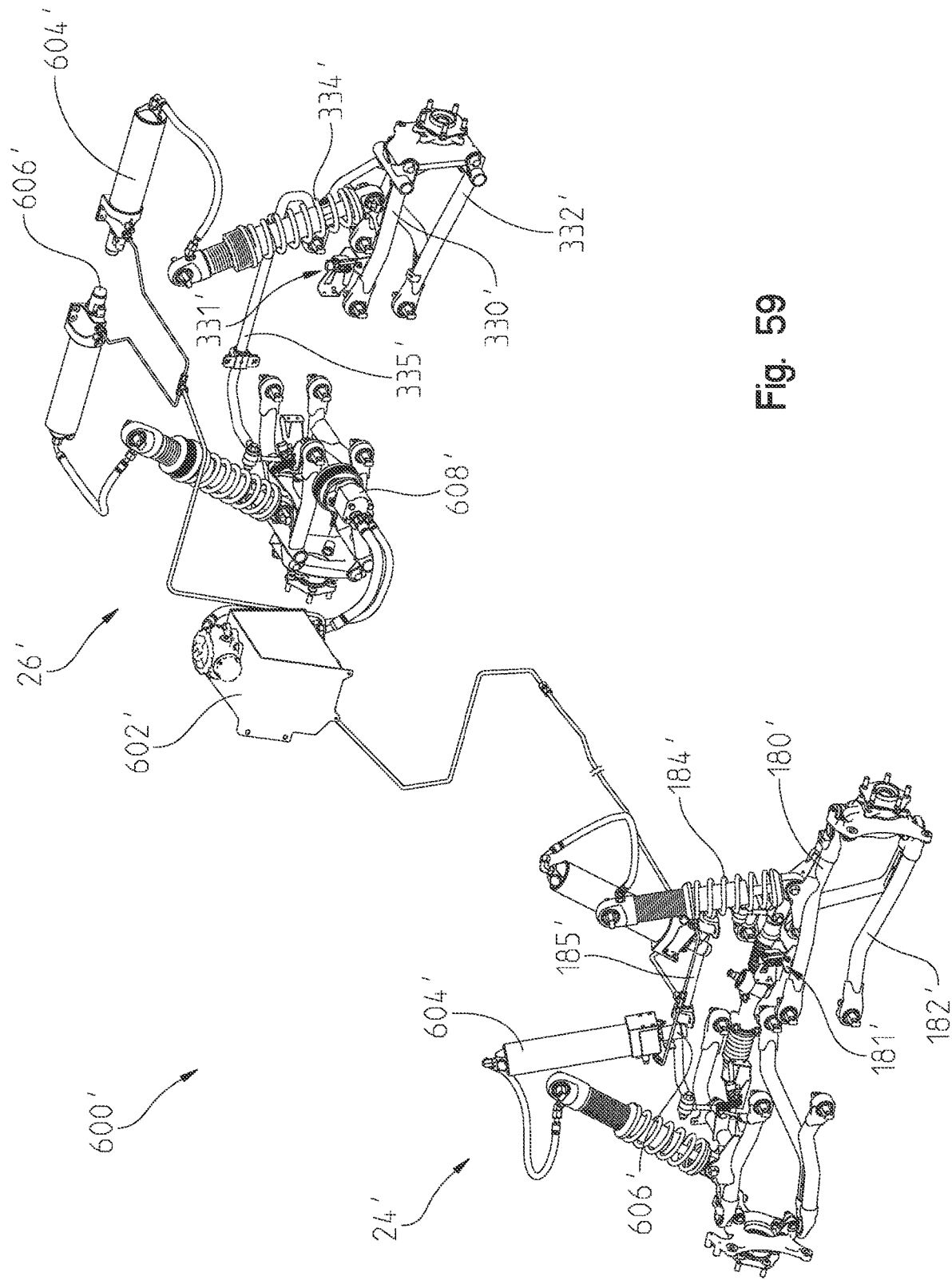
FIG. 59 is a front left perspective view of front and rear suspension assemblies of the utility vehicle of FIG. 54.
Figure 60:
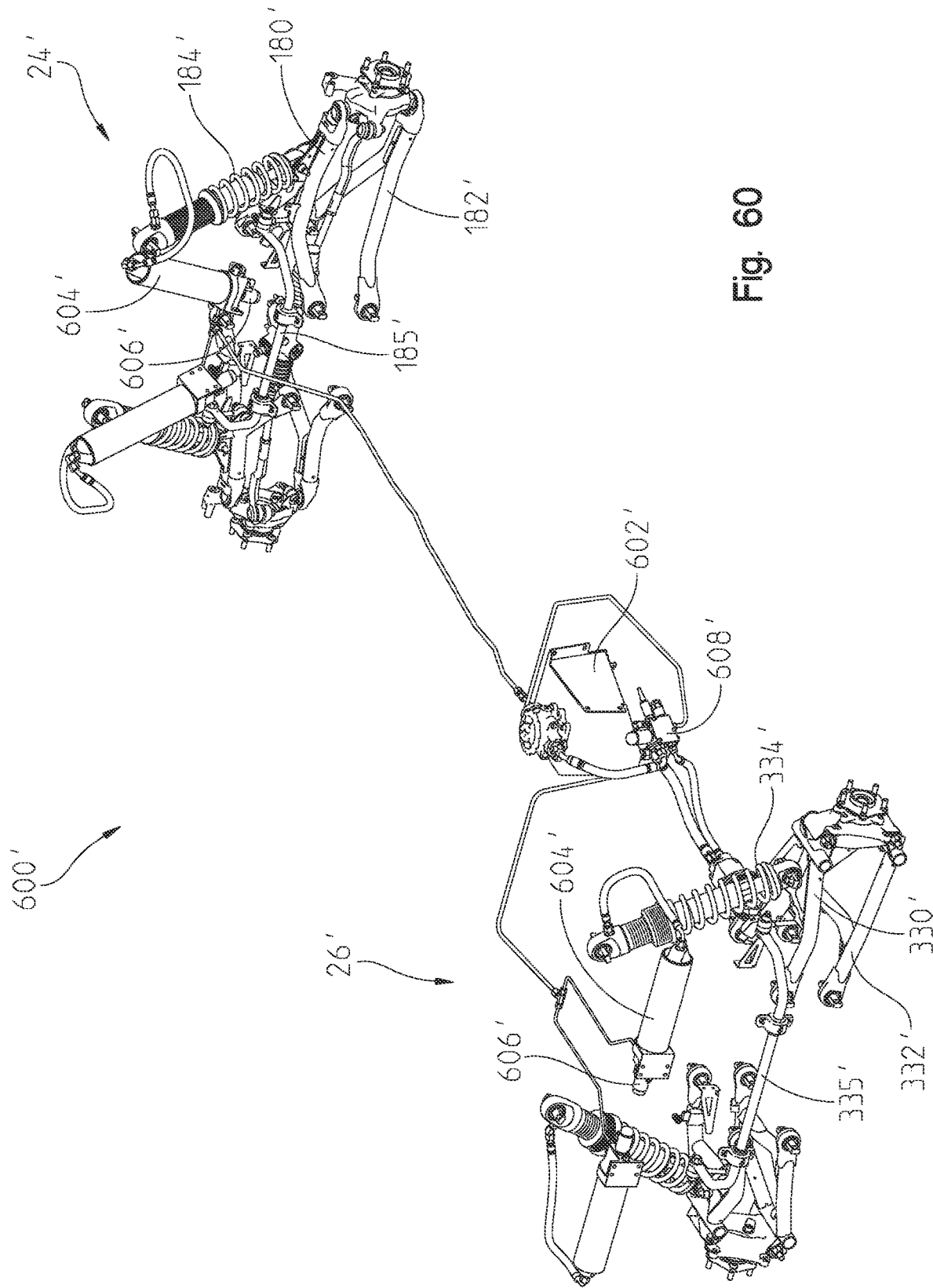
FIG. 60 is a rear right perspective view of the front and rear suspension assemblies of FIG. 59.
Figure 61:
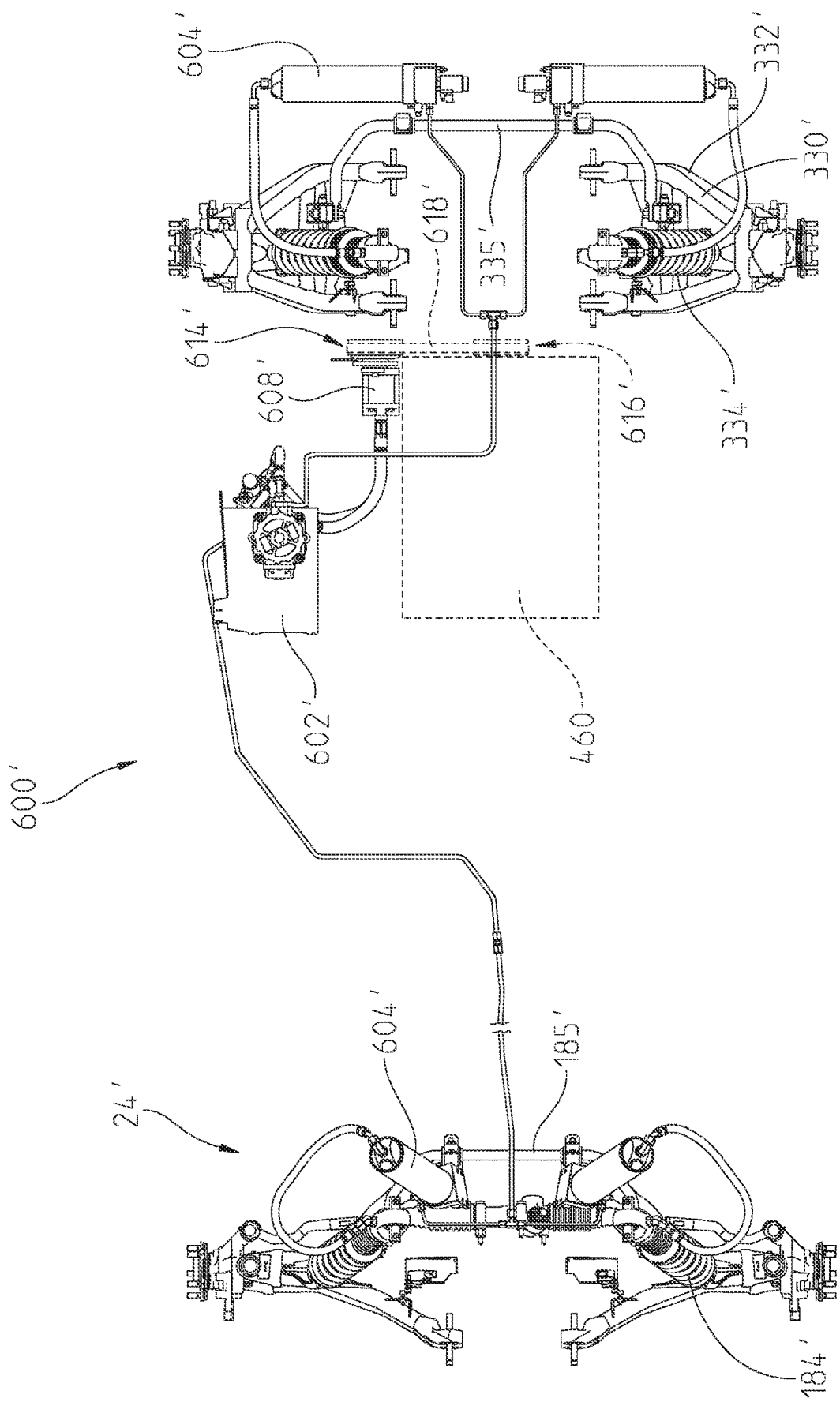
FIG. 61 is a top view of the front and rear suspension assemblies of FIG. 59.
Figure 62:
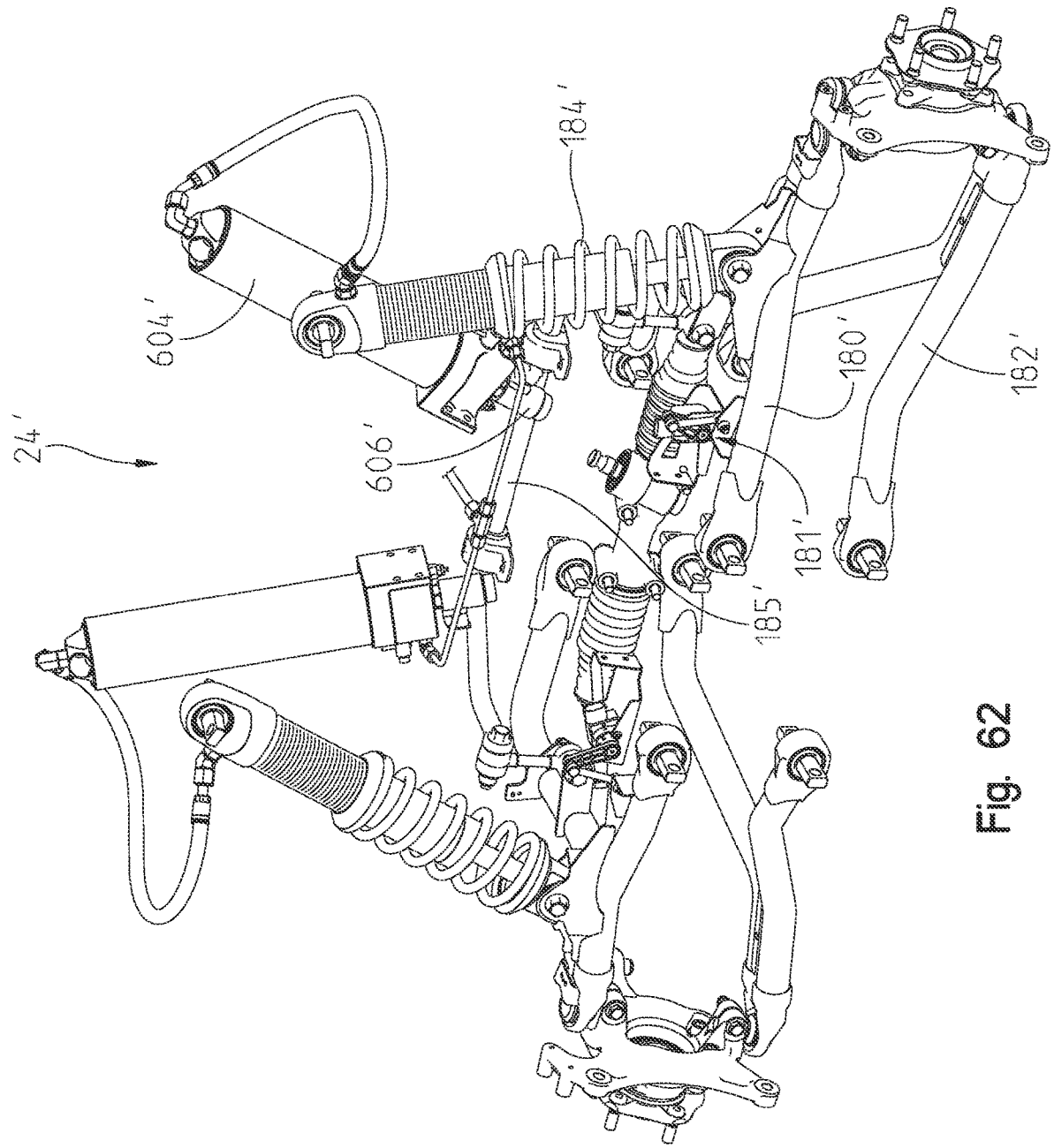
FIG. 62 is a left front perspective view of the front suspension assembly of FIG. 59.
Figure 63:
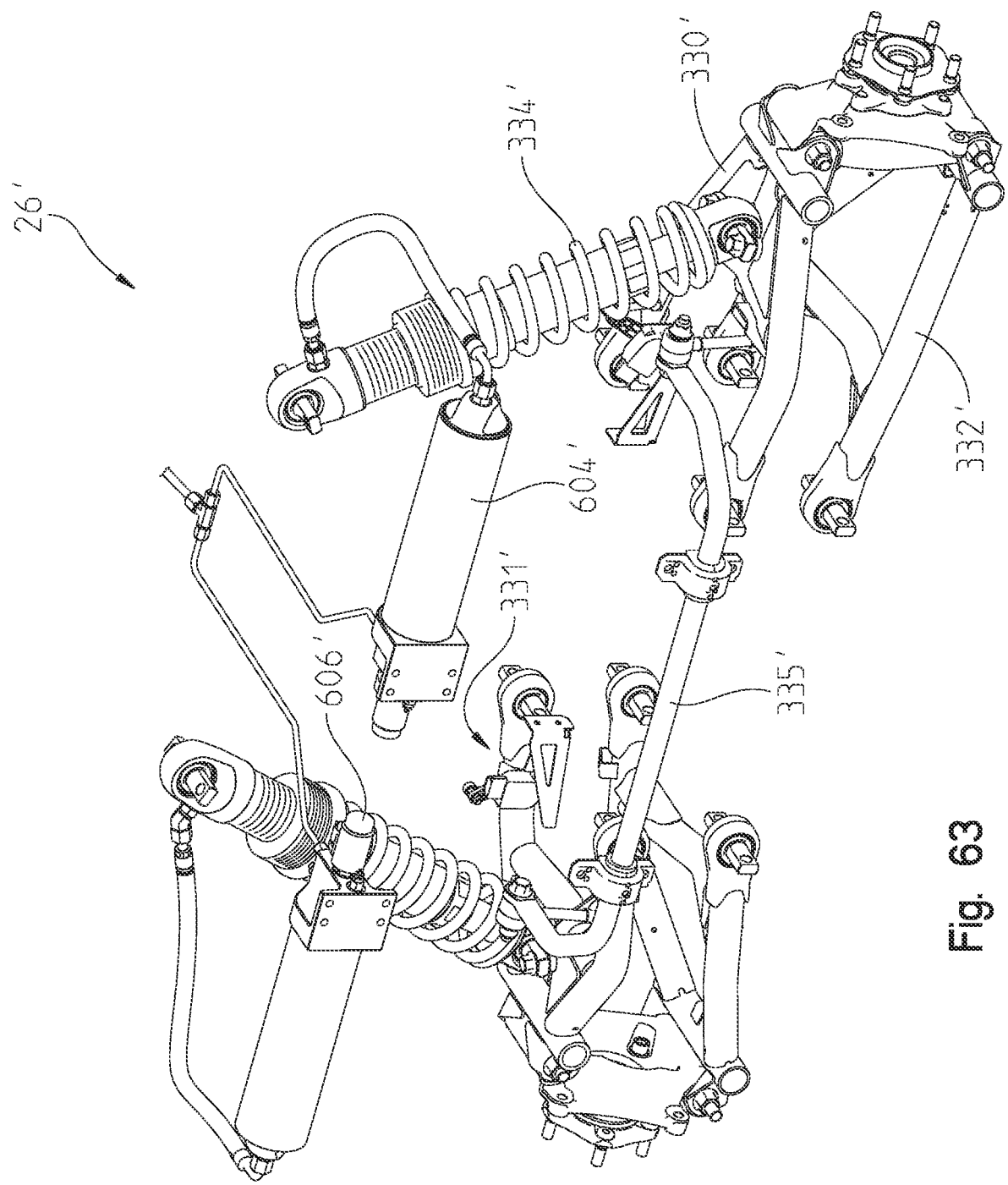
FIG. 63 is a rear right perspective view of the rear suspension assembly of FIG. 59.

Referring to FIG. 58, front frame portion 28' of lower frame assembly 34' is disclosed. Front frame portion 28' includes a removable sub-frame assembly 92' and a front clip assembly 94'. Sub-frame assembly 92' is removably coupled to main frame portion 90 (FIGS. 13 and 14) and may be configured as an exoskeleton and/or bumper assembly positioned outward of body panels 22 and/or hood 574 (FIG. 1). Sub-frame assembly 92' is similar to sub-frame assembly 92 of FIGS. 13 and 14 except that braces 122', which receive a lower end of front frame members 112 and an outer end of cross members 114, may have a smaller size than that of braces 122 (FIGS. 13 and 14). Braces 122' also are configured to support mounting members 130', illustratively tie-down mounts and/or tow mounts. Mounting members 130' are positioned at the forward-most extent of frame assembly 20'. Additionally, mounting members 130' are positioned vertically intermediate an upper extent and a lower extent of frame assembly 20' and, more particularly, are vertically intermediate an upper extent and a lower extent of front frame portion 28' of lower frame assembly 34'. In this way, mounting members 130' are configured for various transportation options, such as tying down vehicle 10' for aircraft travel.

It may be appreciated that mounting members 130' are integrated into frame assembly 20' for increased support of the load at mounting members 130' and a possible distribution of the load throughout lower frame assembly 34'. More particularly, frame assembly 20' extends to the location of mounting members 130' such that frame assembly 20' itself supports the load at mounting members 130', rather than supporting the load at mounting members 130' with a non-structural portion of vehicle 10'. Illustratively, because sub-frame assembly 92' is directly coupled to main frame portion 90 (FIGS. 13 and 14), any load at mounting members 130' may be supported by various components of lower frame assembly 34'.

Referring still to FIG. 58, front clip assembly 94' is coupled to both main frame portion 90 (FIGS. 13 and 14) and sub-frame assembly 92'. Front clip assembly 94' is generally similar to front clip assembly 94 (FIGS. 13 and 14) except for mounting members 156', which may be configured as mounting rings or other tie-down structures (e.g., pins, brackets, etc.), and a front plate 178' configured to support at least front differential 174.

A bracket 126' is configured to support a winch or other accessories or components of vehicle 10' and includes a generally planar portion 1000 configured to the support the winch or accessories and at least one arm 1002 (illustratively two arms 1002) extending downwardly from planar portion 1000. Arms 1002 may be coupled to connection 124 and further may be coupled to a plate 1004 positioned along a forward surface of front clip assembly 94'. Plate 1004 may be removably coupled to front clip assembly 94' with a plurality of fasteners 1006. Additional accessories, such as a spare tire, may be supported on vehicle 10' through brackets 1100 positioned at an upper end of frame members 120.

Referring now to FIGS. 59-64, vehicle 10', 10" includes a suspension adjustment system 600' similar to suspension adjustment system 600 (FIG. 53), with like reference symbols indicating like components. In one embodiment, suspension adjustment system 600' is a ride-height or ride-leveling system configured to adjust the height of suspension assemblies 24', 26' relative to ground surface G (FIG. 3) by adjusting parameters of respective shock absorbers 184', 334'. For example, sensors 181', 331' of front and rear suspension assemblies 24', 26' are configured to communicate (electrically or otherwise; directly or indirectly) with suspension adjustment assembly 600' to transfer information about the vertical movement (e.g., jounce) of at least upper control arms 180', 330'.

Suspension adjustment system 600' includes a central reservoir 602' fluidly coupled to shock reservoirs 604'. In one embodiment, central reservoir 602' is a hydraulic reservoir configured to provide hydraulic fluid to any or all of shock reservoirs 604'. Shock reservoirs 604' may be coupled to torsion bars 185', 335'. Central reservoir 602' is fluidly coupled to shock absorbers 184', 334' to provide hydraulic fluid from central reservoir 602' to shock reservoirs 604'. Shock reservoirs 604' are fluidly coupled to shock absorbers 184', 334' at ports 606' and are configured to adjust the height of shock absorbers 184', 334' with the fluid from central reservoir 602' and manifold 603'. More particularly, a hydraulic conduit (not shown) extends between port 606' and shock absorber 184', 334' to flow hydraulic fluid to/from shock absorber 184', 334'.

A controller may have a known plurality of positions from each sensor 181', 331' to achieve a ride height with a predetermined amount of ground clearance (e.g., 12" or 14" relative to ground surface G). For each shock absorber 184', 334', suspension adjustment system 600' can pump hydraulic fluid to raise suspension assemblies 24', 26' or dump hydraulic fluid to lower suspension assemblies 24', 26'. The fluid will shuttle a piston in each shock reservoir 604' changing the gas volume (e.g., nitrogen) and, therefore, changing the gas pressure within each reservoir 604'. By providing each shock absorber 184', 334' with its own reservoir 604', the height of each shock absorber 184', 334' may be adjusted independently from any other shock absorber 184', 334'.

Central reservoir 602' is operably coupled to prime mover 460. More particularly, a pump 608' may be operably coupled with prime mover 460 through a belt (e.g., belt 618') or other connecting mechanism such that prime mover 460 drives pump 608'. Belt 618' may be a serpentine belt which also drives other components, such as an alternator, or may be a separate drive belt. More particularly, belt 618' is entrained about at least a drive pulley 614' on a crankshaft (not shown) of prime mover 460 and a driven pulley 616' operably coupled to pump 608'. In this way, rotation of the crankshaft of prime mover 460 and drive pulley 614' causes rotation of belt 618', which in turn, drives driven pulley 616' to operate pump 608'.

In one embodiment, driven pulley 616' is configured as or with an electromagnetic clutch. By using an electromagnetic clutch driven pulley 616' for pump 608', even though pump 608' is operably coupled to prime mover 460, it is not necessary for pump 608' to be actuated at all times. Instead, pump 608' only needs to operate when it is necessary to adjust one or more of shock absorbers 184', 334'. More particularly, the electromagnetic clutch of driven pulley 616' allows belt 618' to rotate but does not engage with belt 618' until suspension adjustment system 600' receives an input to adjust a parameter of front and/or rear suspension assembly 24', 26'. At that time, the electromagnetic clutch may be actuated such that pulley 616' and belt 618' (driven by prime mover 460) drive pump 608' to allow hydraulic fluid from central reservoir 602' to be distributed to any of shock absorbers 184', 334'.

Based on various operating conditions or operator selections, pump 608' may be selectively or automatically engaged when it is desired to adjust the height of shock absorbers 184', 334'. For example, the operator may select an input 452 (FIG. 41) to engage suspension adjustment system 600' to raise or lower the height of any of portion of front and rear suspension assemblies 24', 26' relative to ground surface G (FIG. 3) based on operating, terrain, or other conditions. Additionally, if vehicle 10' is being transported (e.g., via aircraft), it may be desirable to adjust (e.g., lower) front and rear suspension assemblies 24', 26' to facilitate vehicle 10' being secured with the various mounting members disclosed herein. Because pump 608' is operably coupled to prime mover 460, pump 608' may be actuated any time prime mover 460 is operating, but pump 608' only needs to be actuated for adjusting the height of shock absorbers 184', 334'. Therefore, no additional drag occurs on prime mover 460, less heat is generated, and the life of pump 608' may be extended.

Figure 65:
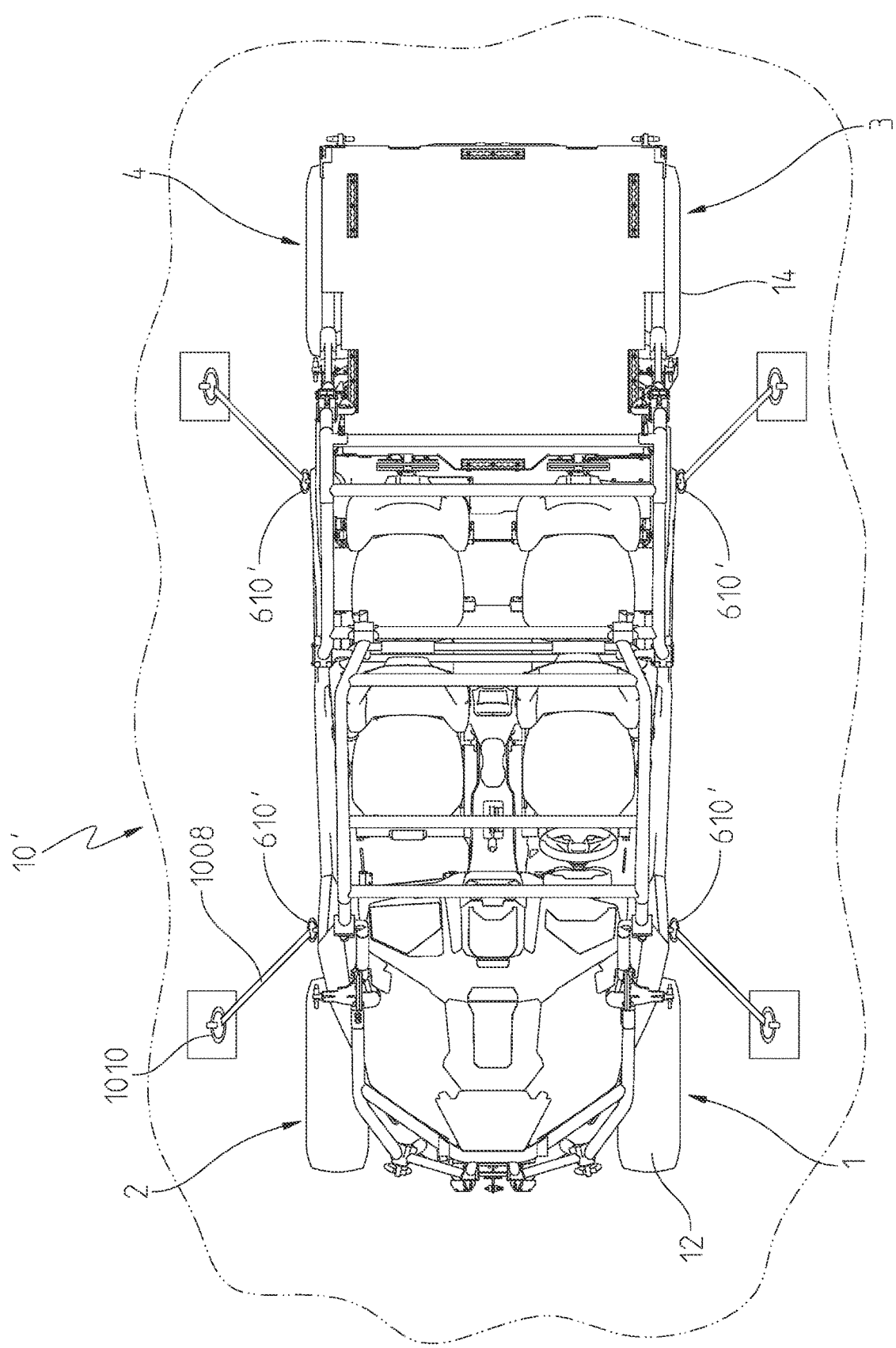
FIG. 65 is a top view of the utility vehicle of FIG. 54 and showing a plurality of tie-down members.
Figure 66:
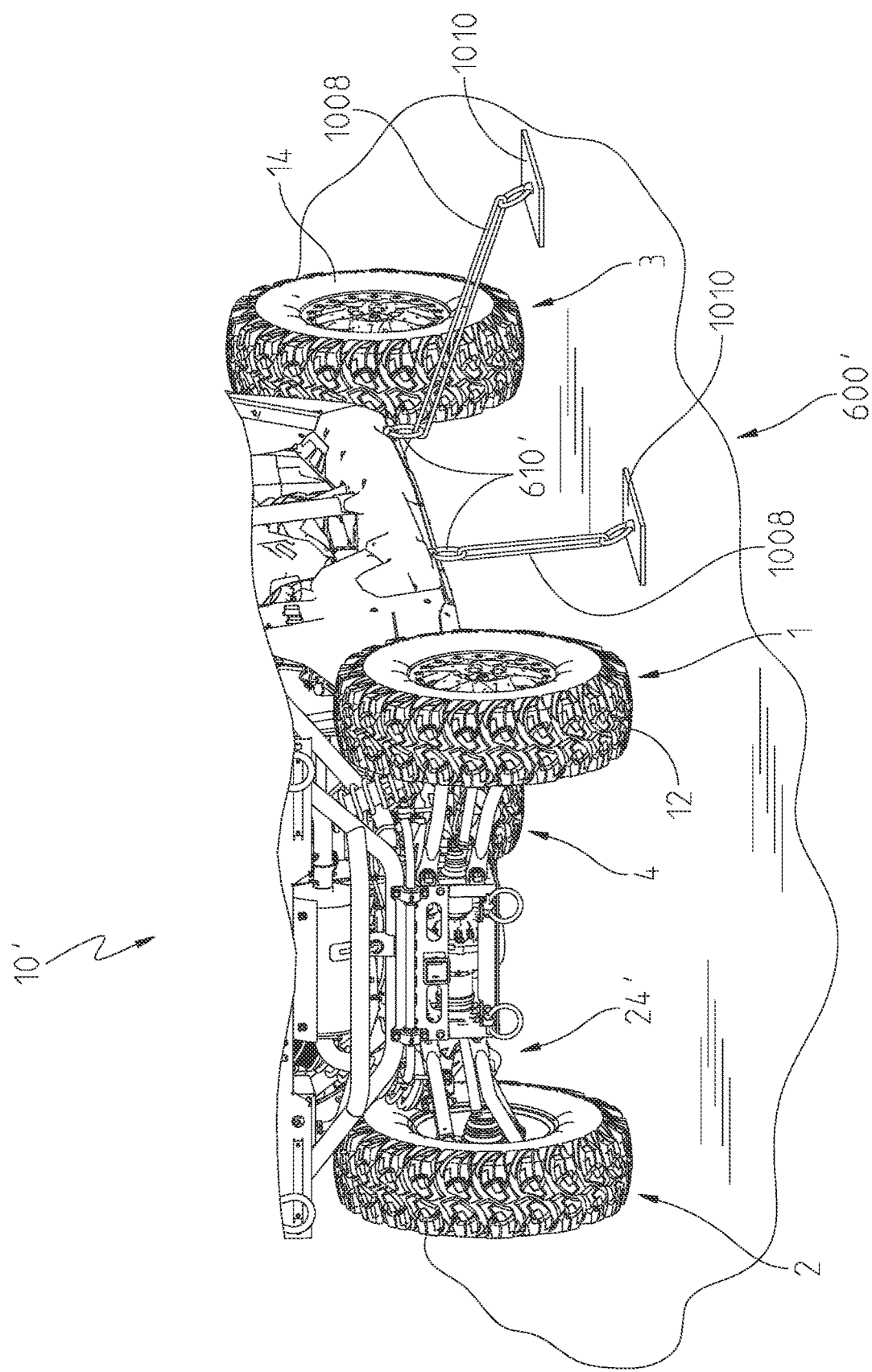
FIG. 66 is a front left perspective view of a portion of the utility vehicle of FIG. 54 further showing a portion of the plurality of tie-down members of FIG. 65.

Referring now to FIGS. 65 and 66, an alternative embodiment mounting member 610' is disclosed. Illustratively, vehicle 10' includes at least four mounting members 610' coupled to a portion of lower frame assembly 34'. Additional mounting members, of the configuration shown as mounting members 610' or having other configurations or embodiments, may be supported on other portions of frame assembly 20'. Mounting members 610' are configured at least for aircraft transportation such that a strap, cord, cable, or other such component (denoted as 1008) extends from mounting member 610' on vehicle 10' to a tie-down location 1010 on the floor of an aircraft. Vehicle 10' must be secured in a manner that prevents vehicle 10' from moving during changes in speed, pitch, and roll during the flight and landing.

Typically, loading personnel use straps 1008 (e.g., ratchet-down straps) at mounting members 610' but this may not be done with any measurable or quantifiable force and, instead, the loading personnel may use hand-based tension to confirm tension in straps 1008. As such, this is a manual process which leaves room for slop in the system between different straps 1008 and the potential for vehicle shift. However, because vehicle 10' includes suspension adjustment system 600', the force at each of mounting members 610' may be detected and monitored during transport. Further, warnings (audible, visual, etc.) may be used to alert various personnel of a change in force at any of mounting members 610' which may indicate movement of vehicle 10' during transport.

Figure 64:
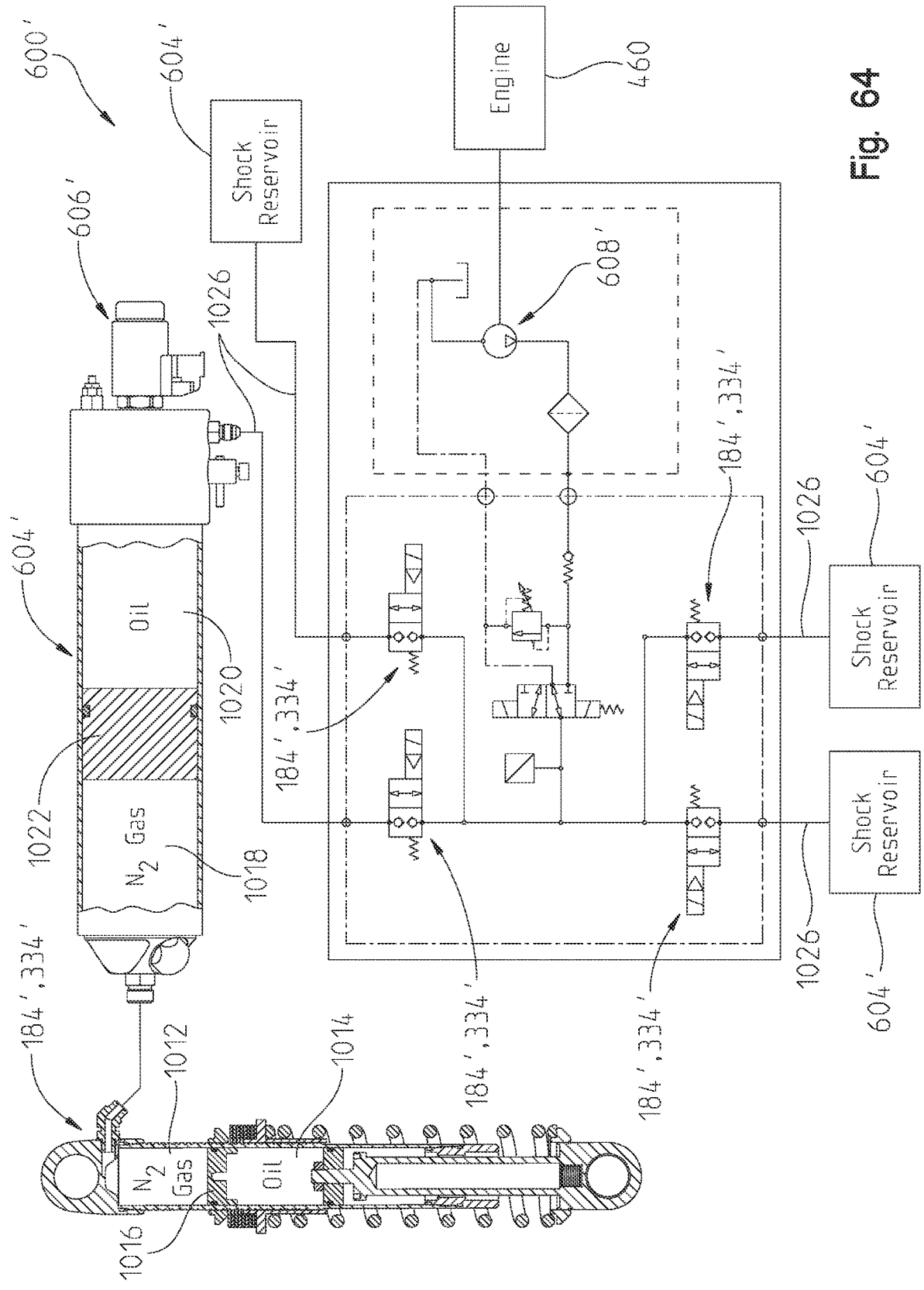
FIG. 64 is a schematic view of a suspension payload adjustment assembly for the front and rear suspension assemblies of FIG. 59.

More particularly, and referring to FIG. 64, suspension adjustment system 600' uses engine-coupled hydraulic pressure through electronically-controlled hydraulic valves fluidly coupled to hydraulic-gas interface reservoirs 604' that couple to shocks 184', 334' on each suspension corner, as disclosed herein. Shocks 184', 334' use oil-over-air-over-oil internally to set the chassis ride height and use a single pressure sensor in the hydraulic manifold plus angular position sensors on each suspension corner. Illustratively, shocks 184', 334' include a gas reservoir or portion (e.g., nitrogen gas) 1012 and an oil reservoir or portion 1014 which are separated from each other by a piston or other movable divider 1016. Gas reservoir 1012 is fluidly coupled to a gas reservoir or portion 1018 of reservoir 604' through an oil line 1026. Gas reservoir 1018 is separated from an oil reservoir 1020 of reservoir 604' also by a movable divider 1022. A controller (or multiple controllers) may have two known positions from each position sensor of a corresponding shock 184', 334' to achieve a ride height with various ground clearance measurements (e.g., 12" or 14" from ground surface G (FIG. 3)). For each corner, system 600' can pump hydraulic fluid to raise the ride height relative to ground surface G or can expel or dump hydraulic fluid to lower the ride height relative to ground surface G. System 600' may look to move the corners to a requested pre-calibration position at each position sensor in order to balance any unknown corner weight with the pressure in each reservoir 604'.

Adjustment system 600' uses display 454 (FIG. 41) (e.g., a 7" accessory display) on vehicle 10' to enter a "payload monitoring" screen whereby the net front/back and lateral weight distribution is presented to the user. In one embodiment, display 454 also may show a vehicle overlay and indicate a number representing pressure at each wheel corner of vehicle 10' (e.g., each corner as represented by ground-engaging members 12, 14 and shocks 184', 334' (see corners 1, 2, 3, and 4 in FIGS. 65-68)). Additionally or alternatively, a X/Y-axis/center-of-mass graphic may be used to indicate the total added payload value. Display 454 utilizes either raw pre-processed or completely processed information from the suspension adjustment system 600' in real time.

It may be apparent that the shock pressure can be known in each corner by having this procedure follow the last ride-height adjustment step or having a small re-adjust procedure after which requires no driver present in the vehicle and no rolling tires needed (which stores pressure to achieve target corner height). With the pressure at each corner known, it is possible to track relative added weight to any shock 184', 334' by knowing the mathematical relationship between a change in position sensor angle compared to the static compression of each shock spring and the amount of nitrogen air volume change in reservoir 604' with added payload to shock 184', 334'. In various embodiments, display 454 may utilize an inertial measurement unit ("IMU") to account for slight changes in the actual weight on the corners of vehicle 10' due to potential non-level supporting road/plane surface. For example, at least one IMU may be built into display 454 for such purpose.

To utilize suspension adjustment system 600' to determine, balance, and monitor the payload of vehicle 10' during aircraft transport, the user may first adjust the ride height of each shock 184', 334' and then have all riders exit vehicle 10' prior to the payload balance process. Next, the user actuates an input to start the balance process. In one embodiment, the input may be present on display 454 such that the balancing process may be carried out on vehicle 10'. In other embodiments, vehicle 10' may be monitored and balanced using a separate display (e.g., computer) electrically coupled to a portion of vehicle 10' which also allows for the possibility of remotely receiving information and warnings about any changes in pressure during transport of vehicle 10' and the pressure to all corners could be set/reset to a measured value. Weight would be added by the user while monitoring the net balance of weight is across vehicle 10'. For example, if corner 1 measures a pressure corresponding to a weight of 5 lbs. while corners 2, 3, and 4 each measures a pressure corresponding to a weight of 70-75 lbs., then vehicle 10' is not balanced and weight may be added to corner 1 and/or otherwise redistributed at each of corners 1, 2, 3, 4 to balance vehicle 10' during transport. Additionally, if vehicle 10' was balanced before transport occurred, the shift in pressure at corner 1 could indicate that vehicle 10' is moving during transport, thereby, in real time, alerting various operators to re-secure vehicle 10'.

Figure 67:
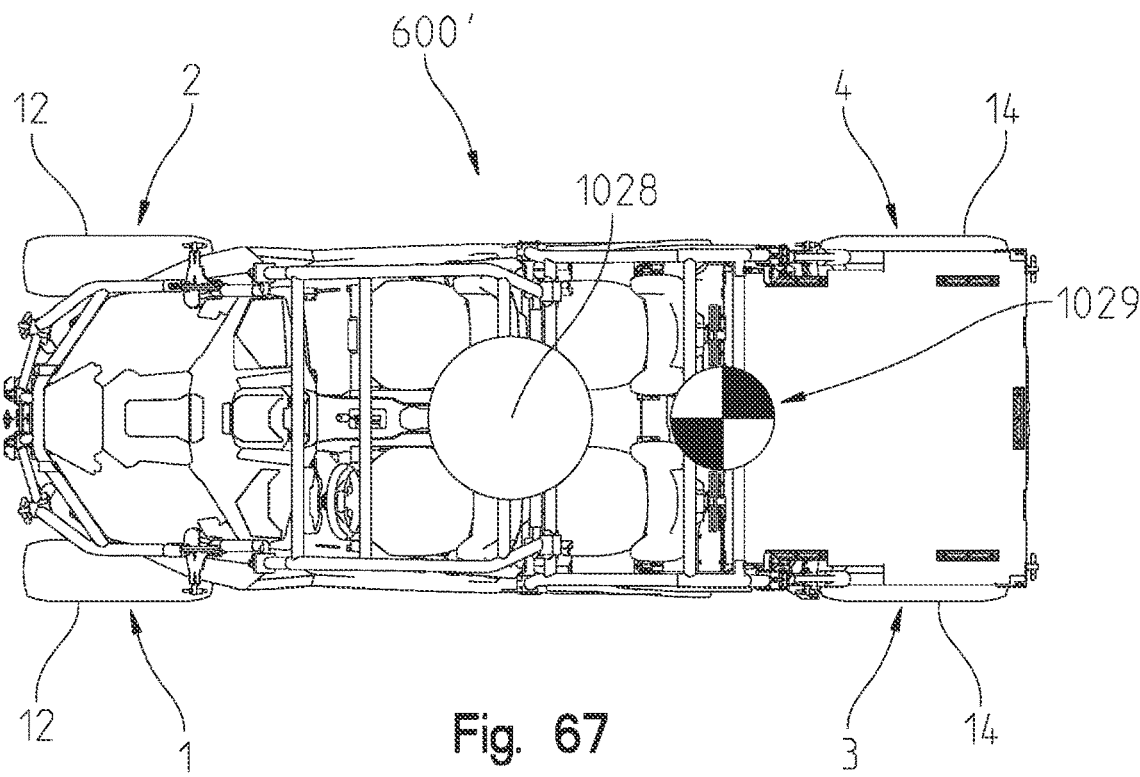
FIG. 67 is a top view of the utility vehicle of FIG. 54 in an unbalanced state.
Figure 68:
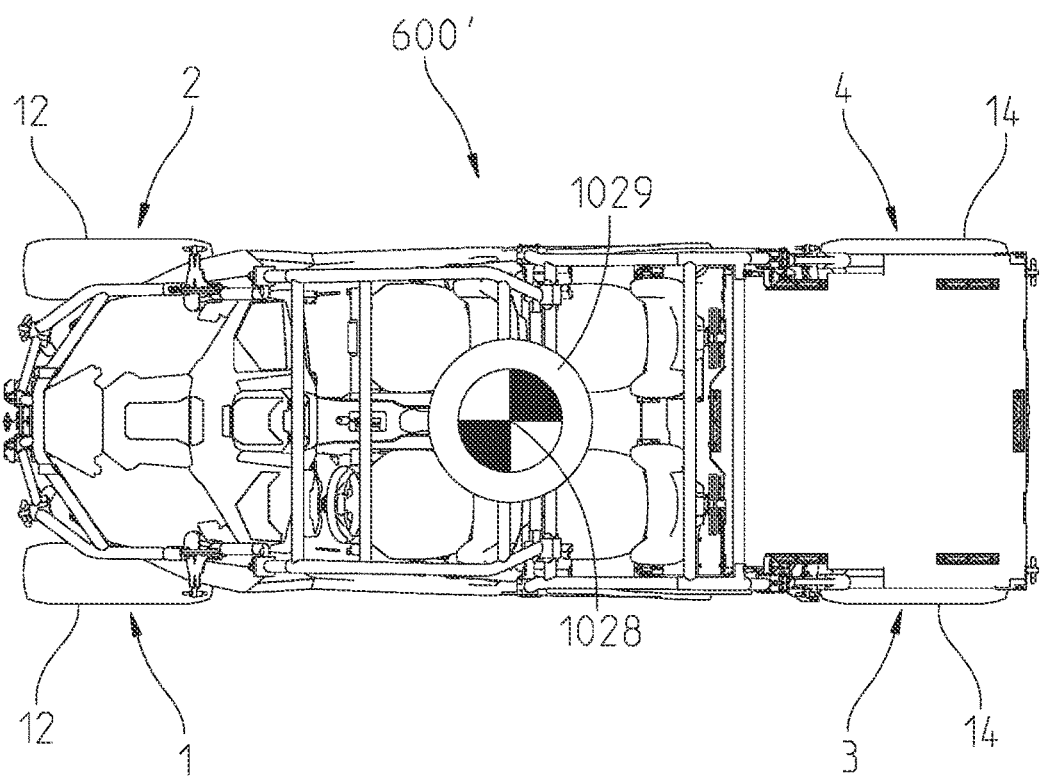
FIG. 68 is a top view of the utility vehicle of FIG. 54 in a balanced state.

As shown in FIGS. 67 and 68, suspension adjustment system 600' and display 454 (or any other computer or monitoring device electrically coupled to vehicle 10') may indicate a center of mass 1028 of vehicle 10' (e.g., center of mass of vehicle 10' in an unloaded state) and the balance or imbalance of weight on vehicle 10' relative to the unloaded center of mass. For example, as shown in FIG. 67, an excess weight or load is shown as 1029 and is positioned rearward of center of mass 1028 indicating that vehicle 10' is imbalanced. This would be detectable through suspension adjustment system 600' and, therefore, weight could be moved or otherwise redistributed such that the additional weight 1029 on vehicle 10' is balanced at center of mass 1028 (see FIG. 68 showing a balanced state of vehicle 10').

Suspension adjustment system 600' may further be utilized during various operation modes, such as rock crawling mode. More particularly, under rock crawling circumstances, it may be best to maintain static friction and maximum tire pressure on the ground. As such, it is possible to utilize system 600' to intentionally increase pressure on one of ground-engaging members 12, 14 which would compromise some ground clearance.

Figure 69:
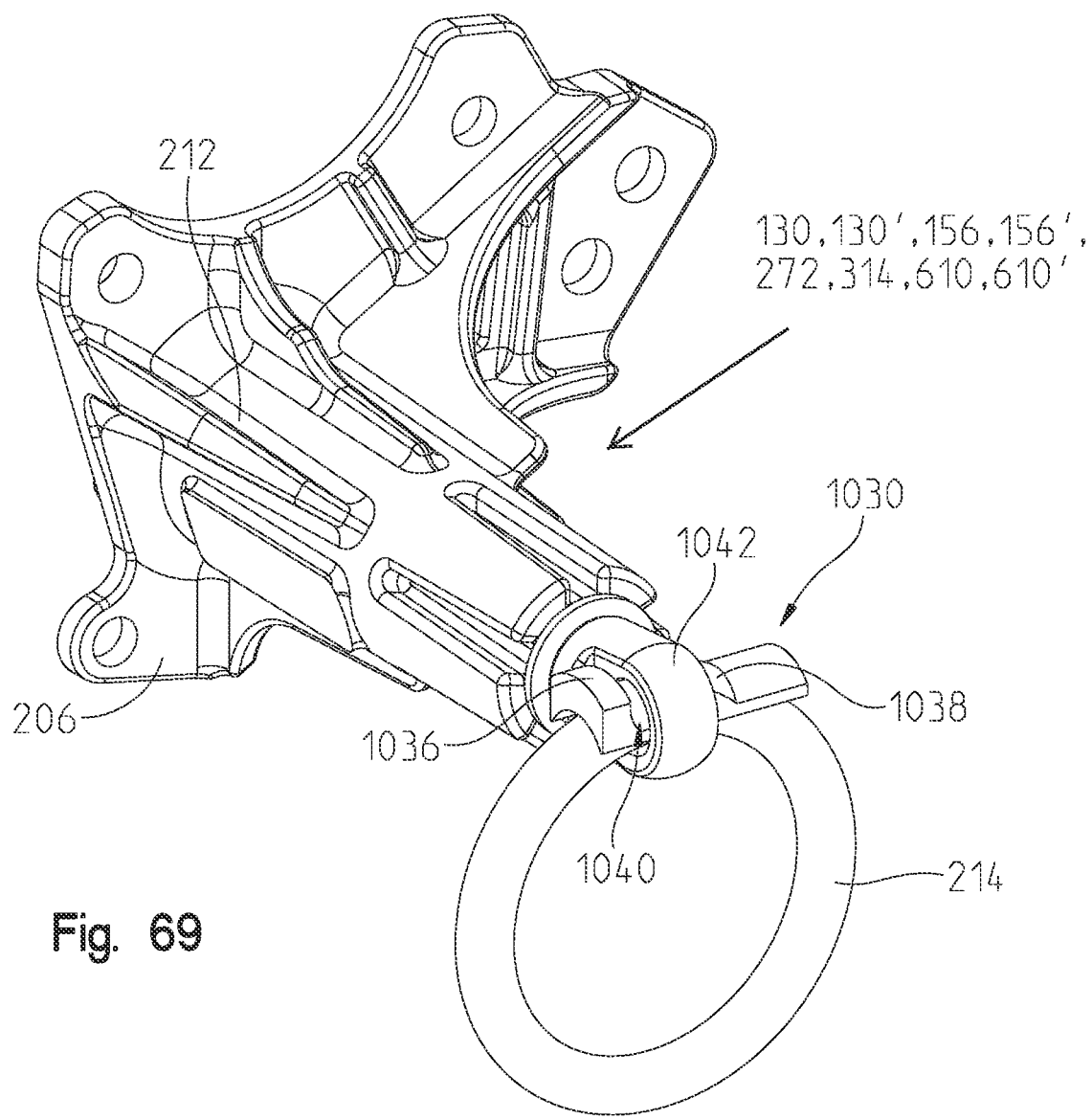
FIG. 69 is a perspective view of a tie-down member of the utility vehicle of FIG. 54.
Figure 70:
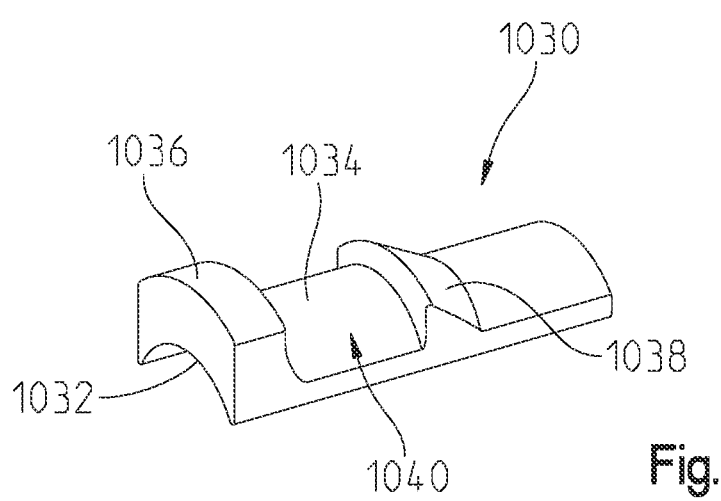
FIG. 70 is an insert of the tie-down members of FIG. 69.
Figure 69B:
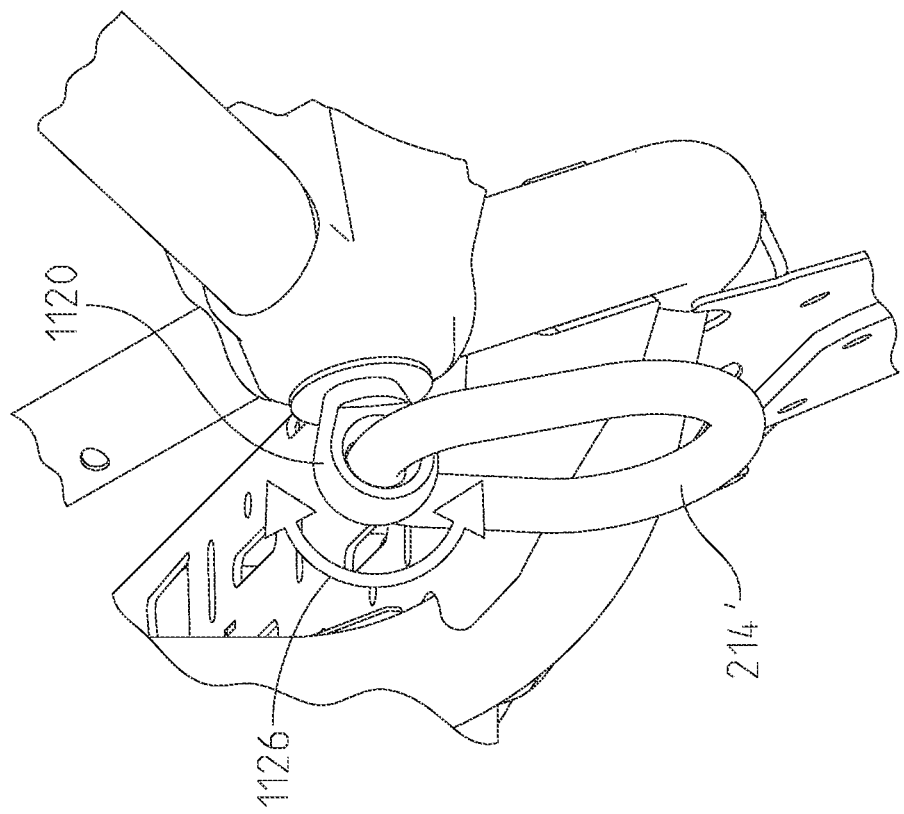
FIG. 69B is a perspective view of the second tie-down member of FIG. 69A.
Figure 69A:
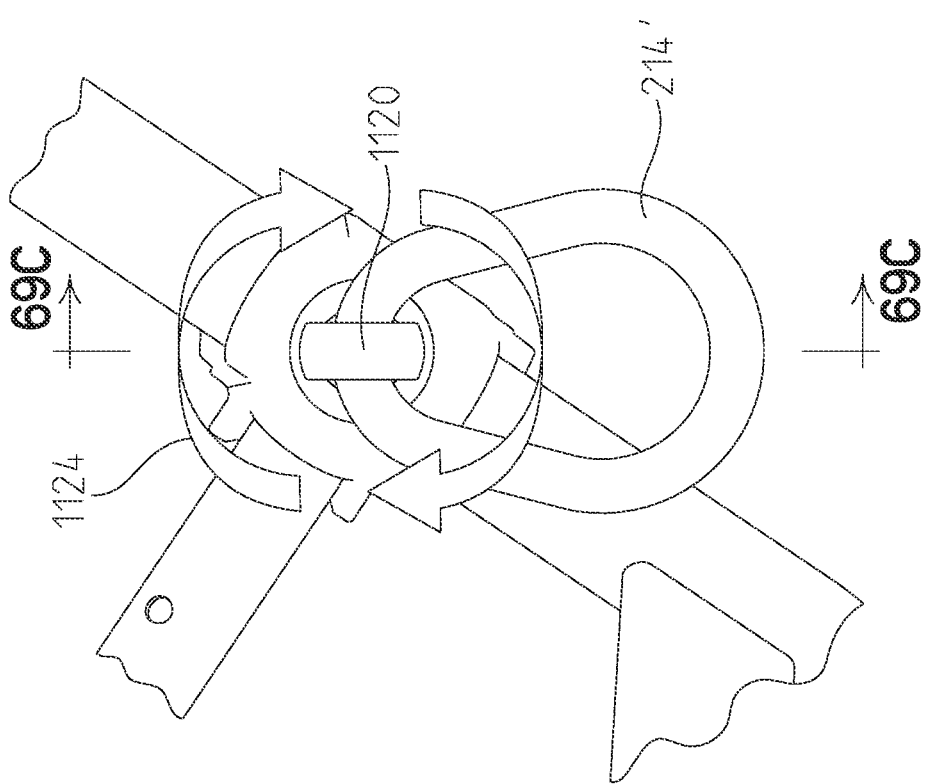
FIG. 69A is an elevational view of a second tie-down member of the utility vehicle of FIG. 54.
Figure 69D:
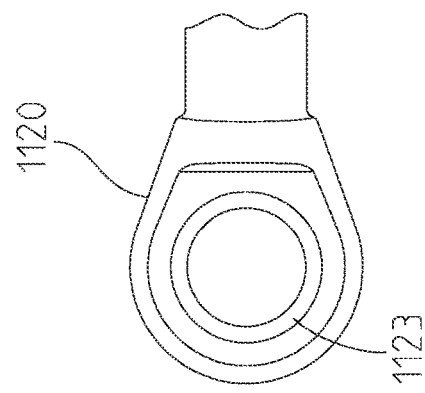
FIG. 69D is a perspective view of the tie-down member of FIG. 69.
Figure 69C:
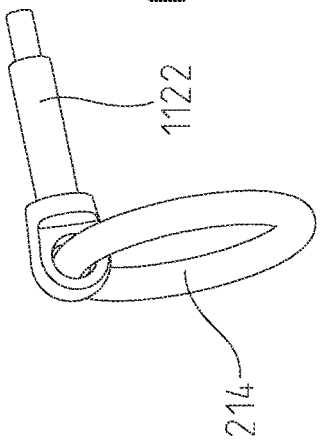
FIG. 69C is a cross-sectional view of the tie-down member of FIG. 69A.

Referring to FIGS. 69, 69D, and 70, as noted herein, vehicle 10, 10', 10" includes a plurality of mounting members or tie-down members. Any of the mounting members/tie-downs disclosed herein may have the configuration illustrated in FIGS. 69 and 70. More particularly, and unlike coupler 206 of FIGS. 20 and 21, tie-down member 214 of FIGS. 61 and 62 includes an insert member 1030. Insert member 1030 includes a lower surface 1032 having a contoured (e.g., arcuate or semi-circular) surface and an upper surface 1034 facing away from tie-down member 214. Illustratively, upper surface 1034 includes a first protrusion 1036, a second protrusion 1038, and a receiving area 1040 therebetween. Protrusions 1036, 1038 flank coupler 1042 which secures tie-down member 214 to protrusion 212, as shown best in FIGS. 20 and 21. Ring 214 may still rotate or move relative to insert member 1030 due to the complementary lower surface 1032; however, if ring 214 is pulled in any direction, the strength of ring 214 is maintained because insert member 1030 is retained against coupler 1042 by protrusions 1036, 1038.

In addition to the various embodiments of mounting members disclosed herein, vehicle 10, 10', 10" may include a mounting member 214" which may be rated for at least 10,000 lbs. (FIGS. 69A-69C and 69E) compared to mounting member 214 which may be rated for approximately 5,000 lbs. Mounting member 214' is movably coupled to a bearing member 1120 which is coupled to a portion of frame assembly 20'. Mounting member 214' is configured for 360° rotation in direction 1124 relative to bearing member 1120 and is configured for approximately 280° articulation in direction 1126. Mounting member 214' is configured to articulate or rotate against a bearing surface 1123 of bearing member 1120.

Bearing member 1120 is at least partially secured at a portion of frame assembly 20' through a clearance or friction fit. Illustratively, bearing member 1120 includes a bearing surface 1122 which extends into a coupler, bracket, or other portion of frame assembly 20', as shown best in FIG. 69C.

Figure 69F:
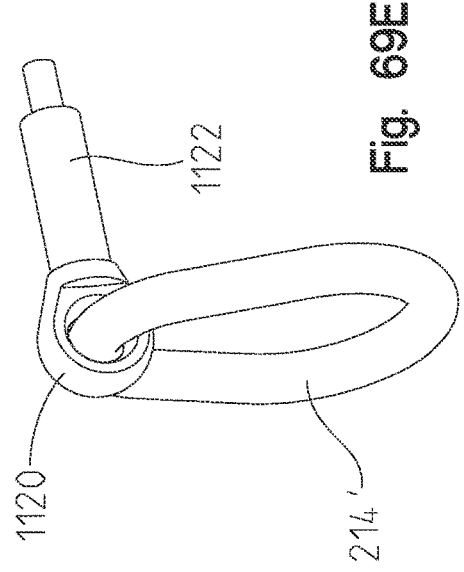
FIG. 69F is an elevational view of a bearing member configured for use with the tie-down members of FIGS. 69 and 69A.
Figure 69E:
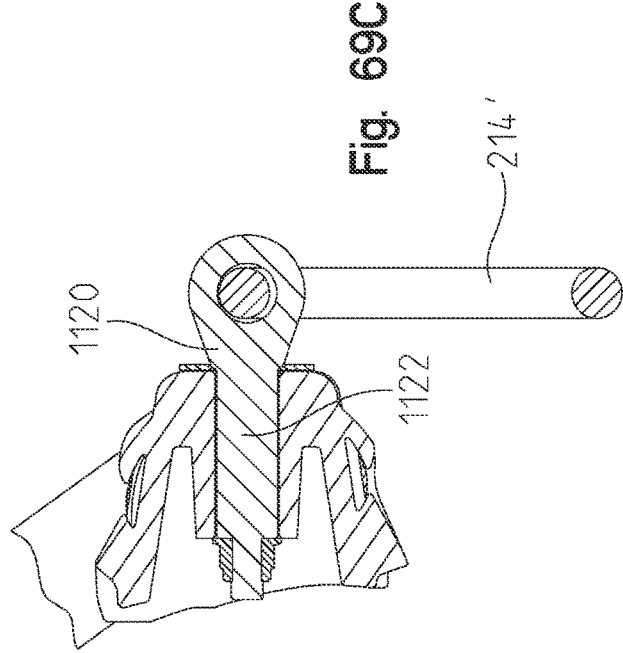
FIG. 69E is a further perspective view of the tie-down member of FIG. 69A.
Figure 71:
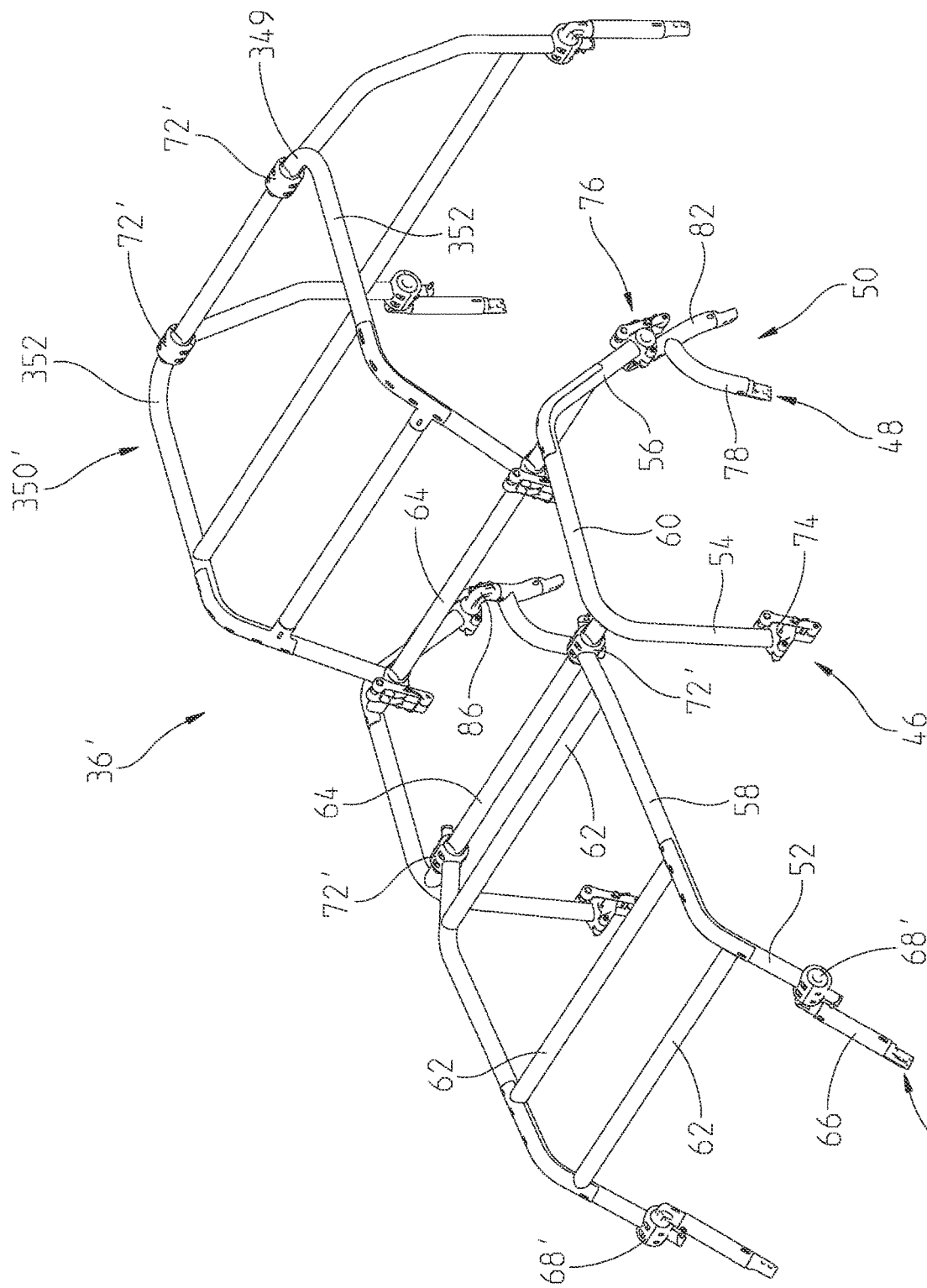
FIG. 71 is a front left perspective view of an upper frame assembly of the utility vehicle of FIG. 54.
Figure 72:
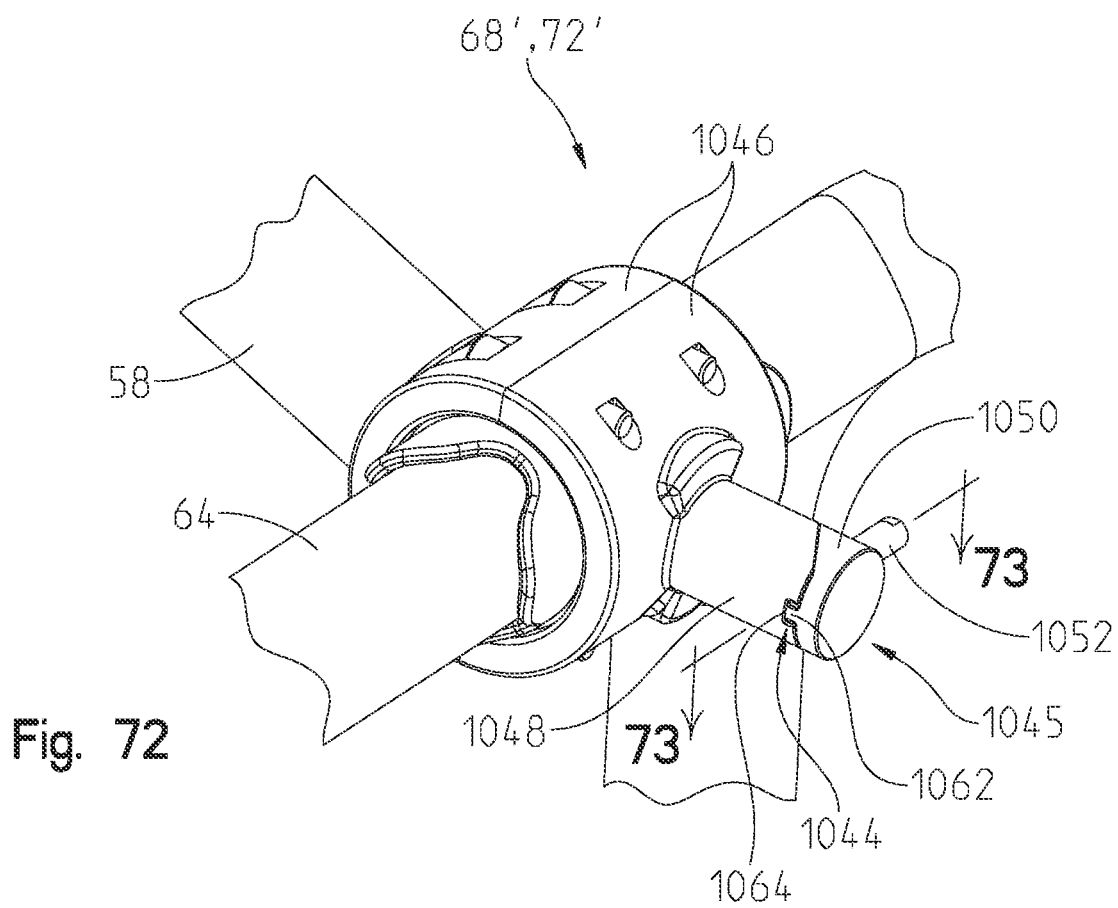
FIG. 72 is a perspective view of a pivot assembly of the upper frame assembly of FIG. 71.
Figure 73:
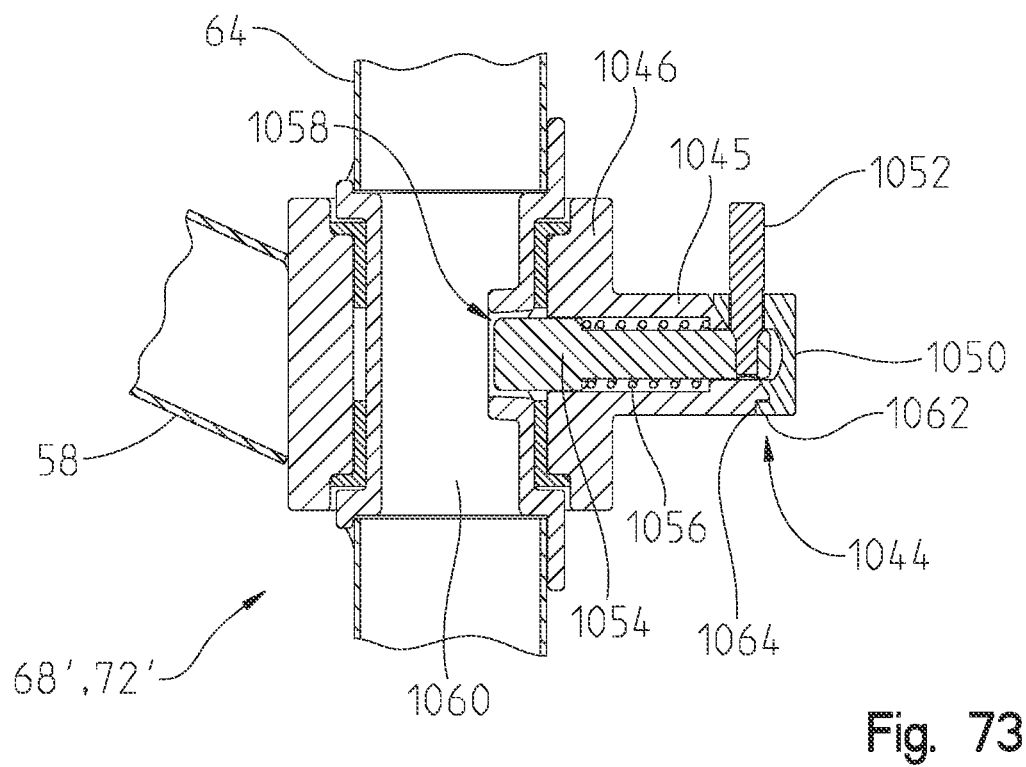
FIG. 73 is a cross-sectional view of the pivot assembly of FIG. 72, taken along line 73-73 of FIG. 72.

For the mounting members of at least FIGS. 69-69F, because of the ability to fully rotate relative to bearing member 1120 and to articulate, the loading of mounting member 214, 214' is always against bearing surfaces 1123. This differs from standard pins (e.g., D ring style tiedown shackles) because, when loading starts to align with the pin/flat edge of D ring in different pull directions, the working load limit is reduced, thereby driving the need for higher working load limit ratings than are needed. Mounting members 214 and 214' are in full circumferential contact around bearing surfaces 1123 and this allows the load on bearing surface 1123 and bearing member 1120 to be more evenly distributed which ultimately allows mounting members 214 and 214' to be reduced in overall size and/or weight when compared to prior configurations. Furthermore, with respect to mounting members 214, 214' of FIGS. 69-69F, smaller and lighter weight members may be used because a constant working load limit is possible regardless of the pull direction due to the ability to align mounting member 214, 214' to the pull direction.

Referring to FIGS. 71-75, upper frame assembly 36' is disclosed and has a similar configuration to that of upper frame assembly 36 (FIGS. 11 and 12), with like reference symbols denoting like components. Specifically, pivot joints 68', 72' of upper frame assembly 36' include a body portion 1046 and an arm portion 1045. Body portion 1046 allows various members of upper frame assembly 36' to rotate relative to each other when upper frame assembly 36' moves between the positions shown in FIGS. 11 and 12. It may be appreciated that, while FIG. 64 is shown relative to frame members 58, 64, the disclosure herein is applicable to any pivot joint at any location on vehicle 10, 10', 10".

Arm portion 1045 is operably coupled to body portion 1046 and includes a post 1048, a cap 1050, and a lever 1052. Post 1048 is coupled to body portion 1046 and includes an internal cavity configured to receive a moveable arm 1054. At least a portion of moveable arm 1054 is surrounded by a spring 1056 and a distal end of movable arm 1054 is configured to receive lever 1052. Moveable arm 1054 extends into cap 1050 and extends through arm portion 1045 where a proximate end of moveable arm 1054 is received within a recess 1058 of a rotational member 1060 operably coupled to upper frame assembly 36'. In this way, when the various frame members of upper frame assembly 36' are in the extended or unfolded position, that position is maintained when the proximate end of moveable arm 1054 is received within recess 1058. However, when it is desirable to rotate upper frame assembly 36' to the folded position, moveable arm 1054 may be pulled out of recess 1058 when an operator pulls either cap 1050 or lever 1052 and overcomes the force of spring 1056 to pull the proximate end of moveable arm 1054 away from recess 1058.

In order to prevent accidental movement of cap 1050 and moveable arm 1054, an anti-rotation feature 1044 is provided. Illustratively, anti-rotation feature 1044 is defined at the connection between cap 1050 and arm portion 1045. Anti-rotation feature 1044 is configured as a tab or detent 1062 extended from cap 1050 into a recess 1064 of arm portion 1045. When detent 1062 is positioned within recess 1064, cap 1050 does not rotate relative to arm portion 1045, thereby preventing accidental movement of moveable arm 1054.

Figure 74:
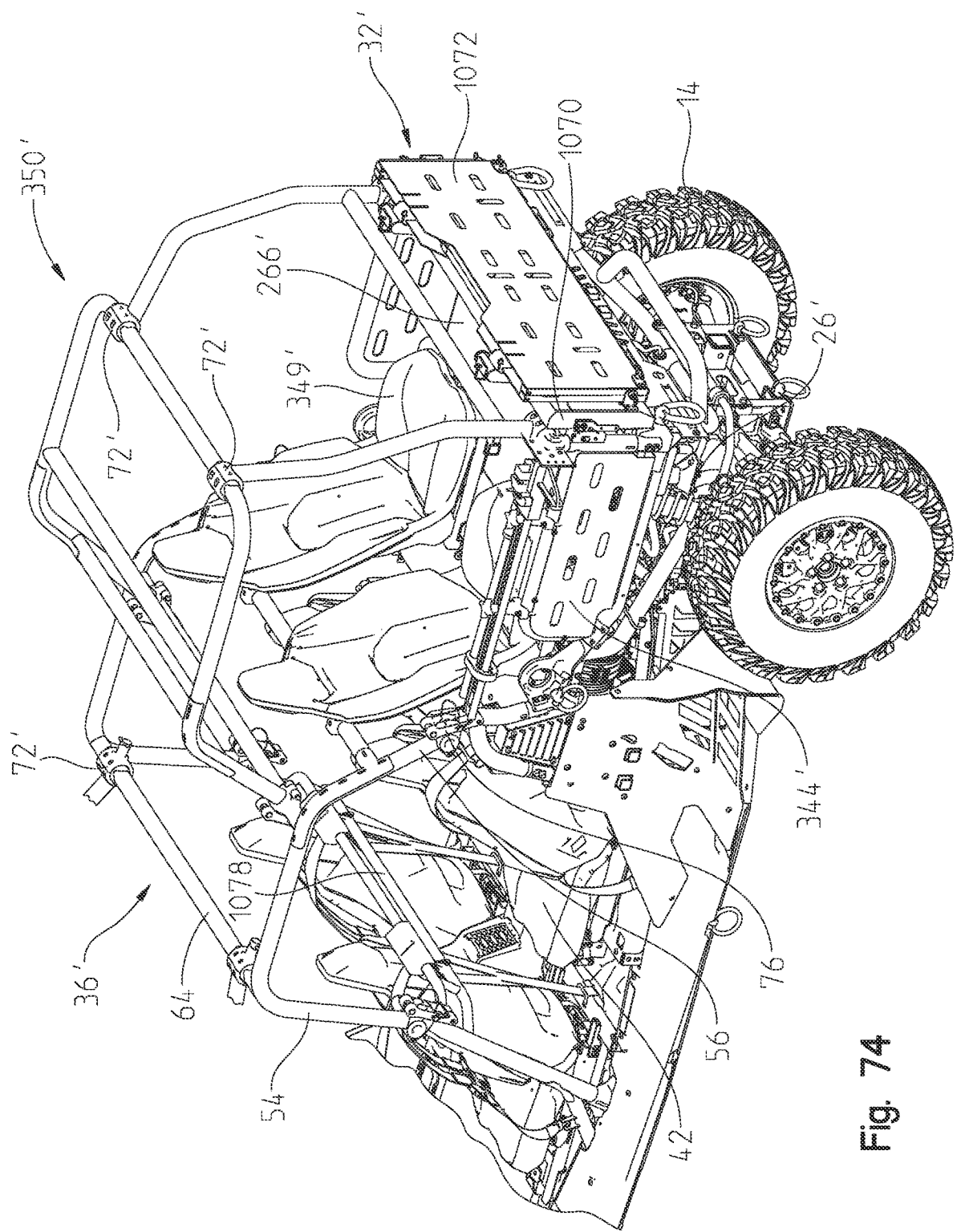
FIG. 74 is a rear left perspective view of a portion of the upper frame assembly of FIG. 64 positioned over a cargo area of the utility vehicle of FIG. 54.
Figure 75:
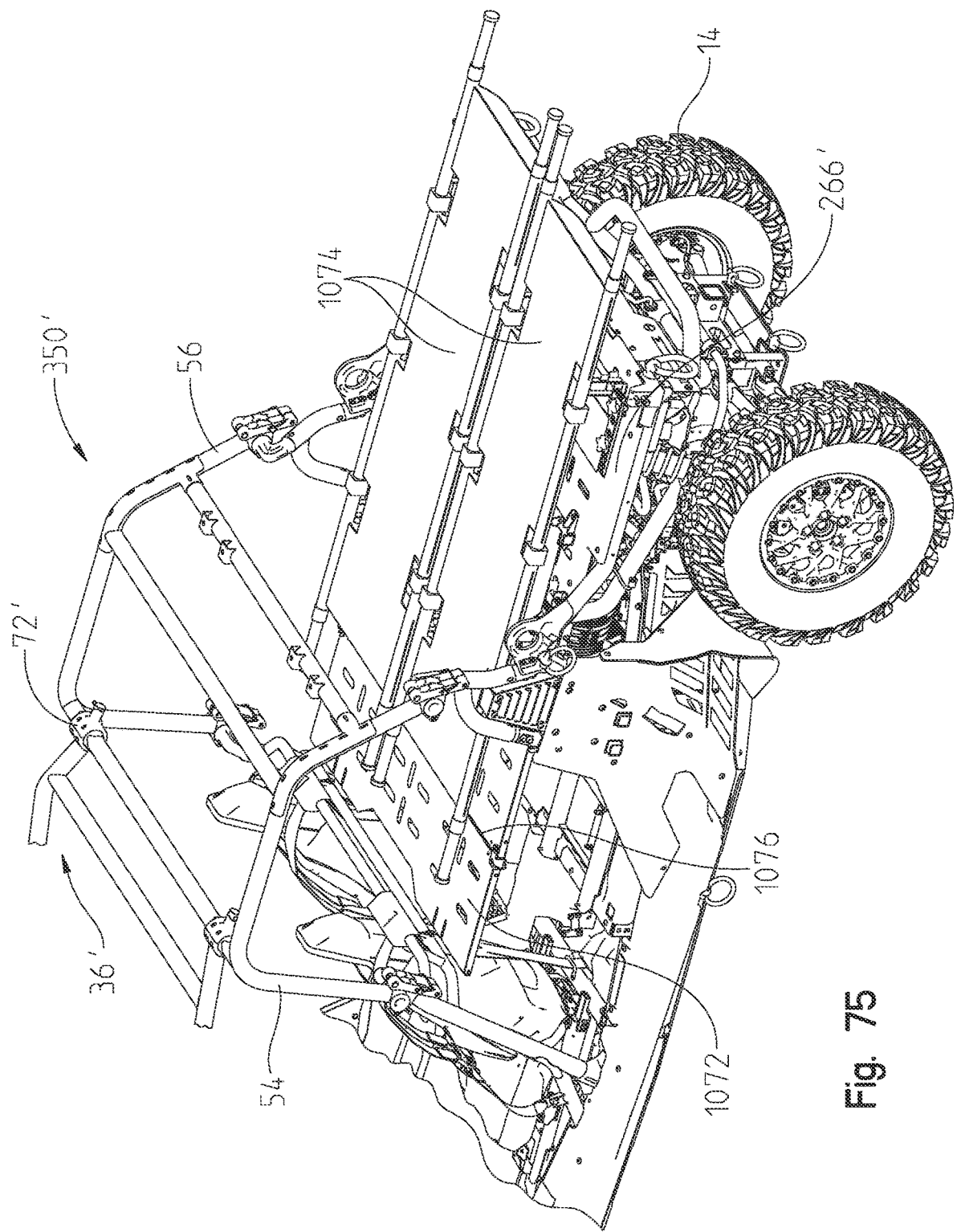
FIG. 75 is a rear left perspective view of the cargo area of FIG. 66 and showing an extended cargo surface configured to support at least one litter or carrier.

Referring to FIGS. 74 and 75, a rear upper frame assembly 350' is similar to rear upper frame assembly 350 of FIG.

32, with like reference symbols indicating like components. Rear upper frame assembly 350' is pivotably coupled to upper frame assembly 36' through pivot joints 72' and extends over rear cargo area 32'. In various embodiments, rear upper frame assembly 350' extends from upper frame assembly 36' to a rear tailgate 1070 or rear extent of vehicle 10'. Rear cargo area 32' may be configured to support at least one seat 349' on a cargo platform 266' and rear upper frame assembly 350' extends over seat 349'. In addition to tailgate 1070, rear cargo area 32' may include side walls 344' which further contain any cargo supported on platform 266'.

Illustratively, as shown in at least FIG. 75, rear passenger seats 42 may be removed from operator area 38 and a platform extension 1072 may be positioned within operator area 38 in lieu of rear passenger seats 42. In one embodiment, platform extension 1072 may be supported on the seat frame for seats 42 when seats 42 are removed and/or on a rear passenger grab bar 1078. Platform extension 1072 allows cargo platform 266' to extend into operator area 38. For example, litters or carriers 1074 may be transported by vehicle 10' by removing rear passenger seats 42 and extending litters 1074 into operator area 38, which is possible because of platform extension 1072. However, when not in use, platform extension 1072 may be folded along a hinge 1076 and carried on tailgate 1070. Platform extension 1072 may be comprised of a plurality of panels movably coupled together along one or more hinge(s) 1076.

Figure 76:
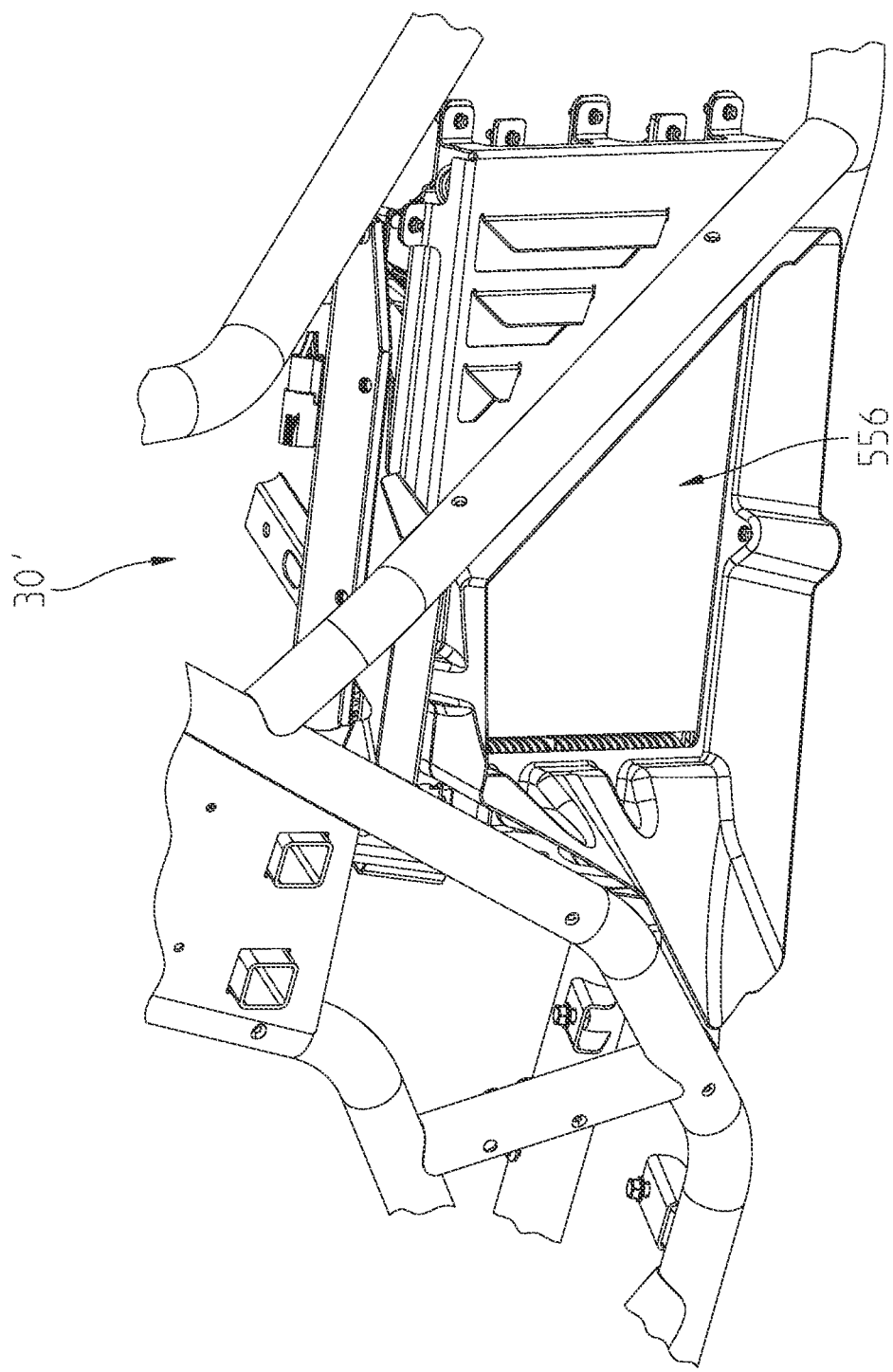
FIG. 76 is a rear left perspective view of a cooling assembly for a powertrain component.
Figure 77:
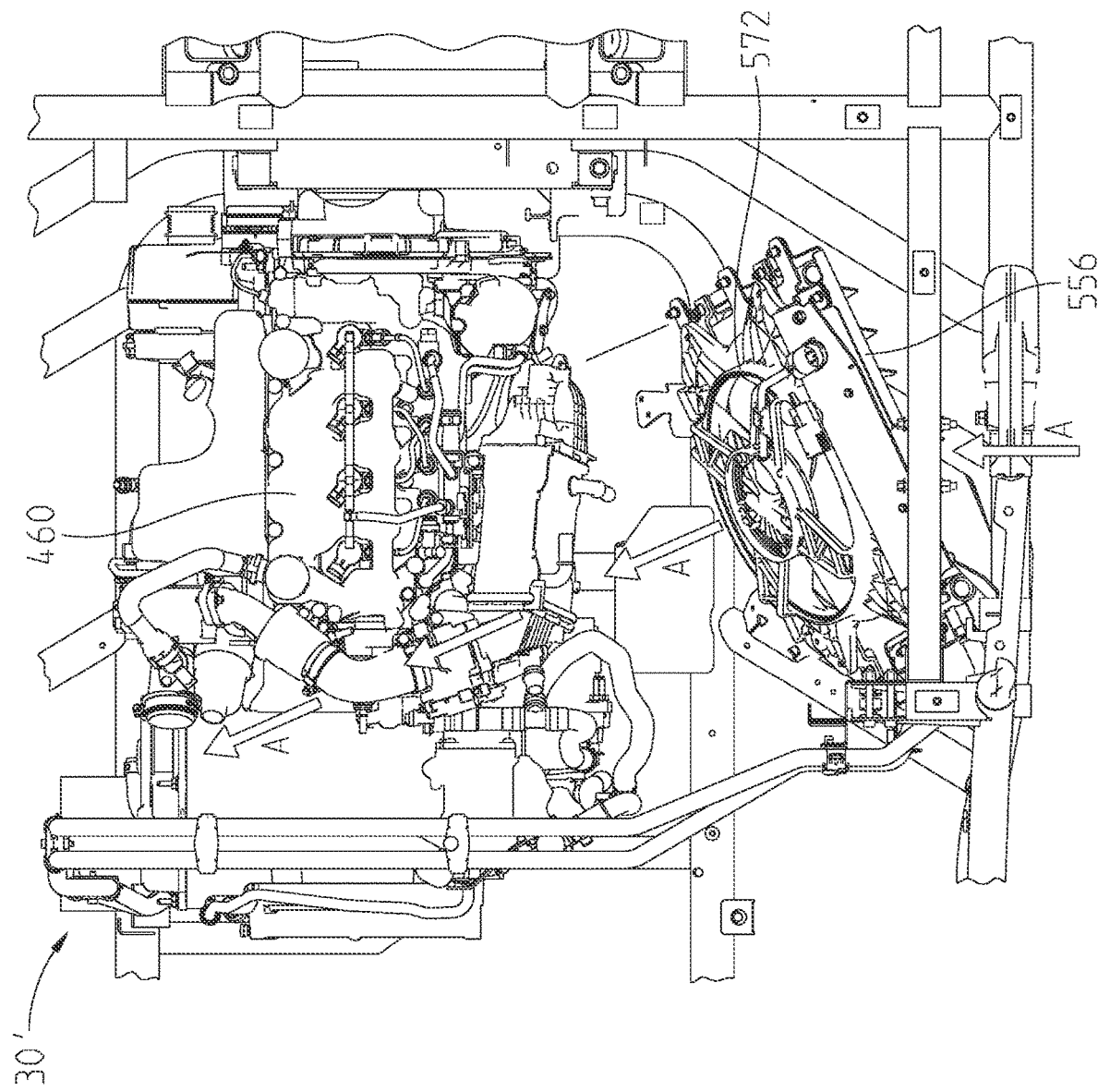
FIG. 77 is a top view of the cooling assembly of FIG. 76.

Referring now to FIGS. 76 and 77, oil cooler 556 is shown with fan 572. Fan 572 is configured to pull ambient air A through oil cooler 556 from a rear left side of vehicle 10', 10". Because of the angle of fan 572 and oil cooler 556, air A also passes over various powertrain components, such as portions of engine 460, a turbocharger, intercoolers, etc. In this way, the position and configuration of oil cooler 556 and fan 572 both provide cooling to the engine oil but also provide cooling to various other powertrain components from air A expelled from fan 572. Further, the flow of air A across various components of powertrain 15 may also reduce heat touch points of rear cargo area 32' because the flow of air A occurs along an underside of platform 266'.

Figure 78:
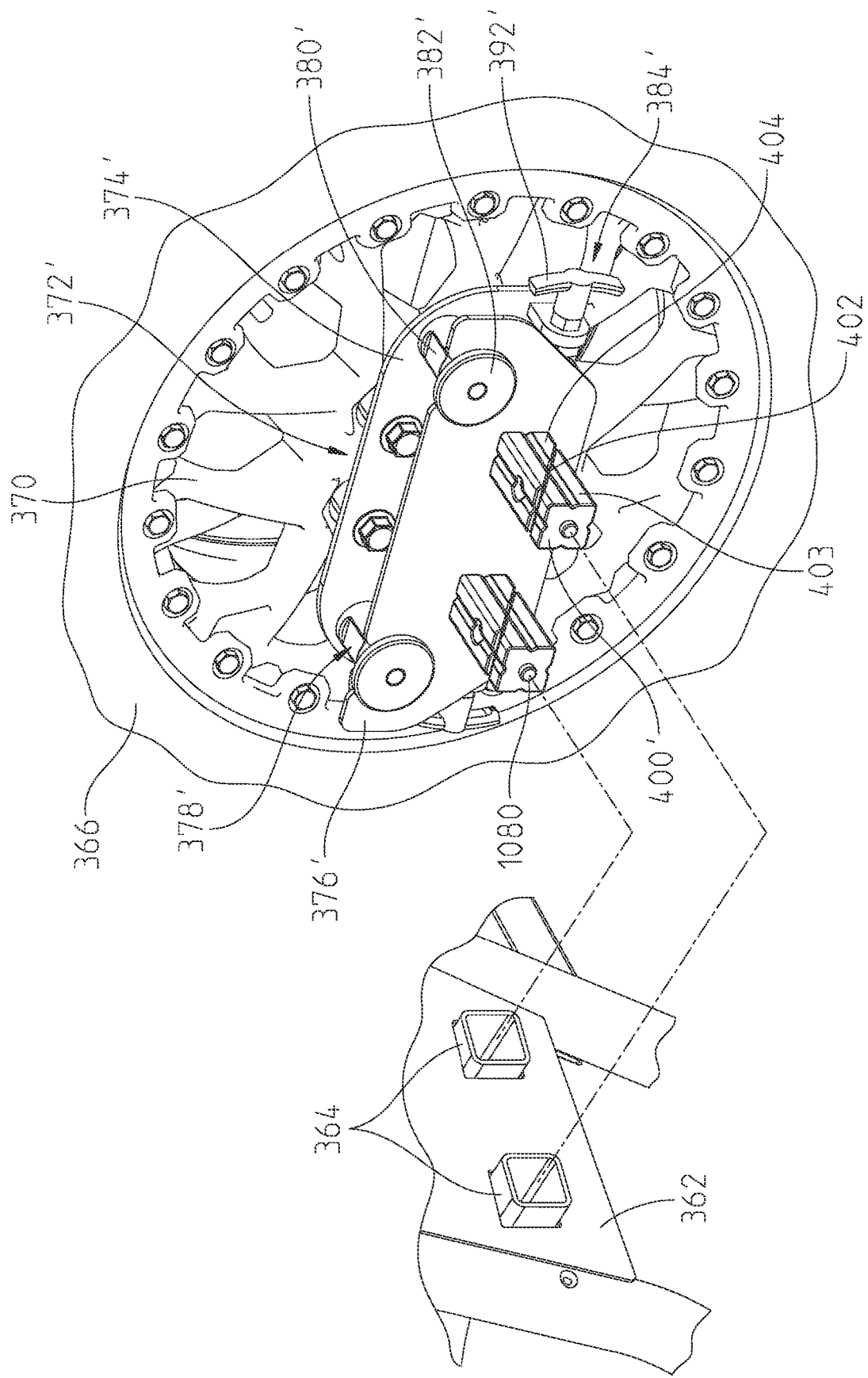
FIG. 78 is an exploded view of an accessory mounting assembly of the vehicle of FIG. 54.
Figure 79:
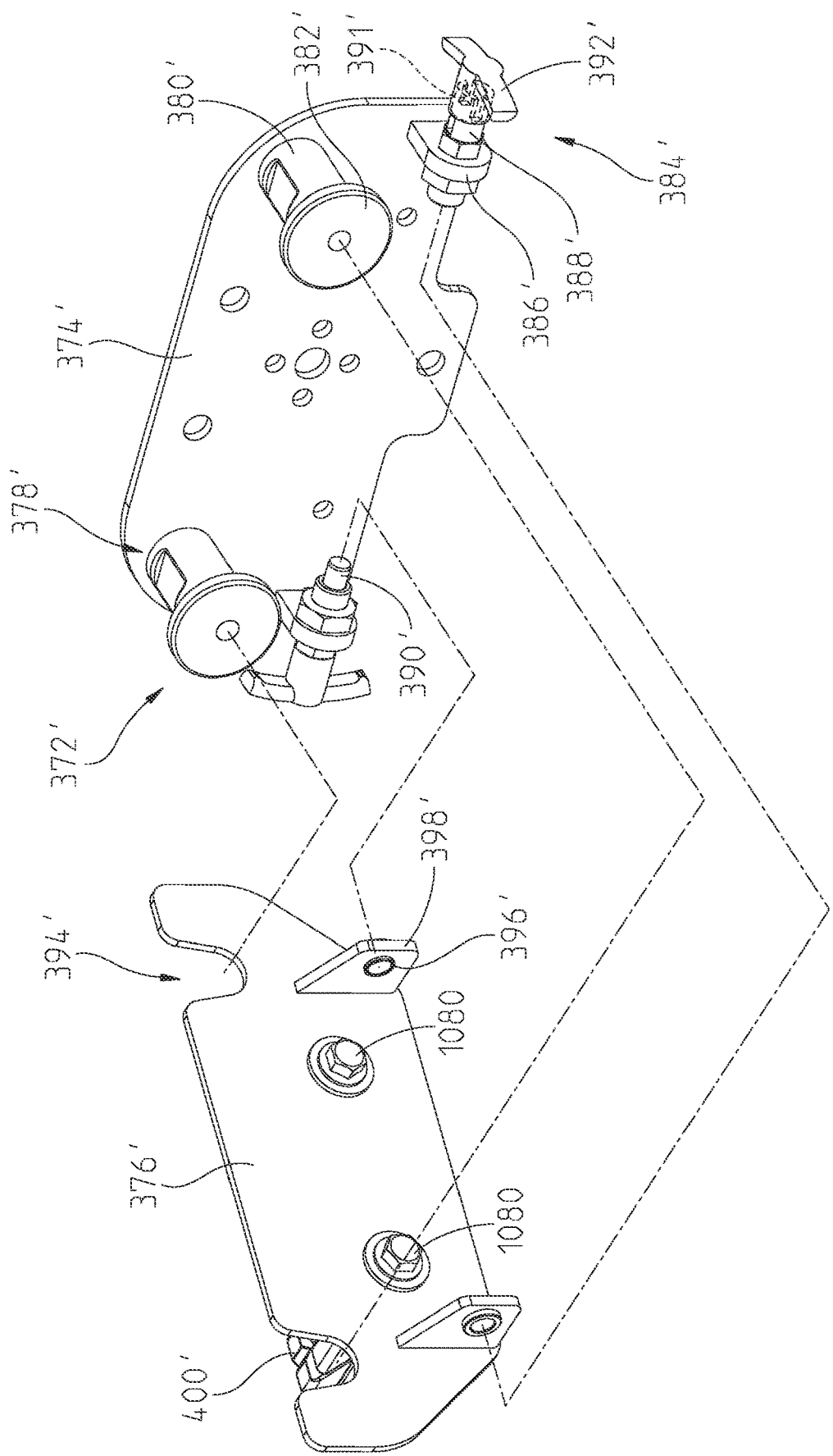
FIG. 79 is an exploded view of a portion of the accessory mounting assembly of FIG. 78.

Referring to FIGS. 78 and 79 in comparison with FIGS. 34 and 35 (with like components denoted by like reference symbols), vehicle 10' may be configured to support a spare tire 366 thereon. A support assembly 372' is configured to be removably coupled to wheel 370 and cooperate with receivers 364 to support spare tire 366. Illustratively, support assembly 372' includes a first plate 374' directly coupled to wheel 370 and a second plate 376' configured to be coupled to first plate 374' and receivers 364. A rearward surface of first plate 374' is coupled to wheel 370 and a forward surface of first plate 374' includes pegs 378' extending forwardly. Pegs 378' include a body portion 380' and a head portion 382'.

The forward surface of first plate 374' also includes locking assemblies 384' comprised of a bracket 386', a sleeve 388', a pin 390', a lever body 391', and a lever or rotatable arm 392'. Sleeve 388' is retained within bracket 386' and pin 390' is received within sleeve 388'. Pin 390' may be extended from sleeve 388' and received through apertures 396' of brackets 398' in order to couple first and second plates 374', 376' together. When pin 390' is extended to the desired position to be received within bracket 398', lever arm 392' may rotate from a horizontal position to a vertical position in order to secure the position of pin 390' relative to sleeve 388'.

First and second plates 374', 376' are further coupled to each other through pegs 378'. More particularly, second plate 376' includes recesses or groove 394' which are configured to receive body portion 380' of pegs 378'. Head portion 382' of pegs 378' is positioned forward of second plate 376' to retain first plate 374' on second plate 376'.

Referring still to FIGS. 78 and 79, a forward surface of second plate 376' includes tubular members 400' which are received within receivers 364. Tubular members 400' and receivers 364 may have any cross-sectional shape, including circular, rectangular, or any other desired shape. Tubular members 400' are configured as wedges and may include a channel 402 and an opening 404 for further securing tubular members 400' within receivers 364. More particularly, channel 402 separates a first portion 401 of tubular member 400' and a second portion 403 of tubular members 400'. When spare tire 366 is supported on vehicle 10', a fastener 1080 extends through portions 401, 403 and when, when tightened, first and/or second portion(s) 401, 403 move relative to each other, thereby applying a pressure on receivers 364 to lock tubular members 400' within receivers 364. To remove spare tire 366, fastener 1080 may be loosened to bring portions 401, 403 closer together and, therefore, release the pressure on receivers 364 to allow tubular members 400' to be removed from receivers 364.

Figure 80:
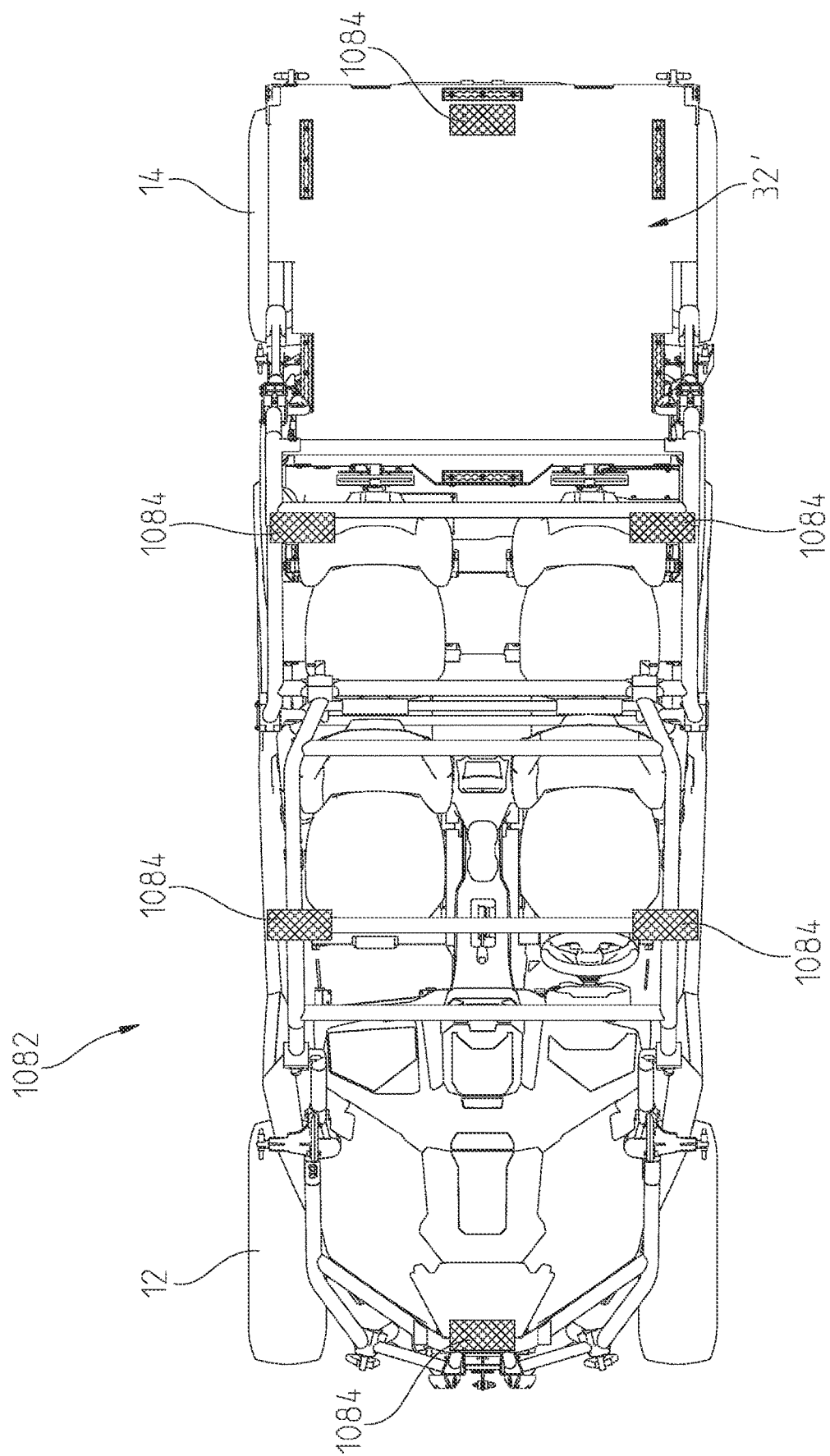
FIG. 80 is a top view of the utility vehicle of FIG. 54 and including a damage detection assembly.

Referring to FIG. 80, vehicle 10', 10" may include a ballistic detection system 1082. More particularly, various IMUs 1084 may be supported on vehicle 10', illustratively supported on portions of at least upper frame assembly 36' and lower frame assembly 34'. As such, vehicle 10' is configured for tele-operation which may be helpful if vehicle 10' sustains damage and it is necessary to manage and mitigate the damage from a remote-controlled perspective. Specifically, it may be useful to know when vehicle 10' is taking ballistic damage and, therefore, sensors may be added to vehicle 10' to provide audible/visual feedback to detect and indicate damage to vehicle 10' and communicate such information to the operator.

Tele-operation of vehicles of various sizes are used widely in the military but understanding damage taken to the vehicle is often communicated ineffectively. Systems typically report electrical system faults; however, such communication may not help the remote user understand if non-electrical damage is occurring (e.g., damage that the electrical systems do not detect) and how much performance or life exists in the vehicle. Therefore, the ability to detect and indicate damage to the user as well as remain vehicle functionality is possible through ballistic detection system 1082.

Because of the controls systems of vehicle 10, 10', 10", vehicle 10, 10', 10" has the ability to understand many faults and report them reliably. In addition, through performance analysis, it is possible to create a map of remaining vehicle health (e.g., as a percentage) using inputs of various sub-system faults and their relative impact on drivability. This could be shown to the user visually (e.g., via a health bar or other indicator) which is advantageous to a remote operator in a combat situation more so than simply seeing a graphic icon telling the operator one or more faults are present or a decimal value showing how many faults are present.

In addition, ballistic detection system 1082 has the ability to detect damage that does not cause detected electrical faults, such as body/chassis faults by adding accelerometers (with or without sound sensors) on key sections frame assembly 20', which will detect the shock signature of ballistic damage on such portions of the chassis/frame assembly 20'. Damage done to plastic elements (typically body panels) will likely not be detected but also may not be as important in tele-operation mode when no person is in the vehicle. Along with newly active faults, these detected ballistic events will feed into the tele-operation visual/audio feedback (e.g., as colored flashings on display 454) to indicate to user new damage events. It is possible for the sensors to facilitate geolocation of the damage and communicate the same to the operator.

Because vehicle 10' is configured for military operations, vehicle 10' may operate in a stealth mode. Powertrain 15 for vehicle 10', including engine 460, produces a noticeable amount of noise, especially the fans associated therewith when driving at low speeds. As such, when it is desirable to operate vehicle 10' in a stealth mode, it may be necessary to turn off powertrain cooling assembly 550 or at least the fans associated therewith to minimize the noise signature of vehicle 10'. However, cooling is necessary for operation of powertrain 15. Therefore, there is a need for a method by which powertrain 15 can operate effectively while cooling is minimized in the stealth mode.

Figure 81:
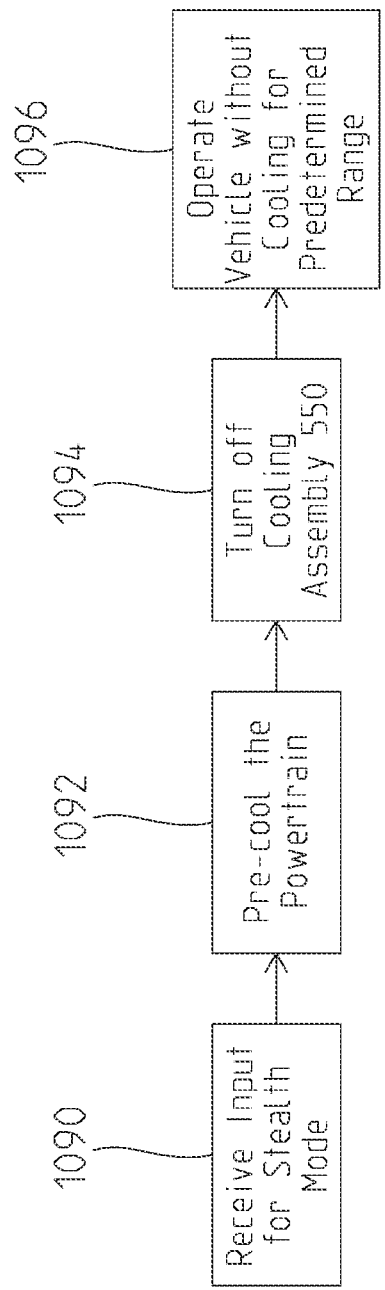
FIG. 81 is a method of pre-cooling portions of the vehicle of FIG. 54 for minimal noise signature in various operating modes.

As shown in FIG. 81, it may be possible to utilize a pre-cooled method to facilitate the stealth mode. More particularly, when the operator knows that stealth mode may be required for a portion of the operation of vehicle 10', the operator may select an input to actuate stealth mode at a time in the future (step 1090). The actuation of the stealth mode may occur via an input on display 454. When actuated, cooling assembly 550 may begin to pre-cool various powertrain components, such as engine 460 (step 1092).

At step 1094, after a predetermined amount of pre-cooling (e.g., time, temperature, etc.), vehicle 10' (e.g., via display 454) may indicate that stealth mode may be initiated and, in stealth mode, vehicle 10' operates with powertrain temperatures outside the optimal range while cooling assembly 550 does not actuate at least the fans thereof. In this way, vehicle 10' may operate with minimal noise signature while the fans are turned off but powertrain 15 is operable (step 1096). More particularly, during a first part of a mission in which stealth mode is not necessary, pre-cooling occurs which potentially results in losing powertrain efficiency, and during a second part of the mission when the stealth mode is initiated and minimal fan use occurs, the operating powertrain temperatures are allowed to increase higher than normal (but fans and cooling assembly 550 are turned on before unacceptable damage occurs). This gives the maximum amount of time in the critical travel period of minimal noise signature.

Figure 82:
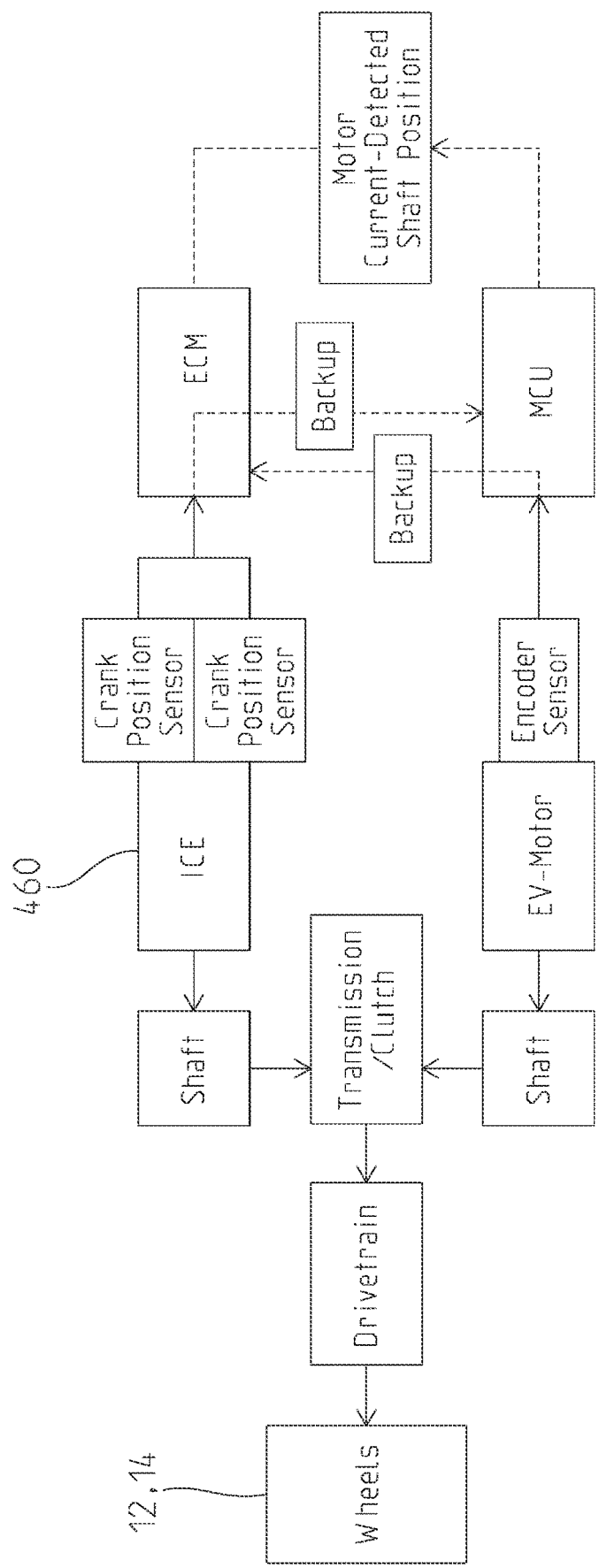
FIG. 82 is a schematic view of a powertrain of the utility vehicle of FIG. 54.

Referring to FIG. 82, vehicle 10' may include a hybrid powertrain in order to operate in the stealth mode disclosed herein for minimal noise signature at various times. With a hybrid powertrain, an electric vehicle ("EV") mode also allows for operation in the stealth mode and a range-extension ability allows engine 460 to be used as needed. Additionally, parallel mechanically coupled drivetrain power allows for continued powertrain operation if a torque source becomes disabled during operation of vehicle 10'. More particularly, it is possible to de-rate operating modes within engine and motor controllers in case of sensor failure to allow engine/motor to continue operating by using a shaft sensor of a secondary torque system.

In typical embodiments, hybrid powertrains with parallel-mechanical torque coupling may consist of independently clutched engines and motors to allow for different operating modes and maximal performance and efficiency. In such systems, each torque source has its own shaft position sensors which creates some redundancy in the controls system. Because of this, there is no common-sensor information sharing between engine and motor control sub-systems.

Drivetrain torque elements like the engine crankshaft/camshaft and electric motor require angular information regarding the shaft position in order to create reliable and precise torque. As such, there may be a wider window of shaft position inaccuracy which could lead to system damage. However, as shown in FIG. 82, when the shaft-position sensor of one sub-system, such as the engine crank/cam sensor, is faulted, the ECM switches to using the shaft position from the motor encoder sensor. In doing so, it may be necessary to understand the prior relationship of one shaft-position sensor to another (i.e., via gear or belt angular translation) and prevent them from changing (for example, via clutch dis-engagement and re-engagement). The foregoing is attainable for certain system designs with direct clutch control or by keeping the shaft at a minimum speed, along with an understanding by the driver of the implications of keeping the clutch engaged.

The present disclosure relates equally to any embodiments of vehicles 10, 10', and 10".

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A utility vehicle, comprising:
a plurality of ground-engaging members;
a frame assembly having a front frame portion and a rear frame portion;
an operator area supported by the frame assembly, the operator area including at least one seat configured to be removably coupled to the frame assembly;
a seat harness configured for a shoulder belt of the at least one seat; and
a cargo platform supported by the frame assembly and having a first position in which a forward extent of the cargo platform is positioned rearward of the operator area and a second position in which the forward extent of the cargo platform is positioned within the operator area, and when in the second position, the cargo platform extends over the seat harness, and
wherein the at least one seat is coupled with the frame assembly when the cargo platform is in the first position and the at least one seat is removed from the frame assembly when the cargo platform is in the second position.

2. The utility vehicle of claim 1, wherein the seat harness is rotatable between a first position and a second position.

3. The utility vehicle of claim 2, wherein the first position of the seat harness defines an upright position and the second position of the seat harness defines a folded position.

4. The utility vehicle of claim 1, wherein the frame assembly defines a lower frame assembly and an upper frame assembly coupled to the lower frame assembly, and the cargo platform is at least partially positioned within an envelope defined by the upper frame assembly when in the second position.

5. The utility vehicle of claim 1, wherein a height of the cargo platform is constant relative to a ground surface when the cargo platform is in both the first and second positions.

6. The utility vehicle of claim 5, wherein, when in the second position, the cargo platform includes a rearward portion positioned outward of the operator area and a forward portion positioned at least partially within the operator area, and a height of the forward portion is equal to a height of the rearward portion relative to the ground surface.

7. The utility vehicle of claim 1, wherein the at least one seat is a passenger seat, and the passenger seat is removed from the frame assembly when the cargo platform is in the second position.

8. The utility vehicle of claim 7, wherein the cargo platform extends laterally along an operator seat when the passenger seat is removed.

9. The utility vehicle of claim 1, wherein the at least one seat is one or more rear seats, and the one or more rear seats are removed from the frame when the cargo platform is in the second position.

10. The utility vehicle of claim 1, wherein, in the second position, the cargo platform is positioned directed rearward of an operator seat.

11. The utility vehicle of claim 1, wherein, in the second position, the cargo platform may accommodate at least one carrier or stretcher.

12. The utility vehicle of claim 1, wherein cargo platform includes at least one wall extending upwardly from the cargo platform when the cargo platform is in the first position.

13. The utility vehicle of claim 12, wherein the cargo platform further includes a tailgate positioned at an angle to the at least one wall when the cargo platform is in the first position.

14. The utility vehicle of claim 13, wherein the tailgate is configured to rotate between an open position and a closed position.

15. The utility vehicle of claim 1, wherein the cargo platform supports one or more additional seats in the second configuration.

16. A utility vehicle, comprising:
a plurality of ground-engaging members;
a frame assembly having a front frame portion and a rear frame portion;
an operator area supported by the frame assembly, the operator area including at least one seat removably coupled to the frame assembly; and
a cargo platform supported by the frame assembly configurable in a first configuration and a second configuration, the cargo platform including a floor having a front side and a first longitudinal side and a first wall extending upward relative to the floor of the cargo platform and extending along the first longitudinal side of the floor in the first configuration, and wherein the first wall is extending along the front of the floor in the second configuration, the first wall extending into the operator space in the second configuration.

17. The utility vehicle of claim 16, wherein in the first configuration the first wall is angled relative to the floor and in the second configuration, the first wall extends parallel to the floor.

18. The utility vehicle of claim 16, wherein in the second configuration the first wall is in a non-overlapping relationship with the floor.

19. The utility vehicle of claim 16, further comprising a seat harness configured for a shoulder belt of the at least one seat.

20. The utility vehicle of claim 19, wherein the seat harness is movable between a first position and a second position, and a portion of the seat harness is fixed during movement between the first and second positions.

21. The utility vehicle of claim 16, wherein the at least one seat is coupled with the frame assembly when the cargo platform is in the first configuration and the at least one seat is removed from the frame assembly when the cargo platform is in the second configuration.

22. The utility vehicle of claim 16, wherein operator area includes a rear seating area having one or more rear seats, and the one or more rear seats are removed from the frame when the cargo platform is in the second configuration and the first wall is positioned within the rear seating area in the second configuration.

23. The utility vehicle of claim 16, wherein the frame assembly defines a lower frame assembly and an upper frame assembly coupled to the lower frame assembly, and the first wall being at least partially positioned within an envelope defined by the upper frame assembly when in the second configuration.

* * * * *